US012674956B2

(12) United States Patent
Cho et al.

(10) Patent No.: US 12,674,956 B2
(45) Date of Patent: Jul. 7, 2026

(54) LENS MOVING APPARATUS WITH A BOBBIN COMPRISING A GROOVE AND ELASTIC MEMBERS AND CAMERA MODULE INCLUDING THE SAME

(71) Applicant: LG Innotek Co., Ltd., Seoul (KR)

(72) Inventors: Jae Hong Cho, Seoul (KR); Seung Taek Shin, Seoul (KR); In Jae Yeo, Seoul (KR); Jin Suk Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 51 days.

(21) Appl. No.: 18/955,334

(22) Filed: Nov. 21, 2024

(65) Prior Publication Data

US 2025/0085505 A1     Mar. 13, 2025

Related U.S. Application Data

(63) Continuation of application No. 18/469,377, filed on Sep. 18, 2023, now Pat. No. 12,174,450, which is a
(Continued)

(30) Foreign Application Priority Data

| | | | |
|---|---|---|---|
| Mar. 5, 2014 | (KR) | ........................ | 10-2014-0026063 |
| Jun. 25, 2014 | (KR) | ........................ | 10-2014-0078294 |

(51) Int. Cl.
| | |
|---|---|
| *G02B 7/09* | (2021.01) |
| *G02B 7/04* | (2021.01) |
(Continued)

(52) U.S. Cl.
CPC ................. *G02B 7/09* (2013.01); *G02B 7/04* (2013.01); *G02B 13/0015* (2013.01);
(Continued)

(58) Field of Classification Search
CPC ........ G02B 7/09; G02B 7/04; G02B 13/0015; G02B 27/646; H02K 11/215; H02K 1/17;
(Continued)

(56) References Cited

U.S. PATENT DOCUMENTS

| | | | |
|---|---|---|---|
| 5,835,799 A | 11/1998 | Washisu | |
| 8,681,227 B2 * | 3/2014 | Ryu | ......................... G03B 5/02 |
| | | | 348/46 |
(Continued)

FOREIGN PATENT DOCUMENTS

| | | |
|---|---|---|
| CN | 101210992 A | 7/2008 |
| CN | 101526658 A | 9/2009 |
(Continued)

*Primary Examiner* — Nicholas G Giles

(74) *Attorney, Agent, or Firm* — Birch, Stewart, Kolasch & Birch, LLP

(57) ABSTRACT

A lens moving apparatus, including a bobbin; a first coil mounted at an outer circumference of the bobbin; a first magnet moving the bobbin in a first direction parallel to an optical axis by interaction with the first coil; a housing supporting the first magnet; an upper elastic member disposed at a top surface of the bobbin and at a top surface of the housing; a lower elastic member disposed at a bottom surface of the bobbin and at a bottom surface of the housing; and first and second winding protrusions disposed with being opposite to each other, the first coil being wound on the first and second winding protrusions.

19 Claims, 29 Drawing Sheets

Related U.S. Application Data continuation of application No. 17/463,130, filed on Aug. 31, 2021, now Pat. No. 11,782,234, which is a continuation of application No. 16/824,992, filed on Mar. 20, 2020, now Pat. No. 11,131,831, which is a continuation of application No. 16/571,975, filed on Sep. 16, 2019, now Pat. No. 10,620,396, which is a continuation of application No. 15/854,594, filed on Dec. 26, 2017, now Pat. No. 10,451,836, which is a continuation of application No. 15/642,080, filed on Jul. 5, 2017, now Pat. No. 9,885,849, which is a continuation of application No. 15/405,102, filed on Jan. 12, 2017, now Pat. No. 9,726,852, which is a continuation of application No. 15/221,208, filed on Jul. 27, 2016, now Pat. No. 9,578,244, which is a continuation of application No. 14/638,893, filed on Mar. 4, 2015, now Pat. No. 9,423,631.

(51) Int. Cl.

| | |
|---|---|
| *G02B 13/00* | (2006.01) |
| *G02B 27/64* | (2006.01) |
| *H02K 1/17* | (2006.01) |
| *H02K 1/34* | (2006.01) |
| *H02K 11/215* | (2016.01) |
| *H02K 41/035* | (2006.01) |
| *H04N 23/55* | (2023.01) |
| *H04N 23/57* | (2023.01) |
| *H04N 23/68* | (2023.01) |

(52) U.S. Cl.
CPC .............. *G02B 27/646* (2013.01); *H02K 1/17* (2013.01); *H02K 1/34* (2013.01); *H02K 11/215* (2016.01); *H02K 41/0356* (2013.01); *H04N 23/55* (2023.01); *H04N 23/57* (2023.01); *H04N 23/685* (2023.01); *H04N 23/687* (2023.01)

(58) Field of Classification Search
CPC ...... H02K 1/34; H04N 23/687; H04N 23/685; H04N 23/57; H04N 23/55
See application file for complete search history.

(56) References Cited

U.S. PATENT DOCUMENTS

| | | | |
|---|---|---|---|
| 9,151,963 B2 | 10/2015 | Sato et al. | |
| 9,360,735 B2* | 6/2016 | Lim ....................... | H04N 23/57 |
| 9,423,631 B2 | 8/2016 | Cho et al. | |
| 9,578,244 B2 | 2/2017 | Cho et al. | |
| 9,726,852 B2 | 8/2017 | Cho et al. | |
| 9,885,849 B2 | 2/2018 | Cho et al. | |
| 11,131,831 B2 | 9/2021 | Cho et al. | |
| 2003/0234990 A1 | 12/2003 | Akanuma | |
| 2010/0098394 A1 | 4/2010 | Ishihara et al. | |
| 2011/0096178 A1* | 4/2011 | Ryu ......................... | G03B 5/02 |
| | | | 348/208.2 |
| 2011/0103782 A1 | 5/2011 | Tsuruta et al. | |
| 2011/0286732 A1 | 11/2011 | Hosokawa et al. | |
| 2012/0154614 A1 | 6/2012 | Moriya et al. | |
| 2012/0200176 A1 | 8/2012 | Park | |
| 2013/0039640 A1 | 2/2013 | Sekimoto | |
| 2013/0050828 A1 | 2/2013 | Sato et al. | |
| 2013/0215511 A1 | 8/2013 | Wu et al. | |
| 2014/0022655 A1 | 1/2014 | Cheng et al. | |
| 2014/0072289 A1* | 3/2014 | Lim ......................... | G03B 3/10 |
| | | | 396/55 |
| 2014/0177056 A1 | 6/2014 | Hayashi et al. | |
| 2015/0015729 A1 | 1/2015 | Kasamatsu | |
| 2015/0253583 A1 | 9/2015 | Cho et al. | |

FOREIGN PATENT DOCUMENTS

| | | | |
|---|---|---|---|
| CN | 102472944 A | 5/2012 | |
| CN | 102629815 A | 8/2012 | |
| CN | 102645815 A | 8/2012 | |
| CN | 102955324 A | 3/2013 | |
| EP | 2469333 A1 | 6/2012 | |
| JP | 2011-145572 A | 7/2011 | |
| JP | 2012-177753 A | 9/2012 | |
| JP | 2013-24938 A | 2/2013 | |
| JP | 2013-44924 A | 3/2013 | |
| KR | 10-2011-0070337 A | 6/2011 | |
| KR | 10-2011-0076063 A | 7/2011 | |
| KR | 10-2011-0078491 A | 7/2011 | |
| KR | 10-1069619 B1 | 10/2011 | |
| KR | 10-2012-0027751 A | 3/2012 | |
| KR | 10-1197077 B1 | 11/2012 | |
| KR | 10-2013-0046543 A | 5/2013 | |
| KR | 10-2013-0051616 A | 5/2013 | |
| KR | 10-2013-0071000 A | 6/2013 | |
| KR | 10-2014-0024537 A | 3/2014 | |
| TW | 201351024 A | 12/2013 | |

* cited by examiner

250

<u>1220</u>

LENS MOVING APPARATUS WITH A BOBBIN COMPRISING A GROOVE AND ELASTIC MEMBERS AND CAMERA MODULE INCLUDING THE SAME

CROSS REFERENCE TO RELATED APPLICATION

This application is a continuation of U.S. application Ser. No. 18/469,377, filed on Sep. 18, 2023, which a continuation of U.S. application Ser. No. 17/463,130, filed on Aug. 31, 2021 (now U.S. Pat. No. 11,782,234, issued on Oct. 10, 2023), which is a continuation of U.S. application Ser. No. 16/824,992, filed Mar. 20, 2020 (now U.S. Pat. No. 11,131, 831, issued on Sep. 28, 2021), which is a continuation of U.S. application Ser. No. 16/571,975, filed Sep. 16, 2019 (now U.S. Pat. No. 10,620,396, issued on Apr. 14, 2020), which is a continuation of U.S. application Ser. No. 15/854, 594, filed Dec. 26, 2017 (now U.S. Pat. No. 10,451,836, issued on Oct. 22, 2019), which is a continuation of U.S. application Ser. No. 15/642,080, filed Jul. 5, 2017 (now U.S. Pat. No. 9,885,849, issued on Feb. 6, 2018), which is a continuation of U.S. application Ser. No. 15/405,102, filed Jan. 12, 2017 (now U.S. Pat. No. 9,726,852, issued on Aug. 8, 2017), which is a continuation of U.S. application Ser. No. 15/221,208, filed Jul. 27, 2016 (now U.S. Pat. No. 9,578, 244, issued on Feb. 21, 2017), which is a continuation of U.S. application Ser. No. 14/638,893, filed Mar. 4, 2015 (now U.S. Pat. No. 9,423,631, issued on Aug. 23, 2016), which claims priority under 35 U.S.C. § 119 to Korean Patent Application Nos. 10-2014-0026063, filed in the Republic of Korea on Mar. 5, 2014, and 10-2014-0078294, filed in the Republic of Korea on Jun. 25, 2014, which are hereby incorporated in their entirety by references as if fully set forth herein.

TECHNICAL FIELD

Embodiments relate to a lens moving apparatus and a camera module including the same.

BACKGROUND

It is difficult to apply a technology related to a voice coil motor used in a conventional general camera module to a low power consumption type subminiature camera module. For this reason, research related thereto has been actively conducted.

A camera module mounted in a small-sized electronic product, such as a smart phone, may be frequently shocked during use. In addition, the camera module may minutely shake due to a hand tremble of a user during photography. Therefore, there is a high necessity for a technology capable of installing an optical image stabilizer in the camera module.

Much research has been conducted into the optical image stabilizer. A technology capable of moving an optical module along an x-axis and a y-axis perpendicular to an optical axis has been proposed for the optical image stabilizer. According to this technology, an optical system is moved in a plane perpendicular to the optical axis for image correction. As a result, the structure is complicated and miniaturization is not possible.

In addition, an additional sensor for sensing the position of the optical module moving along the optical axis is required to accurately focus the optical module. In this case, it is necessary to electrically connect the sensor to a circuit board.

SUMMARY

Embodiments provide a lens moving apparatus capable of accurately focusing a lens through a simple structure based on a simplified process and a camera module including the same.

Further, embodiments provide a miniature lens moving apparatus having an optical image stabilization function, thereby improving reliability of operation and a camera module including the same.

In one embodiment, a lens moving apparatus includes a first lens moving unit including a bobbin having at least one lens mounted at an inside thereof and a first coil mounted at an outer circumference thereof, a first magnet disposed around the bobbin while being opposite to the first coil, a housing for supporting the first magnet, and upper and lower elastic members coupled to the bobbin and the housing, the first lens moving unit moving the bobbin in a first direction parallel to an optical axis by interaction between the first magnet and the first coil, and a second lens moving unit including a base spaced apart from the first lens moving unit by a predetermined distance, a plurality of support member pairs for supporting the housing such that the housing is movable relative to the base in second and third directions perpendicular to the first direction, a second coil opposite to the first magnet, and a circuit board having the second coil mounted thereon, the second lens moving unit moving the housing in the second and third directions by interaction between the first magnet and the second coil, wherein the support member pairs are disposed at sides of the housing, each of the support member pairs includes first and second support members separated from each other, the first and second support members being disposed at the same side of the housing in a state in which the first and second support members are adjacent to each other, and power is supplied to the first coil through a first support member pair, which is one of the support member pairs.

The sides of the housing may include a plurality of first sides provided at corners of the housing at which a plurality of first magnets is mounted, and a plurality of second sides connected to the respective first sides, the second sides being formed as flat surfaces having a predetermined depth such that the support member pairs are disposed at the respective second sides.

The upper elastic member may include first and second upper elastic members separated from each other, and the first and second upper elastic members may be connected to the first and second support members of the first support member pair while being opposite to the first and second support members of the first support member pair for supplying the power to the first coil.

Each of the first and second upper elastic members may include an inside frame coupled to the bobbin, an outside frame coupled to the housing, a frame connection part connected between the inside frame and the outside frame, and a support member contact part protruding from the outside frame while being opposite to the first or second support member of the first support member pair.

The first lens moving unit may further include a first sensor supported by the housing for detecting a position of the bobbin in the first direction, and a second magnet attached to the outer circumference of the bobbin while being opposite to the first sensor. The second magnet may be disposed between the first magnets spaced apart from each other in a circumferential direction of the bobbin. The first sensor may be inserted in or attached to the housing such that the first sensor is supported by the housing.

The lower elastic member may include first and second lower elastic members separated from each other, a first pin, which is one of a plurality of pins of the first sensor, may be connected to the circuit board through a second support member pair, which is another of the support member pairs, and a second pin, which is another of the pins of the first sensor, may be connected to the circuit board through the first and second lower elastic members and a third support member pair, which is another of the support member pairs.

Each of the first and second lower elastic members may include an inside frame coupled to the bobbin, an outside frame coupled to the housing, a frame connection part connected between the inside frame and the outside frame, and at least one sensor contact part protruding from the outside frame such that the at least one sensor contact part can contact the second pin of the first sensor and the third support member pair.

The second support member pair and the third support member pair may be opposite to each other.

The first lens moving unit may further include a magnetic field compensation metal member disposed at the outer circumference of the bobbin such that the magnetic field compensation metal member is opposite to the second magnet in a symmetric fashion, based on a center of the bobbin.

The first and second support members may be symmetric in a direction perpendicular to the first direction.

Each of the first and second support members may include an upper terminal coupled to an upper end of a corresponding one of the second sides of the housing, at least one elastic deformation part extending from the upper terminal in a longitudinal direction while being bent at least once into a predetermined shape, and a lower terminal extending from the at least one elastic deformation part, the lower terminal being coupled to the base.

The upper terminal of the first support member of the first support member pair may be electrically connected to the first upper elastic member, and the upper terminal of the second support member of the first support member pair may be electrically connected to the second upper elastic member.

The upper terminal of the first support member of the second support member pair may be connected to a 1-1 pin, which is one pin constituting the first pin of the first sensor, and the upper terminal of the second support member of the second support member pair may be connected to a 1-2 pin, which is another pin constituting the first pin of the first sensor.

A 2-1 pin, which is one pin constituting the second pin of the first sensor, may be connected to one side of the first lower elastic member, a 2-2 pin, which is another pin constituting the second pin of the first sensor, may be connected to one side of the second lower elastic member, the first support member of the third support member pair may be connected to the other side of the first lower elastic member, and the second support member of the third support member pair may be connected to the other side of the second lower elastic member.

The circuit board may include a pad unit connectable to the lower terminal of each of the support member pairs.

In another embodiment, a lens moving apparatus includes a first lens moving unit including a bobbin having at least one lens mounted at an inside thereof and a first coil mounted at an outer circumference thereof, and a housing for supporting a magnet disposed around the bobbin, the first lens moving unit moving the bobbin and the first coil in a first direction parallel to an optical axis by interaction between the magnet and the first coil, and a second lens moving unit including a base spaced apart from the bobbin and the first lens moving unit by a predetermined distance, a support member for supporting the first lens moving unit such that the first lens moving unit is movable relative to the base in second and third directions, the support member being capable of supplying power to the first coil, and a circuit board including a second coil opposite to the magnet of the first lens moving unit and a sensor for detecting a position of the second lens moving unit relative to the base in the second and third directions, the second lens moving unit moving the first lens moving unit including the bobbin in the second and third directions by interaction between the magnet and the second coil, the second and third directions being perpendicular to an optical axis of the lens, the second and third directions being different from each other, wherein the bobbin is provided at a top surface thereof with at least one groove having a width and a depth greater than a diameter of the first coil.

The first lens moving unit may further include a pair of winding protrusions protruding a direction perpendicular to an optical axis of the lens, and upper and lower elastic members each having an inside frame coupled to the bobbin and an outside frame coupled to the housing, a start portion and an end portion of the first coil may be wound on the pari of winding protrusions, respectively, the magnet may be fixed to the housing at a position corresponding to a curved surface of the first coil, and the upper elastic member may close an opening of the groove at a coupling position.

The groove may include first and second grooves disposed at left and right sides of each of the winding protrusions.

Each of the winding protrusions may be provided at an end thereof with a catching projection for preventing separation of a corresponding one of the start and end portions of the first coil wound thereon.

The lens moving apparatus may further include a cover member coupled to the base for covering the first and second lens moving units.

The bobbin may include a first stopper protruding from the top surface thereof, the first stopper having a first height, and a second stopper protruding from the side of the top surface thereof in a circumferential direction, the first stopper may prevent a body of the bobbin from colliding with the inside of the cover member, and the second stopper may prevent the bobbin from colliding with the base.

The housing may be provided with a location groove at a position corresponding to the second stopper, the location groove having a size corresponding to the second stopper.

The housing may further include first sides provided at corners at which four magnets are mounted, second sides connected to the respective first sides, the second sides being formed as flat surfaces having a predetermined length such that the support member are disposed at each second side, a third stopper protruding from the top surface thereof for preventing interference with the cover member, and a fourth stopper protruding from the bottom surface thereof for preventing interference with the base.

Each of the second sides may include an escape groove for preventing interference between the support member and the housing. Each of the second sides may further include a step formed at the upper side of the escape groove. Each of the second sides may further include a support member coupling part coupled to the support member. Four support members may be disposed in a symmetric fashion.

The support member may include a first fixing part fixedly coupled to the housing, first and second elastic deformation parts extending from the first fixing part, and a second fixing part fixedly coupled to the base.

At least 19 support members may be provided to support the second lens moving unit. The first and second elastic deformation parts may be bent at least once to form a predetermined pattern.

The first and second elastic deformation parts may be bent at least nineteenth times into at least one of a zigzag shape, an N shape having straight parts formed in a direction perpendicular to the optical axis, or a wire shape having no pattern.

The second fixing part may have a larger width than the first and second elastic deformation parts.

The base may be provided with a support member location groove at a position corresponding to the second fixing part of the support member.

The second coil may be mounted at the top surface of the circuit board disposed above the base. The second coil may be provided at the top surface of the circuit board disposed above the base as a board having a pattern coil, which may be coupled to the circuit board by stacking. The second coil may be integrally formed at the top surface of the base in the form of a surface electrode.

The magnet may be used as an auto focusing magnet for moving the bobbin in the first direction and an optical image stabilization magnet for moving the housing in the second and third directions.

In a further embodiment, a camera module includes an image sensor, a printed circuit board having the image sensor mounted thereon, and the lens moving apparatus.

BRIEF DESCRIPTION OF THE DRAWINGS

Arrangements and embodiments may be described in detail with reference to the following drawings in which like reference numerals refer to like elements and wherein.

DESCRIPTION OF SPECIFIC EMBODIMENTS

Figure 1:
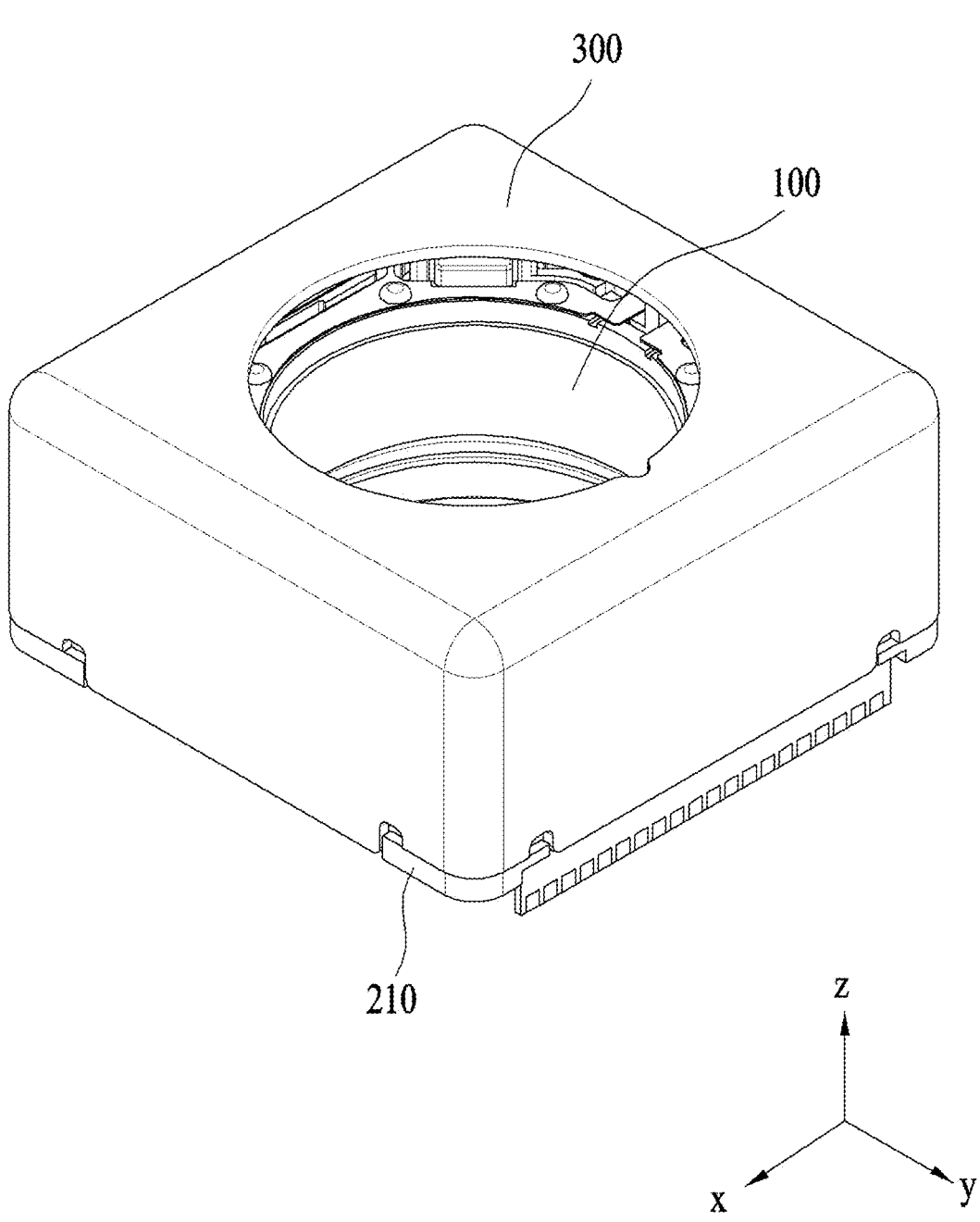
FIG. 1 is a perspective view schematically showing a lens moving apparatus according to an embodiment.

Reference will now be made in detail to the preferred embodiments, examples of which are illustrated in the accompanying drawings. However, embodiments may be modified into various other forms. Embodiments are not restrictive but are illustrative. Embodiments are provided to more completely explain the disclosure to a person having ordinary skill in the art.

It will be understood that when an element is referred to as being 'on' or 'under' another element, it can be directly on/under the element, and one or more intervening elements may also be present. When an element is referred to as being 'on' or 'under', 'under the element' as well as 'on the element' can be included based on the element.

In addition, relational terms, such as 'first' and 'second' and 'upper part' and 'lower part', are used only to distinguish between one subject or element and another subject and element without necessarily requiring or involving any physical or logical relationship or sequence between such subjects or elements.

In the drawings, the thicknesses or sizes of respective layers are exaggerated, omitted, or schematically illustrated for convenience and clarity of description. Further, the sizes of the respective elements do not denote the actual sizes thereof.

Hereinafter, a lens moving apparatus according to embodiments will be described with reference to the accompanying drawings. For the convenience of description, the lens moving apparatus will be described using a Cartesian coordinate system (x, y, z). However, the disclosure is not limited thereto. Other different coordinate systems may be used. In the drawings, an x-axis direction and a y-axis direction are directions perpendicular to a z-axis direction, which is an optical axis direction. The z-axis direction, which is the optical axis direction, may be referred to a first direction, the x-axis direction may be referred to a second direction, and the y-axis direction may be referred to a third direction.

An optical image stabilizer applied to a small-sized camera module of a mobile device, such as a smart phone or a tablet PC, may be an apparatus for counteracting the minute tremors and movements that occur when handholding the device and ensuring taking sharp photographs.

In addition, an auto focusing device is a device for automatically focusing an image of a subject on an image sensor. The optical image stabilizer and the auto focusing device may be variously configured. In an embodiment, the lens moving apparatus may move an optical module including at least one lens in the first direction parallel to the optical axis or in the second and third directions perpendicular to the first direction to perform an optical image stabilization operation and/or an auto focusing operation.

An Embodiment

Figure 2:
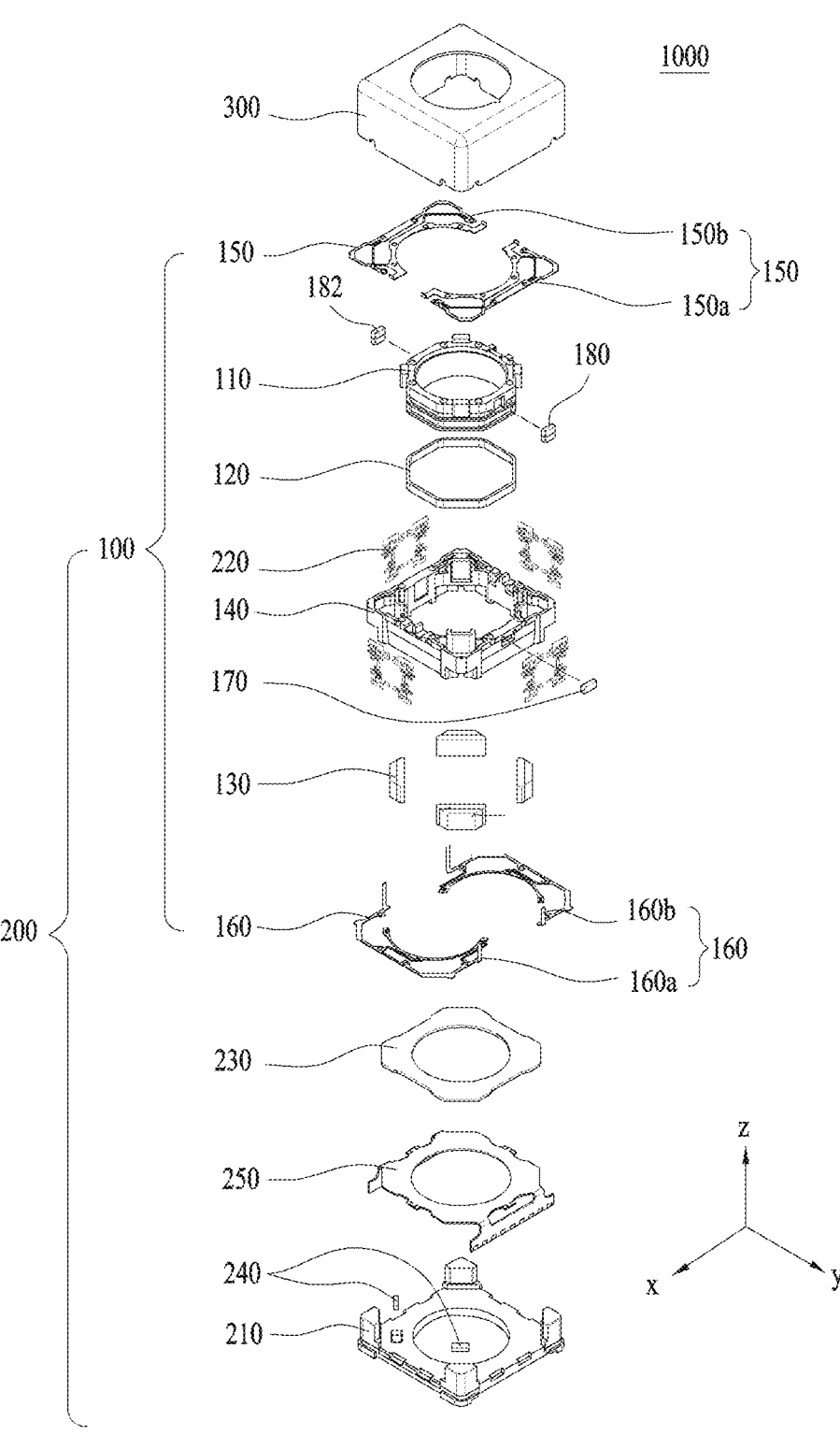
FIG. 2 is an exploded perspective view of the lens moving apparatus shown in FIG. 1.

FIG. 1 is a perspective view schematically showing a lens moving apparatus 1000, 2000 according to an embodiment, and FIG. 2 is an exploded perspective view of the lens moving apparatus 1000 shown in FIG. 1.

Referring to FIGS. 1 and 2, the lens moving apparatus 1000 may include a first lens moving unit 100, a second lens moving unit 200, and a cover member 300. The first lens moving unit 100 may function as the previously mentioned auto focusing device, and the second lens moving unit 200 may function as the previously mentioned optical image stabilizer.

The cover member 300 may be configured approximately in the form of a box. The cover member 300 may cover the first and second lens moving units 100 and 200.

Figure 3:
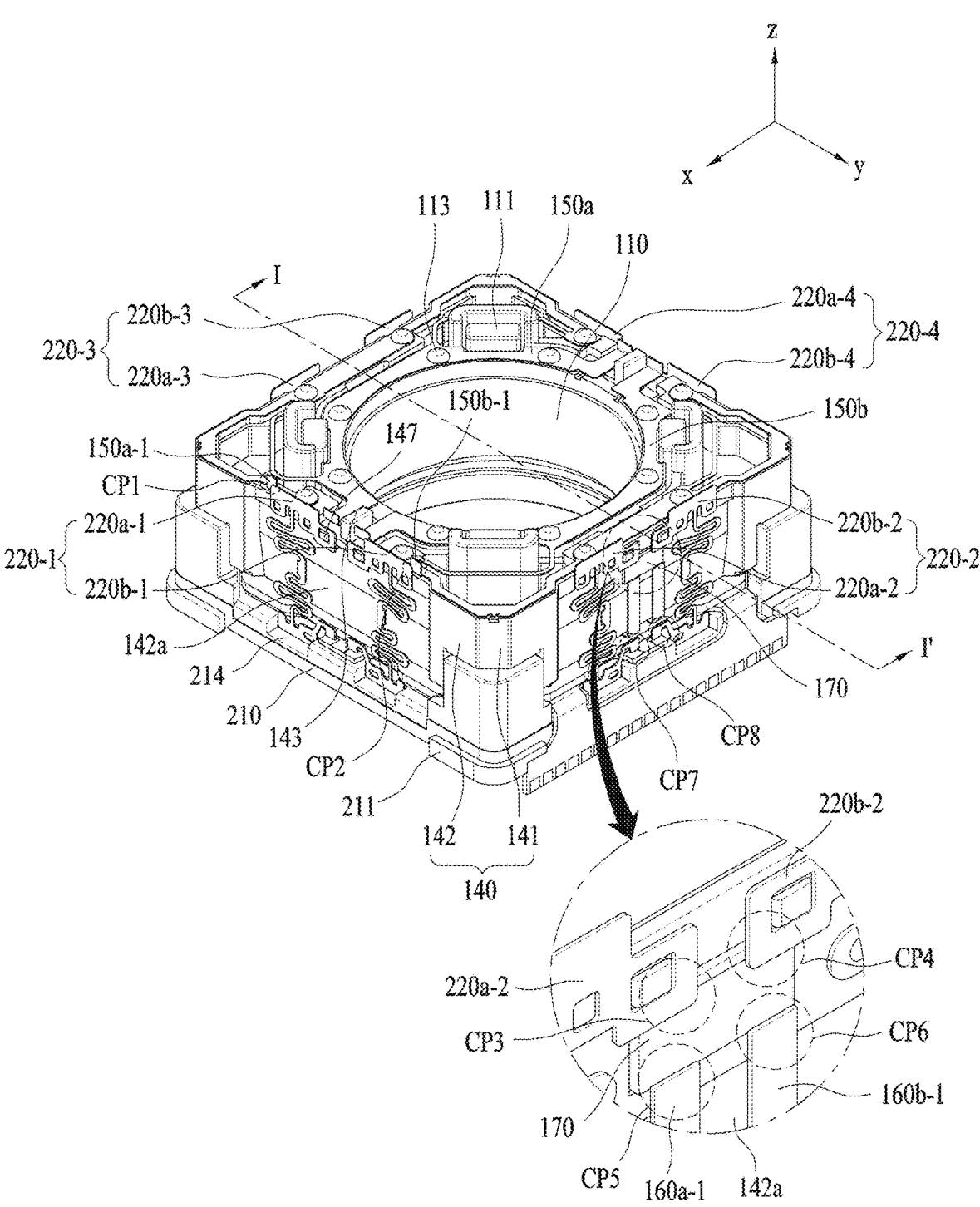
FIG. 3 is a perspective view of the lens moving apparatus with a cover member shown in FIGS. 1 and 2 removed, according to an embodiment.

FIG. 3 is a perspective view of the lens moving apparatus 1000 with the cover member 300 shown in FIGS. 1 and 2 removed, according to the embodiment.

The first lens moving unit 100 may include a bobbin 110, a first coil 120, a first magnet 130, a housing 140, an upper elastic member 150, and a lower elastic member 160.

In addition, the first lens moving unit 100 may further include a first sensor 170 and a second magnet 180. Moreover, the first lens moving unit 100 may further include a magnetic field compensation metal member 182.

Although a plurality of support member pairs 220 is shown as belonging to the first lens moving unit 100 in FIG. 2, the support member pairs 220 may also belong to the second lens moving unit 200 in a functional aspect. The support member pairs 220 will be discussed in detail when the second lens moving unit 200 is described.

Figure 4:
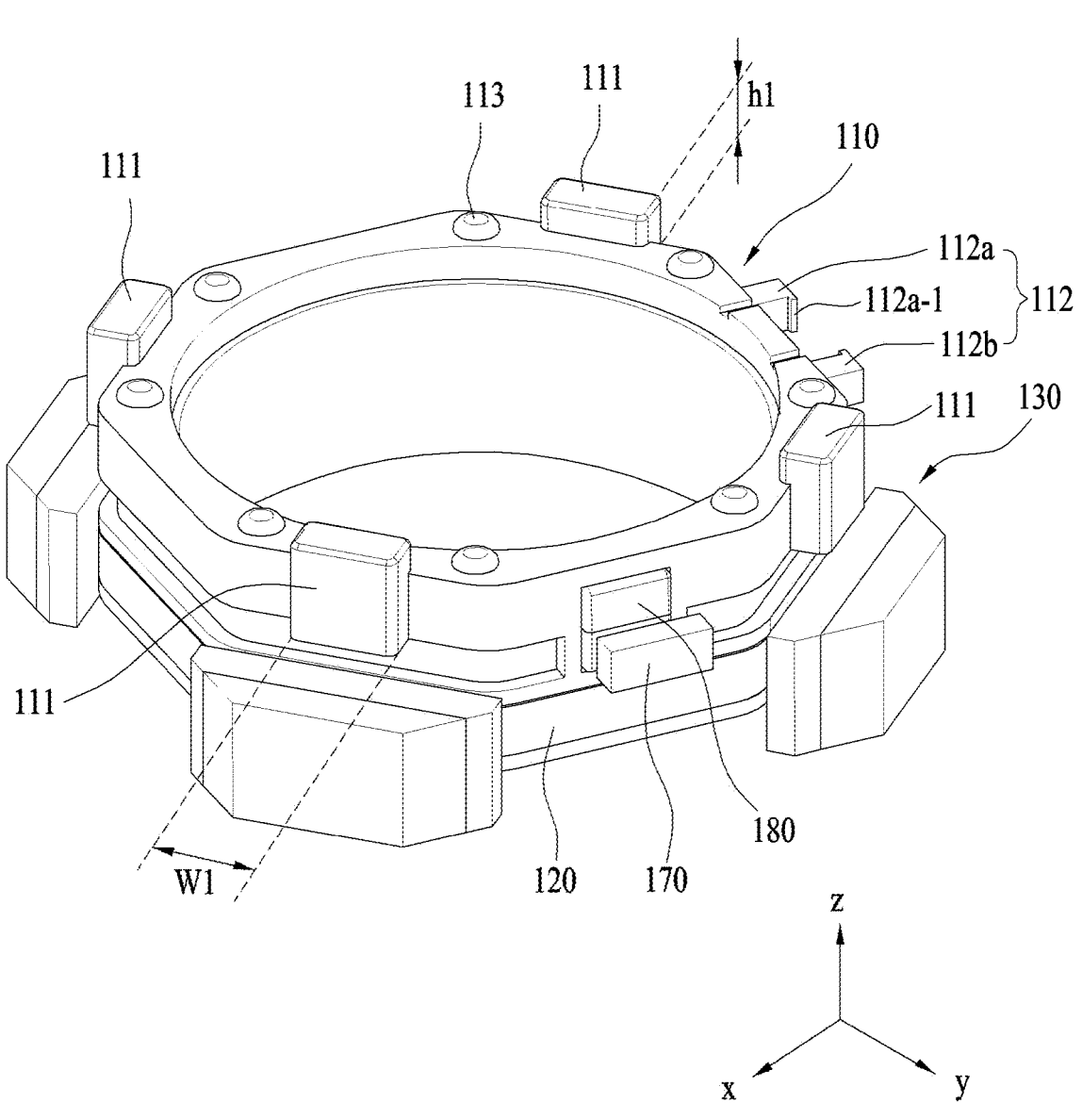
FIG. 4 is a perspective view of the lens moving apparatus according to an embodiment with a bobbin, a first coil, a first magnet, a first sensor, and a second magnet coupled.

FIG. 4 is a perspective view of the lens moving apparatus 1000 with the bobbin 110, the first coil 120, the first magnet 130, the first sensor 170, and the second magnet 180 coupled.

Figure 5:
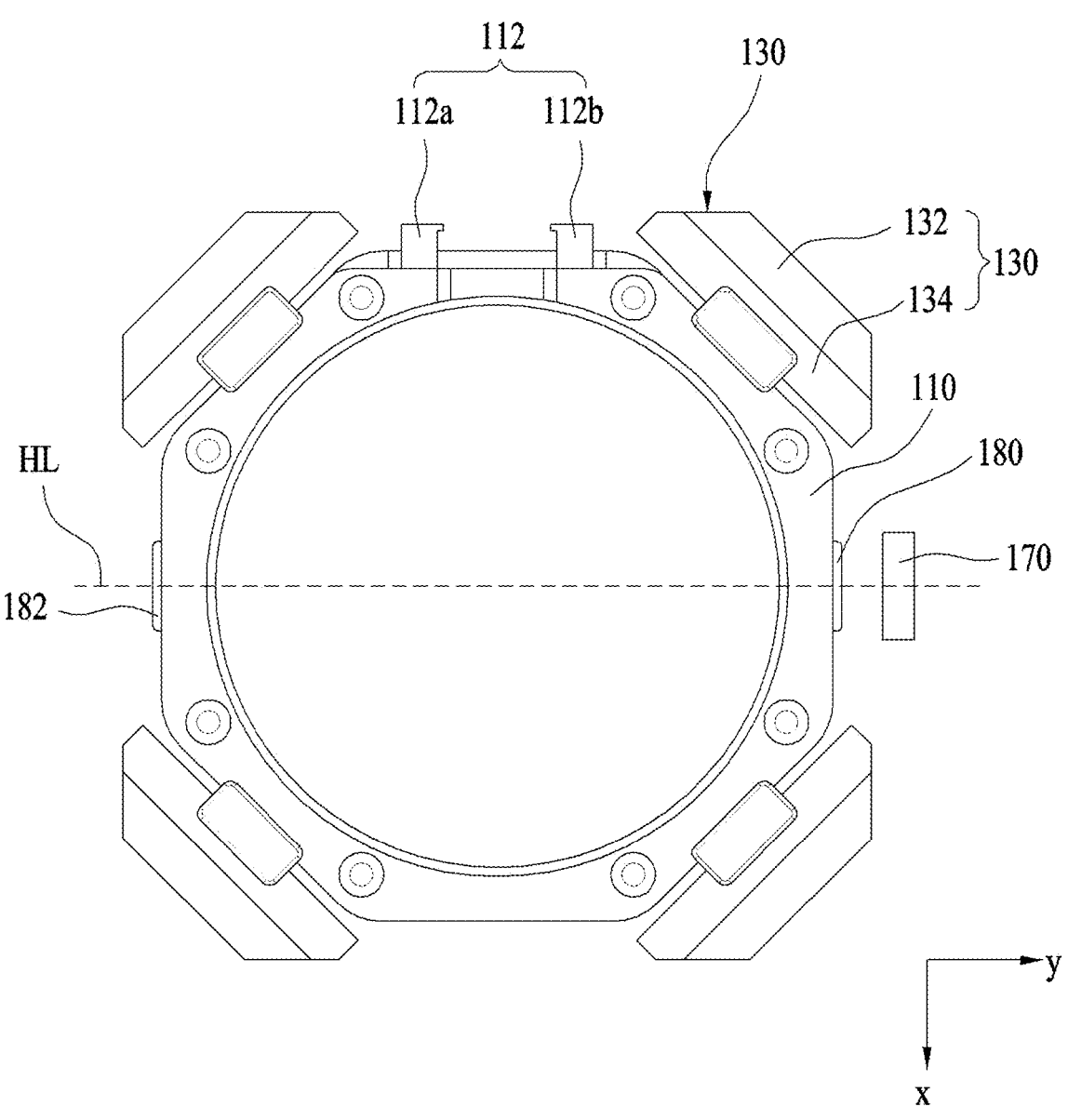
FIG. 5 is a plan view of the lens moving apparatus according to an embodiment with the bobbin, the first magnet, the first sensor, the second magnet, and a magnetic field compensation metal member coupled.

FIG. 5 is a plane view of the lens moving apparatus 1000 with the bobbin 110, the first magnet 130, the first sensor 170, the second magnet 180, and the magnetic field compensation metal member 182 coupled.

Referring to the above-mentioned figures, the bobbin 110 may be mounted in an inner space of the housing 140 such that the bobbin 110 can reciprocate in a direction parallel to a first direction, i.e. an optical axis direction.

The first coil 120 is mounted at the outer circumference of the bobbin 110, as shown in FIG. 4, such that the first coil 120 and the first magnet 130 can electromagnetically interact with each other. To this end, the first magnet 130 may be disposed around the bobbin 110 such that the first magnet 130 is opposite to the first coil 120.

In addition, when the bobbin 110 moves upward and/or downward in the first direction parallel to the optical axis to perform an auto focusing function, the bobbin 110 may be elastically supported by the upper and lower elastic members 150 and 160.

Although not shown, a lens barrel (not shown), in which at least one lens may be mounted, may be provided at the inside of the bobbin 110. The lens barrel may be mounted at the inside of the bobbin 110 in various manners. For example, a female thread may be formed at the inner circumference of the bobbin 110, and a male thread corresponding to the female thread may be formed at the outer circumference of the lens barrel such that the lens barrel can be coupled to the bobbin 110 through thread engagement between the lens barrel and the bobbin 110. However, the disclosure is not limited thereto.

In another embodiment, the lens barrel may be directly fixed to the inside of the bobbin 110 using a method other than thread engagement, or one or more lenses may be integrally formed at the bobbin 110 without the lens barrel. One lens may be coupled to the lens barrel, or two or more lenses may constitute an optical system.

Figure 6:
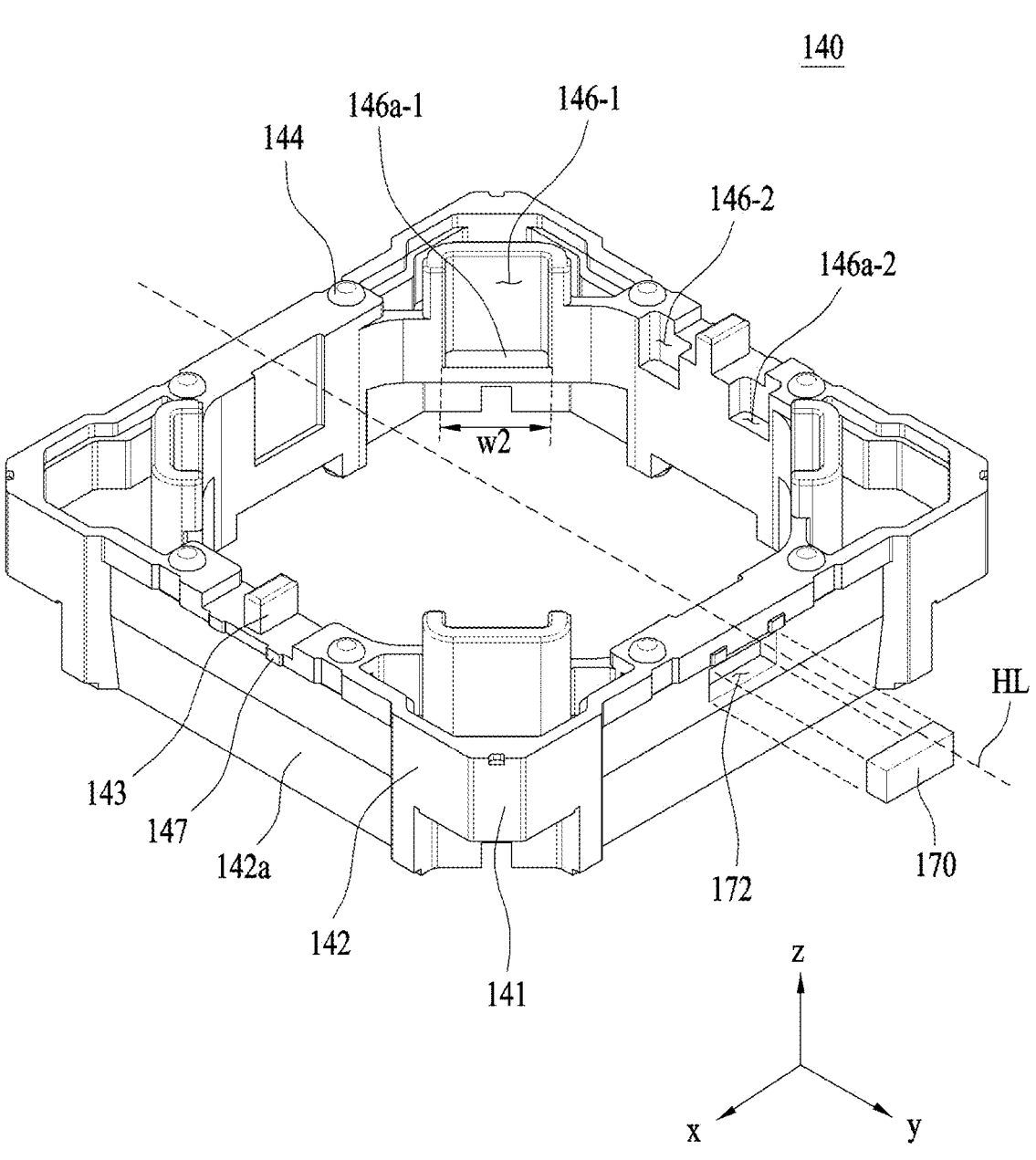
FIG. 6 is an exploded perspective view showing a housing and the first sensor according to an embodiment.
Figure 7:
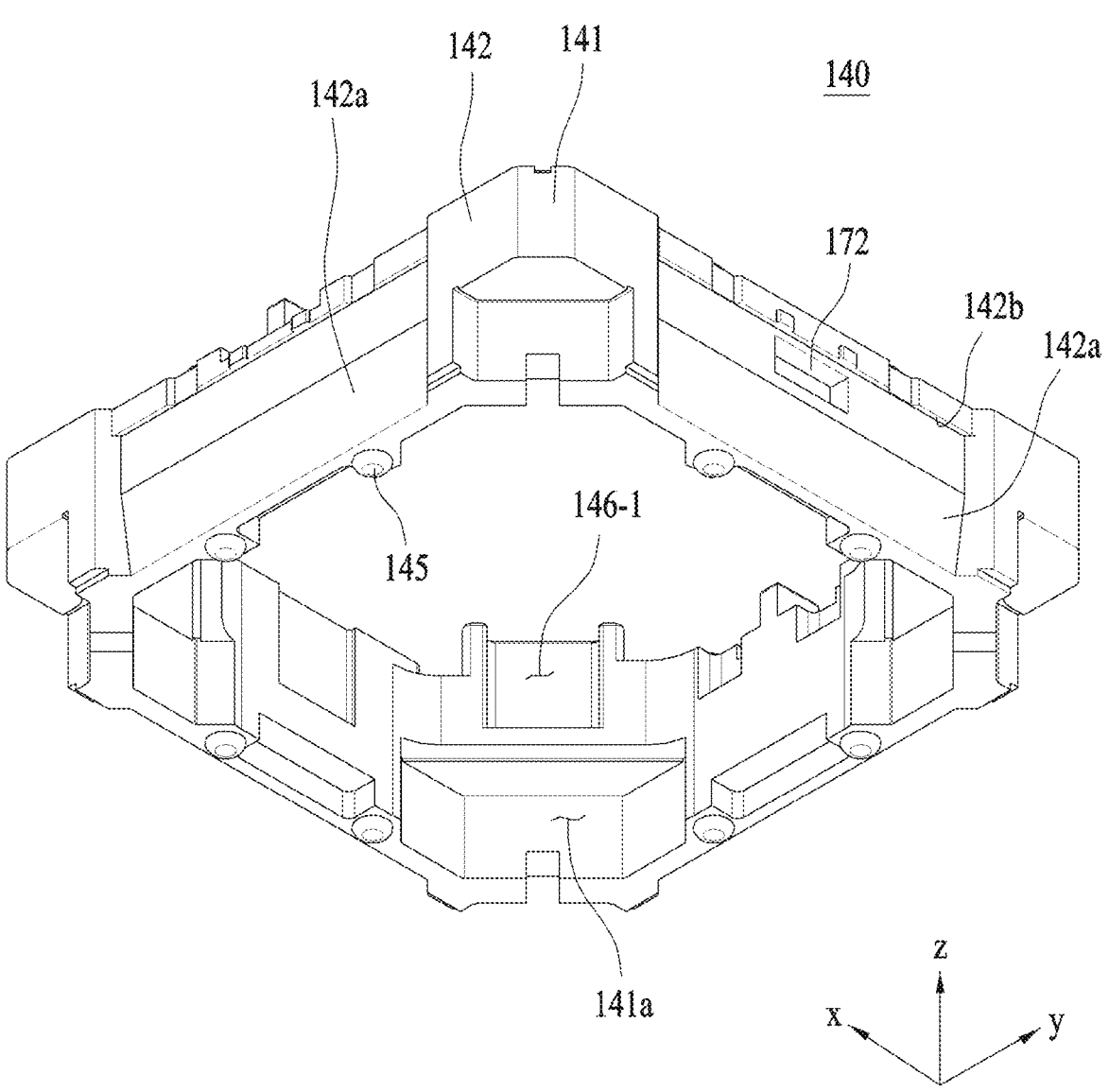
FIG. 7 is a rear perspective view of the housing.

FIG. 6 is an exploded perspective view showing the housing 140 and the first sensor 170, and FIG. 7 is a rear perspective view of the housing 140 according to the embodiment.

Referring to FIGS. 3 and 4, the bobbin 110 may include a first stopper 111 and a second stopper (or winding protrusion) 112.

The first stopper 111 may prevent the top surface of a body of the bobbin 110 from directly colliding with the inside of the cover member 300 shown in FIG. 1 although the bobbin 110 deviates from a prescribed range due to external impact when the bobbin 110 moves in the first direction, i.e. the direction parallel to the optical axis, to perform the auto focusing function.

In addition, referring to FIG. 3, the first stopper 111 may also function to guide a mounting position of the upper elastic member 150. According to this embodiment, as shown in FIG. 4, a plurality of first stoppers 111 may protrude upward by a first height h1. At least four stoppers 111 may each protrude in the form of a polygonal post.

In addition, as exemplarily shown, the first stoppers 111 may be symmetric with respect to the center of the bobbin 110. Alternatively, the first stoppers 111 may be asymmetrically arranged to avoid interference with other parts. In this case, as shown in FIG. 6, the housing 140 may include first location grooves 146-1 formed at portions corresponding to the first stoppers 111.

The second stopper (or winding protrusion) 112 may prevent the bottom surface of the body of the bobbin 110 from directly colliding with a base 210 and the top surface of a circuit board 250 although the bobbin 110 deviates from a prescribed range due to external impact when the bobbin 110 moves in the first direction, i.e. the direction parallel to the optical axis, to perform the auto focusing function. As shown in FIG. 4, the second stopper 112 includes two stoppers 112a and 112b. However, the number of the stoppers constituting the second stopper 112 is not particularly restricted.

According to this embodiment, the second stopper 112 may protrude from the outer circumference of the bobbin 110 in a circumferential direction. In this case, the housing 140 shown in FIG. 6 may include second location grooves 146-2 formed at portions corresponding to the stoppers 112*a* and 112*b* of the second stopper 112.

Referring to FIG. 6, in a case in which the first stoppers 111 are initially located on first bottoms 146*a*-1 of the first location grooves 146-1 in contact, the auto focusing function may be controlled like uni-directional control in a conventional voice coil motor (VCM). On the other hand, in a case in which the stoppers 112*a* and 112*b* of the second stopper 112 are initially located on second bottoms 146*a*-2 of the second location grooves 146-2 in contact, the auto focusing function may be controlled like uni-directional control in the conventional voice coil motor. That is, the bobbin 110 may move upward when current is supplied to the first coil 120, and bobbin 110 may move downward when no current is supplied to the first coil 120 to realize the auto focusing function.

However, in a case in which the first stoppers 111 are initially spaced apart from the first bottoms 146*a*-1 of the first location grooves 146-1, the auto focusing function may be controlled according to the direction of current like bi-directional control in the conventional voice coil motor. On the other hand, in a case in which the stoppers 112*a* and 112*b* of the second stopper 112 are initially spaced apart from the second bottoms 146*a*-2 of the second location grooves 146-2 by a predetermined distance, the auto focusing function may be controlled like bi-directional control in the conventional voice coil motor. That is, the bobbin 110 may move upward or downward in the direction parallel to the optical axis to realize the auto focusing function. For example, the bobbin 110 may move upward when forward current is supplied, and bobbin 110 may move downward when reverse current is supplied.

The first location grooves 146-1 of the housing 140 corresponding to the first stoppers 111 may be formed in the concave shape. A second width w2 of each of the first location grooves 146-1 shown in FIG. 6 may have more uniform tolerance than a first width W1 of each of the first stoppers 111 shown in FIG. 4. As a result, the rotation of the first stoppers 111 in the first location grooves 146-1 may be restricted. Even when force is applied the bobbin 110 in a direction in which the bobbin 110 is rotated about the optical axis, not in the optical axis direction, therefore, the first stoppers 111 may prevent the rotation of the bobbin 110. Of course, such a function of the first stopper 111 may be performed by the second stopper 112.

Figure 8:
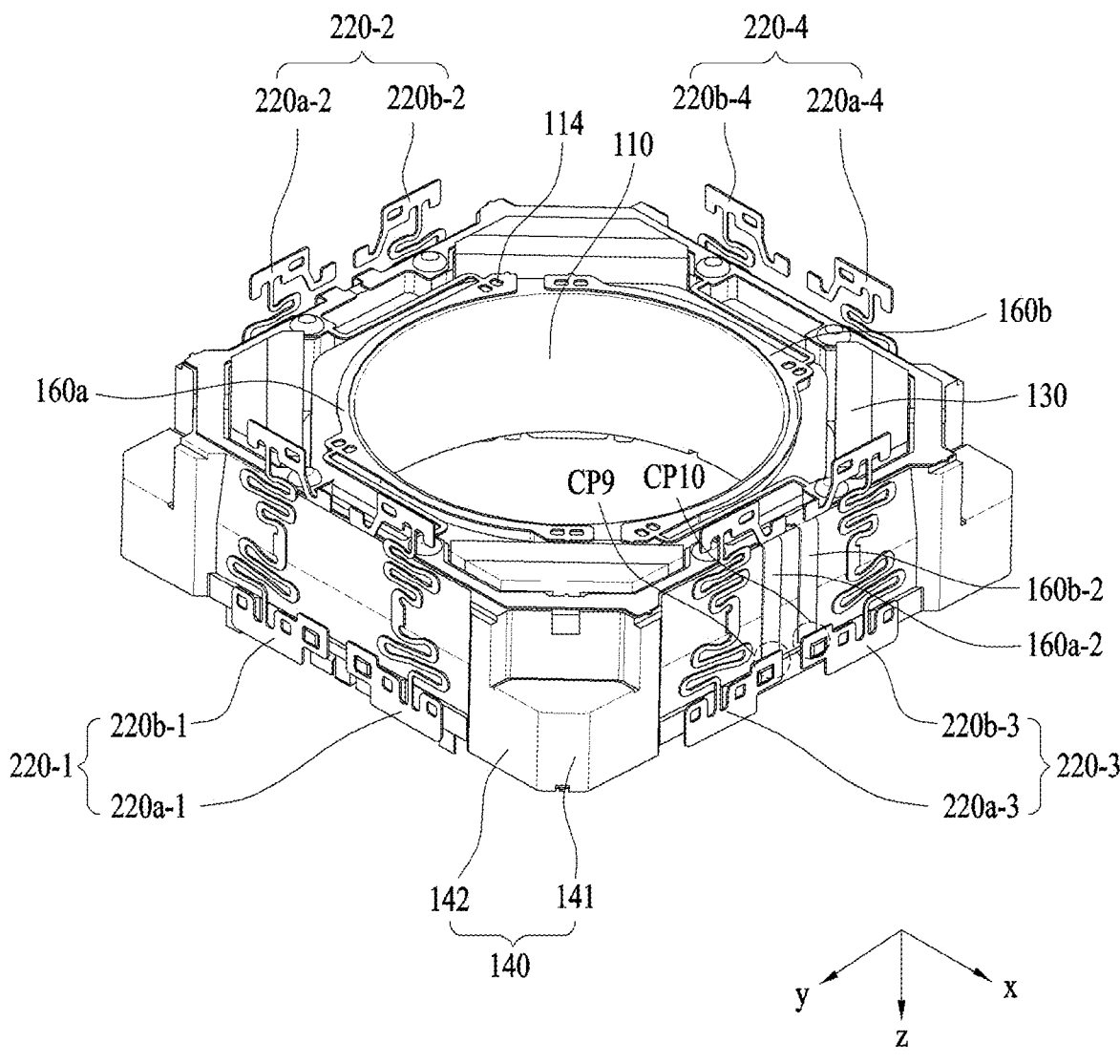
FIG. 8 is a rear perspective view of the lens moving apparatus according to an embodiment with the bobbin, the first magnet, the housing, a lower elastic member, and a plurality of support member pairs coupled.

FIG. 8 is a rear perspective view of the lens moving apparatus with the bobbin 110, the first magnet 130, the housing 140, the lower elastic member 160, and the support member pairs 220 coupled.

A plurality of upper support protrusions 113 shown in FIGS. 3 and 4 may be formed at the top surface of the bobbin 110, and a plurality of lower support protrusions 114 shown in FIG. 8 may be formed at the bottom surface of the bobbin 110.

As shown, the upper support protrusions 113 may each have a hemispherical shape. Alternatively, the upper support protrusions 113 may each have a cylindrical or prismatic shape. However, the disclosure is not limited thereto.

Figure 9:
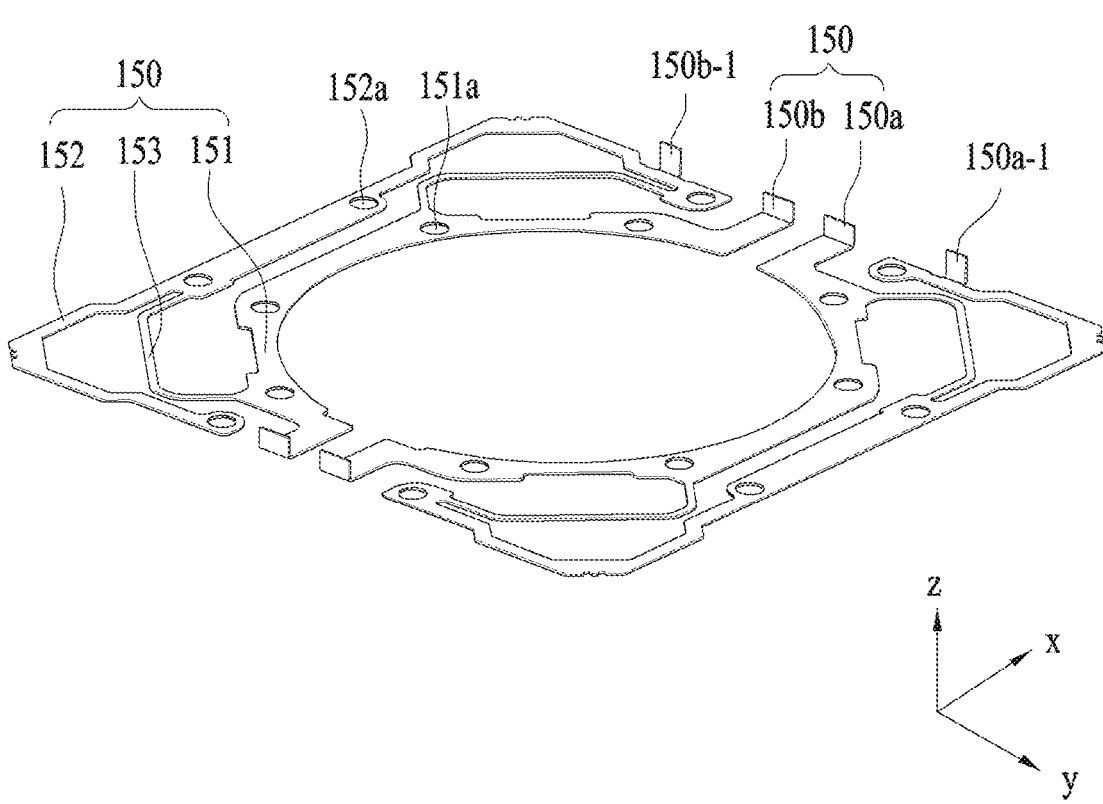
FIG. 9 is a perspective view of an upper elastic member according to an embodiment.

FIG. 9 is a perspective view of the upper elastic member 150 according to the embodiment.

Referring to 9, the upper elastic member 150 may include a first upper elastic member 150*a* and a second upper elastic member 150*b* electrically separated from each other, according to the embodiment. The first and second upper elastic members 150*a* and 150*b* may each include an inside frame 151 coupled to the bobbin 110, an outside frame 152 coupled to the housing 140, and a frame connection part 153 connected between the inside frame 151 and the outside frame 152. The frame connection part 153 may be bent at least once to form a predetermined pattern. The upward and/or downward movement of the bobbin 110 in the first direction parallel to the optical axis may be elastically supported by the change in position and minute deformation of the frame connection part 153.

After the inside frame 151 and the outside frame 152 are coupled to the bobbin 110 and the housing 140, respectively, opposite ends of the first coil 120 may be electrically connected to the first and second upper elastic members 150*a* and 150*b* by soldering, at the top surface adjacent to the pair of winding protrusions 112, on which the opposite ends of the first coil 120 are wound, which will hereinafter be described, such that power having different polarities can be supplied to the first and second upper elastic members 150*a* and 150*b*. To this end, the upper elastic member 150 may be divided into the first and second upper elastic members 150*a* and 150*b*.

In addition, the first upper elastic member 150*a* may further include a first support member contact part 150*a*-1, and the second upper elastic member 150*b* may further include a second support member contact part 150*b*-1. The first and second support member contact parts 150*a*-1 and 150*b*-1 may protrude from the outside frame 152. As shown in FIG. 9, the first and second support member contact parts 150*a*-1 and 150*b*-1 may protrude in the first indirection, i.e. the optical axis direction. However, the disclosure is not limited to a particular direction into which the first and second support member contact parts 150*a*-1 and 150*a*-2 are protruded.

Referring back to FIGS. 3 and 4, the upper support protrusions 113 may fix the inside frame 151 of the upper elastic member 150 and the bobbin 110 shown in FIG. 9 by coupling. According to this embodiment, the inside frame 151 may be provided at portions thereof corresponding to the upper support protrusions 113 with first through holes 151*a*.

The upper support protrusions 113 and the first through holes 151*a* may be fixed by thermal fusion or using an adhesive member, such as epoxy.

In addition, the distance between the upper support protrusions 113 may be approximately set within a range capable of avoiding interference with peripheral parts. That is, the upper support protrusions 113 may be arranged at uniform intervals in a state in which the upper support protrusions 113 are symmetric with respect to the center of the bobbin 110. Alternatively, the upper support protrusions 113 may be arranged symmetrically with respect to a specific imaginary line passing through the center of the bobbin 110 although the distance between the upper support protrusions 113 is not uniform.

The upper elastic member 150 shown in FIG. 9 may include the first and second upper elastic members 150*a* and 150*b* electrically separated from each other to function as terminals for supplying current to the first coil 120. In order to fix the divided first and second upper elastic members 150*a* and 150*b*, a sufficient number of upper support protrusions 113 may be provided. Consequently, incomplete coupling between the first and second upper elastic members 150*a* and 150*b* and the bobbin 110 may be prevented.

Figure 10:
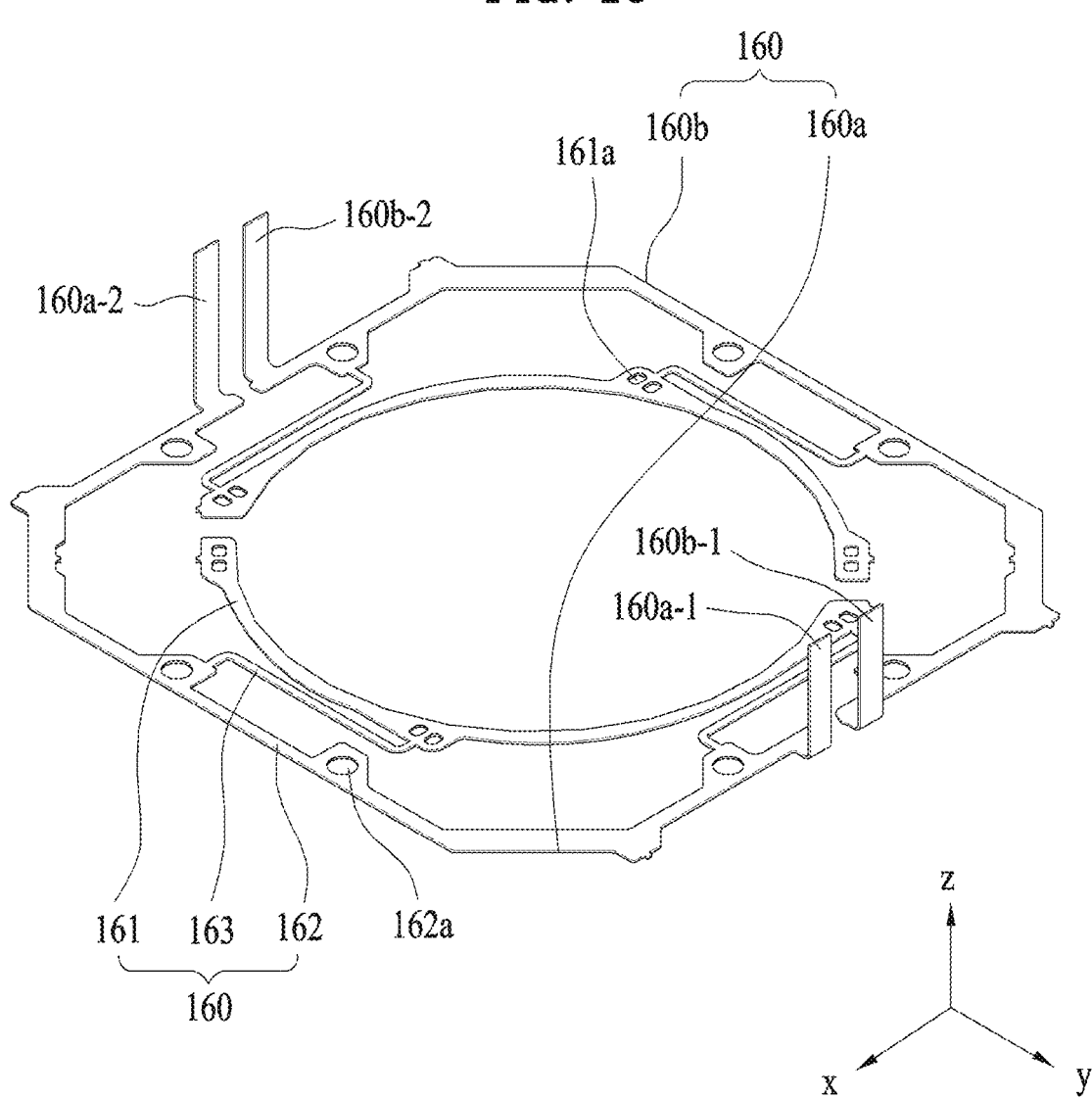
FIG. 10 is a perspective view of the lower elastic member according to an embodiment.

FIG. 10 is a perspective view of the lower elastic member 160 according to the embodiment.

Referring to FIG. 10, the lower elastic member 160 may include first and second lower elastic members 160*a* and 160*b*, according to the embodiment.

The first and second lower elastic members 160*a* and 160*b* may each include an inside frame 161 coupled to the bobbin 110, an outside frame 162 coupled to the housing 140, and a frame connection part 163 connected between the inside frame 161 and the outside frame 162. The frame connection part 163 may be bent at least once to form a predetermined pattern. The upward and/or downward movement of the bobbin 110 in the first direction parallel to the optical axis may be elastically supported by the change in position and minute deformation of the frame connection part 163.

In addition, the first lower elastic member 160*a* may include at least one first sensor contact part, and the second lower elastic member 160*b* may include at least one second sensor contact part. Two first sensor contact parts 160*a*-1, 160*a*-2 and two second sensor contact parts 160*b*-1 and 160*b*-2 are shown in FIG. 10. However, the disclosure is not limited to a specific shape of the first and second sensor contact parts.

The first sensor contact parts 160*a*-1 and 160*a*-2 and the second sensor contact parts 160*b*-1 and 160*b*-2 may protrude from the outside frame 162. In FIG. 10, the first sensor contact parts 160*a*-1 and 160*a*-2 and the second sensor contact parts 160*b*-1 and 160*b*-2 are shown as protruding from the outside frame 162 in the first direction. However, the disclosure is not limited thereto.

Since the lower elastic member 160 are divided into two parts as described above, as a sufficient number of lower support protrusions 114 as the upper support protrusions 113 may be provided to prevent a loosening phenomenon which may occur when the lower elastic member 160 is separated.

In a case in which the lower elastic member 160 is a single body instead of the divided shape, it is not necessary to provide as a large number of lower support protrusions 114 as the upper support protrusions 113. This is because it is possible to stably couple the lower elastic member 160 to the bobbin 110 even using a small number of lower support protrusions 114.

In a case in which the lower elastic member 160 is divided into the first and second lower elastic members 160*a* and 160*b* which are electrically separated from each other as in the embodiment, however, a sufficient number of lower support protrusions 114 may be provided to fix the first and second lower elastic members 160*a* and 160*b*. Consequently, incomplete coupling between the first and second lower elastic members 160*a* and 160*b* and the bobbin 110 may be prevented.

Referring back to FIG. 8, the lower support protrusions 114 may each have a hemispherical shape like the upper support protrusions 113. Alternatively, the lower support protrusions 114 may each have a cylindrical or prismatic shape. However, the disclosure is not limited thereto. The lower support protrusions 114 may fix the inside frame 161 of the lower elastic member 160 and the bobbin 110 by coupling.

In addition, the first and second lower elastic members 160*a* and 160*b* electrically separated from each other may function as terminals for supplying current to the first coil 120 instead of the first and second upper elastic members 150*a* and 150*b*.

The reason that the lower elastic member 160 is divided as described above will be discussed in detail when the support member pairs 220 are described.

According to this embodiment, the inside frames 161 of the first and second lower elastic members 160*a* and 160*b* may be provided at portions thereof corresponding to the lower support protrusions 114 with second through holes 161*a*. The lower support protrusions 114 and the second through holes 161*a* may be fixed by thermal fusion or using an adhesive member, such as epoxy.

In addition, the distance between the lower support protrusions 114 may be approximately set within a range capable of avoiding interference with peripheral parts. That is, the lower support protrusions 114 may be arranged at uniform intervals in a state in which the lower support protrusions 114 are symmetric with respect to the center of the bobbin 110.

The upper elastic member 150 and the lower elastic member 160 may each be a leaf spring. However, the disclosure is not limited thereto.

Referring back to FIGS. 4 and 5, the winding protrusions (or second stoppers) 112 may be formed with being protruded from the upper outer circumference of the bobbin 110. Opposite ends, i.e. a start portion and an end portion, of the first coil 120 may be wound on the winding protrusions 112. At the top surface of the bobbin 110 adjacent to the winding protrusions 112, the ends of the first coil 120 may be electrically connected to the top surface of the upper elastic member 150 by a conductive connection member, such as solder (S).

In addition, as shown in FIG. 4, the winding protrusions 112 may be adjacent to each other at one side of the bobbin 110. Alternatively, a pair of winding protrusions 112 may be arranged in bilateral symmetry with respect to the center of the bobbin 110.

A catching projection 112*a*-1 may be formed at the end of each of the winding protrusions 112 for preventing separation of the wound first coil 120 or guiding the position of the first coil 120. As shown, the catching projection 112*a*-1 may be formed such that the width of each winding protrusion 112 protruding from the outer circumference of the bobbin 110 gradually increases. The catching projection 112*a*-1 may have a step structure formed at the end thereof.

Meanwhile, the bobbin 110, the housing 140, and the upper and lower elastic members 150 and 160 may be assembled by thermal fusion and/or bonding using an adhesive. At this time, the fixing operation may be completed by bonding using an adhesive after thermal fusion according to the assembly order.

For example, in a case in which the bobbin 110 and the inside frame 161 of the lower elastic member 160 are assembled firstly, and the housing 140 and the outside frame 162 of the lower elastic member 160 are assembled secondly, the lower support protrusions 114 of the bobbin 110, the second through holes 161*a* coupled to the lower support protrusions 114 of the bobbin 110, and third through holes 162*a* coupled to lower frame support protrusions 145 of the housing 140 may be fixed by thermal fusion. In a case in which the bobbin 110 and the inside frame 151 of the upper elastic member 150 are assembled thirdly, the upper support protrusions 113 of the bobbin 110 and the first through holes 151*a* coupled thereto may be fixed by thermal fusion. In a case in which the housing 140 and the outside frame 152 of the upper elastic member 150 are fixed fourthly, fourth through holes 152*a* coupled to upper frame support protrusions 144 of the housing 140, which will hereinafter be described, may be bonded using an adhesive member, such as epoxy. However, the assembly order may be changed. For example, thermal fusion may be performed at the first to third assembly processes, and bonding may be performed at the fourth fixing process. Thermal fusion may cause deformation, such as twist. For this reason, bonding may be performed at the final step in order to make up for the deformation.

Meanwhile, the first coil 120 may be wound on the outer circumference of the bobbin 110 by a worker or a machine, and then the start portion and the end portion of the first coil 120 may be wound on the winding protrusions 112 for fixing. At this time, the worker may change the position of the end of the first coil 120 wound on a corresponding one of the winding protrusions 112.

The first coil 120 may be a coil block having a ring shape or a polygonal shape which can be fitted onto the outer circumference of the bobbin 110 in an intercalative binding shape. However, the disclosure is not limited thereto. The first coil 120 may be directly wound on the outer circumference of the bobbin 110. In any case, the start portion and the end portion of the first coil 120 may be wound on the winding protrusions 112 for fixing. Other configurations are the same.

As shown in FIG. 2, the first coil 120 may have approximately an octagonal shape, which corresponds to the shape of the outer circumference of the bobbin 110. The bobbin 110 may also have an octagonal shape. In addition, at least four sides of the first coil 120 may be straight, and corners connected between the respective sides may be straight. However, the disclosure is not limited thereto. The sides and corners of the first coil 120 may be round.

Each straight portion of the first coil 120 may be a portion facing the first magnet 130. In addition, the surface of the first magnet 130 facing the first coil 120 may have the same curvature as the first coil 120. That is, in a case in which the first coil 120 is straight, the surface of the first magnet 130 facing the first coil 120 may be straight. On the other hand, in a case in which the first coil 120 is curved, the surface of the first magnet 130 facing the first coil 120 may be curved. In addition, even in a case in which in a case in which the first coil 120 is curved, the surface of the first magnet 130 facing the first coil 120 may be straight and vice versa.

The first coil 120 moves the bobbin 110 in the direction parallel to the optical axis to perform the auto focusing function. When current is supplied to the first coil 120, the first coil 120 may interact with the first magnet 130 to form electromagnetic force such that the bobbin 110 can be moved by the electromagnetic force.

The first coil 120 may be configured to correspond to the first magnet 130. In a case in which the first magnet 130 is a single body such that the entirety of the surface of the first magnet 130 facing the first coil 120 has the same polarity, the first coil 120 may also be configured such that the surface of the first coil 120 facing the first magnet 130 has the same polarity.

On the other hand, in a case in which the first magnet 130 is divided into two or four parts by surfaces perpendicular to the optical axis, and therefore the surface of the first magnet 130 facing the first coil 120 is divided into two or more surfaces, the first coil 120 may also be divided into parts corresponding to the number of the divided first magnets 130.

The first magnet 130 may be mounted at a position corresponding to the first coil 120. According to this embodiment, the first magnet 130 may be mounted at each corner of the housing 140 as shown in FIG. 8. The first magnet 130 may have a shape corresponding to the corner of the housing 140. The first magnet 130 may have approximately a trapezoidal shape. The surface of the first magnet 130 facing the first coil 120 may be formed to correspond to the curvature of the corresponding surface of the first coil 120.

The first magnet 130 may be a single body. In this embodiment, one surface of the first magnet 130 facing the first coil 120 may have an N pole 134, and the other surface of the first magnet 130 may have an S pole 132. However, the disclosure is not limited thereto. Opposite configuration is also possible.

At least two first magnets 130 may be mounted. According to this embodiment, four first magnets 130 may be mounted. As shown in FIG. 5, each first magnet 130 may have a trapezoidal shape when viewed from above. Alternatively, each first magnet 130 may have a triangular shape.

The surface of each first magnet 130 facing the first coil 120 may be straight. However, the disclosure is not limited thereto. In a case in which, the corresponding surface of the first coil 120 is curved, the surface of each first magnet 130 facing the first coil 120 may be curved at a corresponding curvature. In this case, the distance between each first magnet 130 and the first coil 120 may be uniformly maintained. According to this embodiment, one first magnet 130 may be mounted at each of four corners of the housing 140. However, the disclosure is not limited thereto. According to design, one selected from the first magnet 130 and the first coil 120 may be straight, and the other may be curved. Alternatively, both the facing surfaces of the first coil 120 and the first magnet 130 may be curved. At this time, the facing surfaces of the first coil 120 and the first magnet 130 may have the same curvature.

In a case in which each first magnet 130 has a trapezoidal shape when viewed from above as shown in FIG. 5, one pair of first magnets 130 may be arranged parallel to each other in a second direction, and another pair of first magnets 130 may be arranged parallel to each other in a third direction. In this arrangement structure, movement of the housing 140 may be controlled for optical image stabilization, which will hereinafter be described.

The housing 140 may have a polygonal shape when viewed from above. According to this embodiment, as shown in FIGS. 6 and 7, the housing 140 may have an octagonal shape when viewed from above. Consequently, the housing 140 may have a plurality of sides. For example, in case that the housing 140 may have the octagonal shape when viewed from above, the housing 140 may have eight sides. The sides may be divided into first sides 141 and second sides 142. The first sides 141 may have sides at which the first magnets 130 are mounted, and the second sides 142 may have sides at which the support member pairs 220, which will hereinafter be described, are disposed. To this end, a plurality of first sides 141 may be connected to each second side 142, and each second side 142 may be a flat surface having a predetermined depth.

The first sides 141 may be formed at the corners of the housing 140. According to this embodiment, each first side 141 may have a size equal to or greater than that of a corresponding one of the first magnets 130. Referring to FIG. 7, each first magnet 130 may be fixed to a magnet location part 141a formed at the inside of a corresponding one of the first sides 141 of the housing 140. The magnet location part 141a may be a groove corresponding to the size of each first magnet 130. The magnet location part 141a may face at least three surfaces, i.e. opposite side surfaces and the top surface, of each first magnet 130. An opening may be formed at the bottom surface of the magnet location part 141a, i.e. the surface of the magnet location part 141a facing a second coil 230, which will hereinafter be described, such that the bottom surface of the each first magnet 130 directly faces the second coil 230.

Each first magnet 130 may be fixed to the magnet location part 141a using an adhesive. However, the disclosure is not limited thereto. Each first magnet 130 may be fixed to the magnet location part 141a using an adhesive member, such as a double-sided tape. Alternatively, the magnet location part 141a may be formed as a mounting hole, in which a portion of each first magnet 130 is inserted or exposed, instead of the groove shown in FIG. 7.

Each first side 141 may be parallel to the side of the cover member 300. In addition, each first side 141 may have a larger size than each second side 142.

Meanwhile, as shown in FIGS. 6 and 7, each second side 142 may have an escape groove 142a having a predetermined depth and having a concave shape. The escape groove 142a will be discussed in detail when the support member pairs 220 are described.

In addition, a plurality of third stoppers 143 may protrude from the top surface of the housing 140. The third stoppers 143 may prevent collision between the cover member 300 and the body of the housing 140. Specifically, the third stoppers 143 may prevent the top surface of the housing 140 from directly colliding with the inside of the cover member 300 when an external impact is applied to the lens moving apparatus. In addition, as shown in FIG. 3, the third stoppers 143 may also function as guides for separating the first and second upper elastic members 150a and 150b from each other.

In addition, a plurality of upper frame support protrusions 144, to which the outside frame 152 of the upper elastic member 150 is coupled, may be formed at the upper side of the housing 140. The number of the upper frame support protrusions 144 may be greater than that of the upper support protrusions 113. This is because the length of the outside frame 152 is greater than that of the inside frame 151. The outside frame 152 of the upper elastic member 150 may be provided with fourth through holes 152a corresponding to the upper frame support protrusions 144. The upper frame support protrusions 144 may be fixed in the fourth through holes 152a using an adhesive or by thermal fusion.

In addition, as shown in FIG. 7, a plurality of lower frame support protrusions 145, to which the outside frame 162 of the lower elastic member 160 is coupled, may be formed in a protrusion shape at the lower side of the housing 140.

The number of the lower frame support protrusions 145 may be greater than that of the lower support protrusions 114. This is because the length of the outside frame 162 of the lower elastic member 160 is greater than that of the inside frame 161.

As shown in FIG. 10, the outside frame 162 of the lower elastic member 160 may be provided with third through holes 162a corresponding to the lower frame support protrusions 145. The lower frame support protrusions 145 may be fixed in the third through holes 162a using an adhesive or by thermal fusion.

Although not shown, a fourth stopper may be further provided at the lower side of the housing 140. The fourth stopper may protrude from the bottom surface of the housing 140. The fourth stopper may prevent the bottom surface of the housing from colliding with the base 210 and/or the circuit board 250, which will hereinafter be described. In addition, in an initial state or during normal operation, the fourth stopper may remain spaced apart from the base 210 and/or the circuit board 250 by a predetermined distance. As a result, the housing 140 may be spaced apart in an upper direction from the base 210 and in a lower direction from the cover member 300 such that the height of the housing 140 in the optical axis direction can be maintained by the support member pairs 220, which will hereinafter be described, without upper and lower interference. Consequently, the housing 140 may perform a shifting operation in the second direction and the third direction, which are a forward and backward direction and a left and right direction, respectively, on a plane perpendicular to the optical axis. The shifting operation will hereinafter be described.

The first lens moving unit 100 may sense the position of the bobbin 110 in the optical axis direction, i.e. a z-axis direction, and give feedback of the sensed position to the outside through the circuit board 250 to accurately control the movement of the bobbin 110. To this end, the first lens moving unit 100 may further include the first sensor 170 and the second magnet 180.

The first sensor 170 may be supported by the housing 140. To this end, a first sensor location groove 172 may be provided at the side of the housing 140. The first sensor 170 may be disposed in the first sensor location groove 172 to sense the movement of the bobbin 110 in the first direction. To this end, the first sensor 170 may include a plurality of pins.

At least one surface of the first sensor location groove 172 may be tapered such that epoxy can be easily injected to assemble the first sensor 170. In addition, no epoxy may be injected into the first sensor location groove 172 or epoxy may be injected to fix the first sensor 170. Referring to FIGS. 5 and 6, the first sensor location groove 172 may be disposed on the same line as the second magnet 180. Consequently, the center of the first sensor 170 may be aligned with that of the second magnet 180.

For example, as shown in FIG. 6, the first sensor 170 may be inserted and supported in the housing 140. Alternatively, the first sensor 170 may be attached to and supported by the housing 140 using an adhesive member, such as epoxy or a doubles-sided tape.

The first sensor 170 may be a hall sensor. Any sensor capable of sensing the change of magnetic force may be used as the first sensor 170.

Referring to FIGS. 4 and 5, the second magnet 180 may be attached to the outer circumference of the bobbin 110 such that the second magnet 180 is opposite to the first sensor 170. According to this embodiment, the second magnet 180 may be disposed between the first magnets 130 arranged at intervals in the circumferential direction of the bobbin 110 to minimize interference between the first magnets 130 and the second magnet 180. In addition, the second magnet 180 may be disposed above the first coil 120 wound on the bobbin 110. However, the disclosure is not limited thereto.

Figure 11:
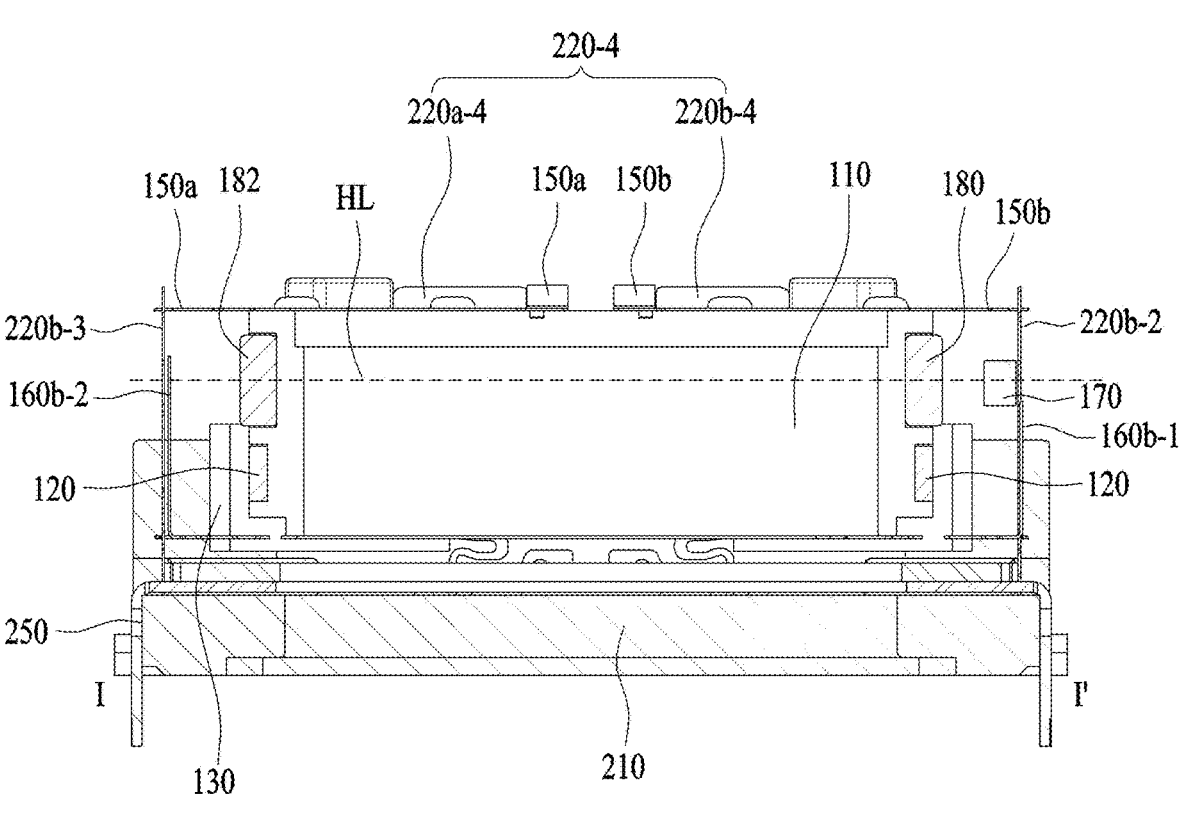
FIG. 11 is a sectional view taken along line I-I' of FIG. 3.

FIG. 11 is a sectional view taken along line I-I' of FIG. 3. The housing 140 is omitted from FIG. 11 for the convenience of description.

In a case in which the second magnet 180 is disposed, interaction between the first magnets 130 and the first coil 120 may be interfered by the second magnet 180 because the magnetic field is induced by the second magnet 180. According to this embodiment, therefore, the first lens moving unit 100 may further include the magnetic field compensation metal member 182 for minimizing the interference of interaction between the first magnets 130 and the first coil 120.

Referring to FIGS. 5 and 11, the magnetic field compensation metal member 182 may be disposed at the outer circumference of the bobbin 110 such that the magnetic field compensation metal member 182 is opposite to the second magnet 180 in a symmetric fashion. That is, the magnetic field compensation metal member 182 and the second magnet 180 may be located on the same line HL in the third direction, i.e. a y-axis direction, to minimize the interference of interaction between the first magnets 130 and the first coil 120.

According to this embodiment, the magnetic field compensation metal member 182 may be made of a metal. Specifically, the magnetic field compensation metal member 182 may be made of a magnetic material, such as a magnetic body or a magnet.

According to circumstances, the first lens moving unit 100 may not include the first sensor 170, the second magnet 180, and the magnetic field compensation metal member 182. Alternatively, the first lens moving unit 100 may further include various devices for improving the auto focusing function of the first lens moving unit 100 in addition to the first sensor 170. In this case, arrangement of the devices or a method or process of receiving power from the circuit board 250 and supplying a necessary signal to the circuit board 250 may be identical to that for the first sensor 170.

Referring back to FIG. 2, the second lens moving unit 200, which functions as the optical image stabilizer as previously described, may include a first lens moving unit 100, a base 210, a plurality of support member pairs 220, a second coil 230, and a second sensor 240, and a circuit board 250.

The first lens moving unit 100 may have the same configuration as described above. However, the first lens moving unit 100 may be replaced by an optical system having an auto focusing function different from the above configuration. That is, the first lens moving unit 100 may be constituted by an optical module using a single lens moving actuator or a reflective index variable type actuator instead of using a voice coil motor type auto focusing actuator. That is, any optical actuator capable of performing an auto focusing function may be used as the first lens moving unit 100. However, it is necessary to mount the first magnets 130 at positions corresponding to the second coil 230.

Figure 12:
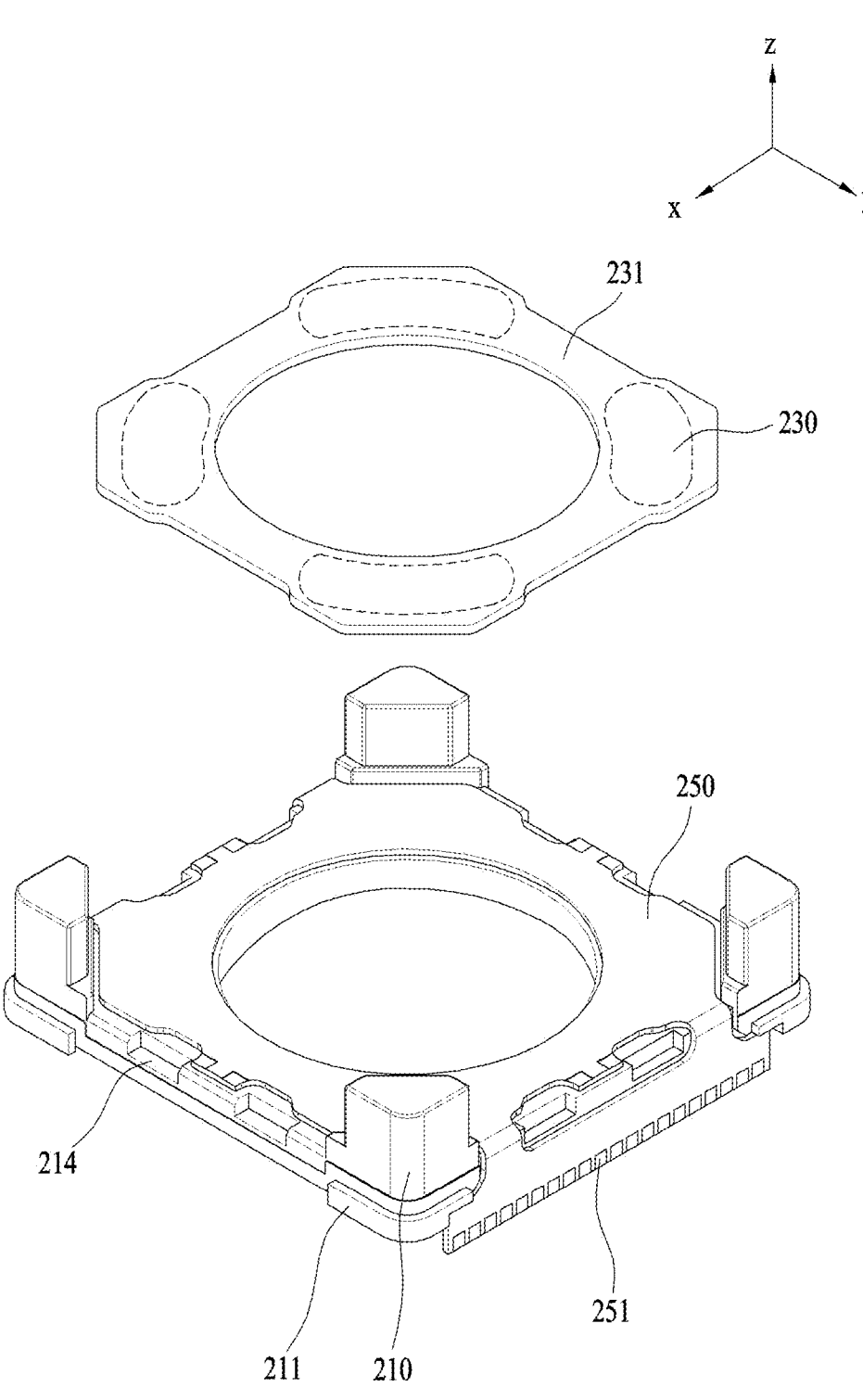
FIG. 12 is a partially assembled perspective view of a second coil, a circuit board, and a base, according to an embodiment.
Figure 13:
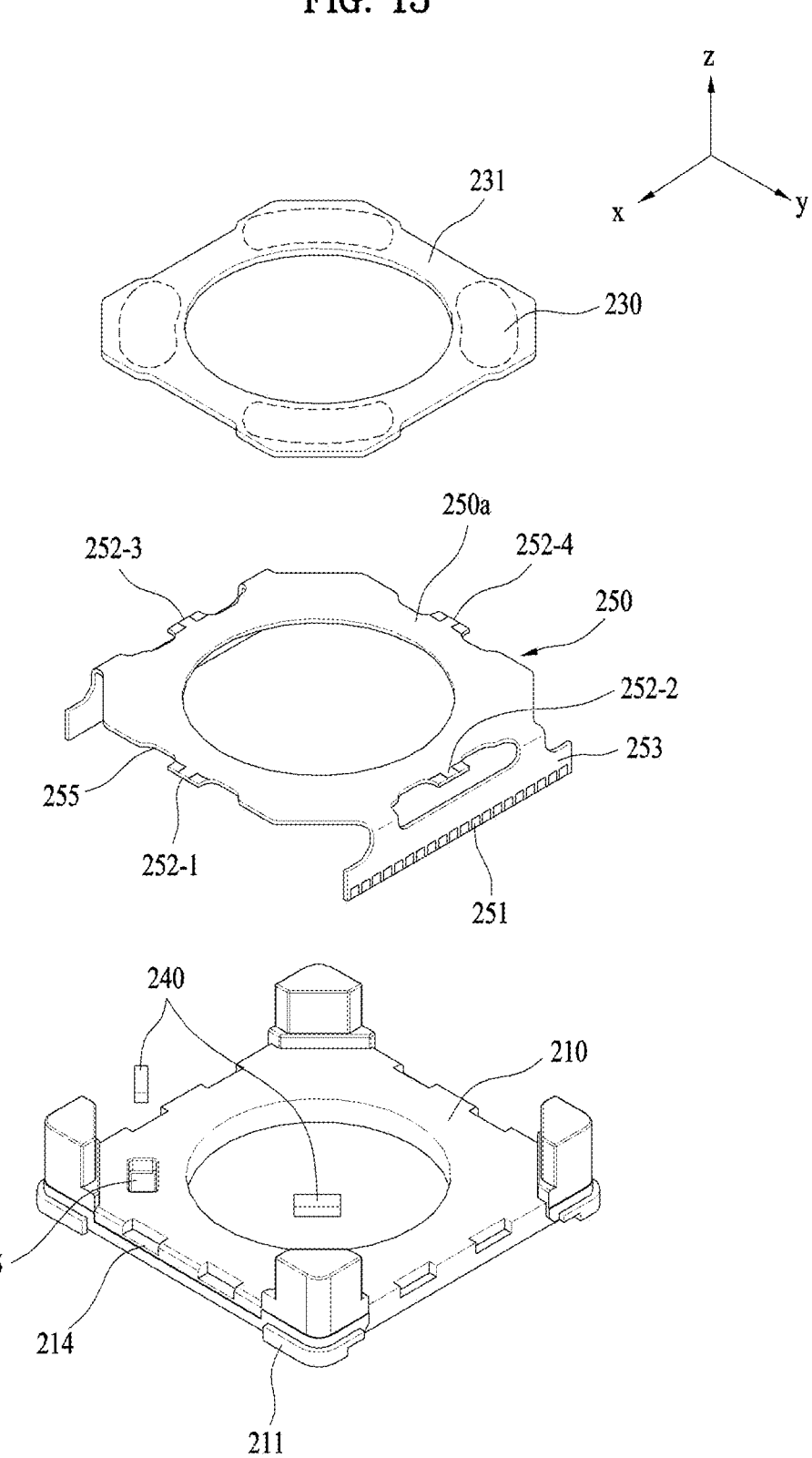
FIG. 13 is an exploded perspective view of the second coil, the circuit board, and the base, according to an embodiment.

FIG. 12 is a partially assembled perspective view of the second coil 230, the circuit board 250, and the base 210, and FIG. 13 is an exploded perspective view of the second coil 230, the circuit board 250, and the base 210.

As shown in FIG. 2, the base 210 of the second lens moving unit 200 may have a quadrangular shape when viewed from above. The support member pairs 220 may be fixed to straight sides of the base 210. As shown in FIGS. 12 and 13, the base 210 may be provided with steps 211, to which an adhesive may be applied to fix the cover member 300 to the base 210. The bottom surfaces of the steps 211 may come into surface contact with the end of the cover member 300.

The base 210 may be spaced apart from the first lens moving unit 100 by a predetermined distance. The base 210 may be provided at a surface thereof facing a portion at which a terminal 251 of the circuit board 250 is formed with a support groove having a corresponding size. The support groove may be depressed inward from the outer circumference of the base 210 by a predetermined depth for restricting a terminal surface 253 at which the terminal 251 is formed not to protrude outward or adjusting the protruding length of the terminal surface 253. The steps 211 may guide the cover member 300 coupled to the upper side thereof. In addition, the end of the cover member 300 may be coupled to the steps 211 in surface contact. The steps 211 and the end of the cover member 300 may be fixed and sealed using an adhesive.

The base 210 may be provided at the edge of the top surface thereof with support member location grooves 214 having a concave shape, into which the support member pairs 220 are inserted. An adhesive may be applied to the support member location grooves 214 to securely fix the support member pairs 220. The ends of the support member pairs 220 may be inserted or disposed in the support member location grooves 214 and then fixed using an adhesive. A plurality of support member location grooves 214 or at least one support member location groove 214 may be formed at the straight sides of the base 210 at which the support member pairs 220 are mounted. The support member location grooves 214 may each have approximately a quadrangular shape.

In addition, as shown in FIG. 13, two support member location grooves 214 may be provided at each straight side of the base 210. The number of the support member location grooves 214 may be increased or decreased according to the shape of the support member pairs 220. For example, one support member location groove or three or more support member location grooves may be provided at each straight side of the base 210. In this embodiment, two support member location grooves 214 are provided at each straight side of the base 210 such that ends of first and second support members of the support member pairs 220 can be inserted or disposed in the support member location grooves 214.

In addition, the base 210 may be provided at the top surface thereof with a second sensor location groove 215 in which the second sensor 240 is disposed. According to this embodiment, two second sensor location grooves 215 may be provided, and the second sensor 240 may be disposed in each second sensor location groove 215 for sensing movement of the housing 140 in the second and third directions. To this end, the two second sensor location grooves 215 may be arranged such that an angle between imaginary lines interconnecting the second sensor location grooves 215 and the center of the base 210 is 90 degrees.

At least one surface of each second sensor location groove 215 may be tapered such that epoxy can be easily injected to assemble the second sensor 240. In addition, no epoxy may be injected into each second sensor location groove 215 or epoxy is injected to fix the second sensor 240. The second sensor location grooves 215 may be disposed at the center or near the center of the second coil 230. Alternatively, the center of the second coil 230 may be aligned with that of the second sensor 240. According to this embodiment, the second sensor location grooves 215 may be disposed at the corners of the base 210 to minimize interference with the support member pairs 220.

The second sensor 240 may be located at the center of the second coil 230 in a state in which the circuit board 250 is disposed between the second sensor 240 and the second coil 230. That is, the second sensor 240 may not be directly connected to the second coil 230 but the second coil 230 may be located over the top surface of the circuit board 250 and the second sensor 240 may be located below the bottom surface of the circuit board 250. According to this embodiment, the second sensor 240, the second coil 230, and the first magnets 130 may be located on the same axis.

Consequently, the second coil 230 may interact with the first magnets 130 to move the housing 140 in the second direction and/or the third direction for optical image stabilization.

The cover member 30 may be provided at portions thereof corresponding to the steps 211 with grooves, into which an adhesive may be injected. The adhesive may have low viscosity such that the adhesive injected into the grooves flows to surface contact positions between the steps 211 and the end of the cover member 300.

The adhesive injected into the groove may fill a gap defined between the cover member 300 and the base 210 such that the cover member 300 and the base 210 can be coupled to each other in a sealed state.

In addition, the base 210 may be provided at the bottom surface thereof with a location part (not shown) at which a filter is mounted. The filter may be an infrared cut off filter. However, the disclosure is not limited thereto. The base 210 may be provided at the lower part thereof with an additional sensor holder in which the filter is disposed. In addition, a sensor board having an image sensor mounted thereon may be coupled to the bottom surface of the base 210 to constitute a camera module, which will hereinafter be described.

The support member pairs 220 may be disposed at the respective sides of the housing 140. In this embodiment, each support member pair 220 may include first and second support members. Alternatively, each support member pair 220 may include three or more support members.

For example, in a case in which the housing 140 has a polygonal shape when viewed from above as described above, the housing 140 has a plurality of sides. In a case in which the housing 140 has an octagonal shape when viewed from above as shown in FIGS. 6 and 7, the support member pairs 220 may be disposed at corresponding ones of the eight sides. Alternatively, in a case in which the housing 140 has a quadrangular shape when viewed from above, the support member pairs 220 may be disposed at the four sides. Hereinafter, a description will be given on the assumption that the number of the support member pairs 220 is four as shown in FIGS. 2, 3, and 8 although the number of the support member pairs 220 may be three. That is, first to fourth support member pairs 220-1, 220-2, 220-3, and 220-4 may be disposed at the four second sides 142 of the housing 140.

Figure 14:
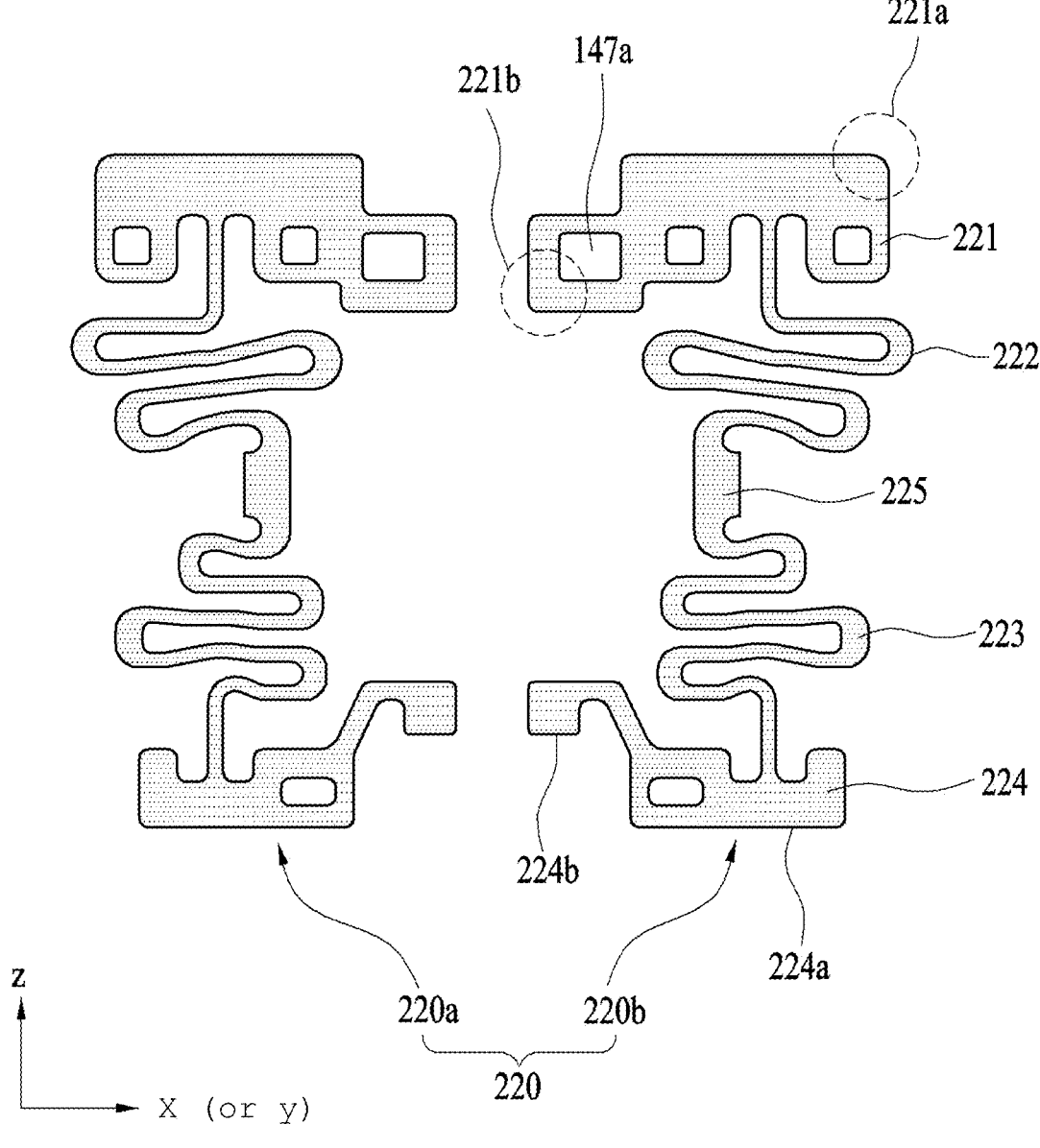
FIG. 14 is a front view of each support member pair, according to an embodiment.

FIG. 14 is a front view of each support member pair 220 according to the embodiment.

The first to fourth support member pairs 220 (220-1, 220-2, 220-3, and 220-4) may be individually disposed at the four second sides 142 of the housing 140, among the eight sides of the housing 140, for supporting the housing 140 while being spaced apart from the base 210 by a predetermined distance. Since the first to fourth support member pairs 220 (220-1, 220-2, 220-3, and 220-4) are disposed at the second sides 142 of the housing 140 according to this embodiment, the four support member pairs may be arranged in a symmetric fashion. However, the disclosure is not limited thereto. For example, two support member pairs may be disposed at each straight side of the housing 140. In this case, therefore, the eight support member pairs may be disposed at the second sides of the housing 140.

The first to fourth support member pairs 220 (220-1, 220-2, 220-3, and 220-4) may each include first and second support members 220a and 220b separated from each other. That is, the first support member pair 220-1 may include a first support member 220a-1 and a second support member 220b-1. The second support member pair 220-2 may include a first support member 220a-2 and a second support member 220b-2. The third support member pair 220-3 may include a first support member 220a-3 and a second support member 220b-3. The fourth support member pair 220-4 may include a first support member 220a-4 and a second support member 220b-4. The first and second support members may be mounted at the same side of the housing 140 in a state in which the first and second support members are adjacent to each other.

The first support members 220a-1, 220a-2, 220a-3, and 220a-4 and the second support members 220b-1, 220b-2, 220b-3, and 220b-4 may each include an upper terminal 221, at least one elastic deformation part 222, 223, and 225, and a lower terminal 224. In addition, the first and second support members shown in FIG. 14 may be symmetric in a direction (e.g. in the x-direction or the y-axis direction) perpendicular to the first direction, i.e. the z-axis direction. In a case in which the support member pair 220 shown in FIG. 14 is the first or fourth support member pair 220-1 or 220-4 shown in FIGS. 3 and 8, the first and second support members may be symmetric in the y-axis direction perpendicular to the z-axis direction. On the other hand, in a case in which the support member pair 220 shown in FIG. 14 is the second or third support member pair 220-2 or 220-3, the first and second support members may be symmetric in the x-axis direction perpendicular to the z-axis direction.

The bottom surfaces of the escape grooves 142a of the housing 140 shown in FIGS. 6 and 7 may be open to prevent interference between the lower terminals 224 of the support member pairs 220 and the housing 140. In addition, as shown in FIG. 7, steps 142b may be formed at upper sides of the escape grooves 142a for supporting the insides of the upper terminals 221 of the support member pairs 220.

Referring to FIGS. 3 and 14, the upper terminal 221 is coupled to the upper end of a corresponding second side 142 of the housing 140. The upper terminal 221 may be provided with a groove 147a corresponding to a coupling protrusion 147 formed at the second side 142 such that the upper terminal 221 can be fixed to the upper end of the second side 142 of the housing 140 by fitting of the coupling protrusion 147 into the groove 147a. The upper terminal 221 may be electrically connected to the upper elastic member 150.

According to this embodiment, as shown in FIG. 9, the first and second support member contact parts 150a-1 and 150b-1 of the first and second upper elastic members 150a and 150b may be opposite to each other such that the first and second support member contact parts 150a-1 and 150b-1 can be electrically connected to the upper terminals 221 of the first and second support members 220a-1 and 220b-1 of the first support member pair 220-1, respectively. The first support member pair is one allocated for supplying power to the first coil 120, among the first to fourth support member pairs 220-1, 220-2, 220-3, and 220-4. As the first and second support members 220a-1 and 220b-1 are disposed at the same side of the housing 140 in a state in which the first and second support members are adjacent to each other, therefore, the first and second support member contact parts 150a-1 and 150b-1 of the first and second upper elastic members 150a and 150b may be disposed with being adjacent to each other.

Referring to FIG. 3, the upper terminal 221 of the first support member 220a-1 of the first support member pair 220-1 may be electrically connected to the first support member contact part 150a-1 at a first contact point CP1 by soldering. In addition, the upper terminal 221 of the second support member 220b-1 of the first support member pair 220-1 may be electrically connected to the second support member contact part 150b-1 at a second contact point CP2 by soldering. That is, the upper terminal 221 of the first support member 220a-1 of the first support member pair 220-1 may be electrically connected to the first upper elastic member 150a. The upper terminal 221 of the second support member 220b-1 of the first support member pair 220-1 may be electrically connected to the second upper elastic member 150b. Consequently, the first and second upper elastic members 150a and 150b, which are separated from each other, may be electrically connected to the first and second support members 220a-1 and 220b-1 of the first support member pair 220-1, respectively, to supply power (or current) received from the circuit board 250 to the first coil 120.

In addition, as shown in FIG. 14, the upper terminals 221 of the first and second support members may include first contact terminals 221a for supplying power to the first and second upper elastic members 150a and 150b. Each first contact terminal 221a may be disposed at an upper corner of a corresponding one of the upper terminals 221. Alternatively, the first contact terminals 221a may be disposed separately from the respective upper terminals 221. Positive (+) power or negative (−) power may be applied to each of the first contact terminals 221a of the first and second support members.

In addition, the upper terminals 221 of the first and second support members may further include second contact terminals 221b for interconnecting the first sensor 170 and the circuit board 250. Each second contact terminal 221b may be disposed at a lower corner of a corresponding one of the upper terminals 221. Alternatively, the second contact terminals 221b may be disposed separately from the respective upper terminals 221.

The at least one elastic deformation part 222, 223, and 225 may extend from each upper terminal 221 in a longitudinal direction while being bent at least once predetermined pattern. The longitudinal direction may be a direction in which the upper terminal 221 and the lower terminal 224 are connected to each other.

According to this embodiment, the at least one elastic deformation part may include first and/or second elastic deformation parts 222 and 223.

In a case in which the first elastic deformation part 222 is bent twice or more into a zigzag shape, the second elastic deformation part 223 may be formed correspondingly. However, the disclosure is not limited thereto. According to another embodiment, the second elastic deformation part 223 may be omitted or may have a different shape from the first elastic deformation part 222. FIG. 14 shows merely one embodiment. The elastic deformation parts may have various other patterns. The first and second elastic deformation parts 222 and 223 may be integrated into a single elastic deformation part. Alternatively, the first and second elastic deformation parts 222 and 223 may be configured in the form of a suspension wire having no pattern. According to this embodiment, straight parts of the first and second elastic deformation parts 222 and 223 may be approximately parallel to a plane perpendicular to the optical axis.

When the housing 140 moves in the second direction and/or the third direction perpendicular to the optical axis, the first and second elastic deformation parts 222 and 223 may be minutely and elastically deformed in a moving direction of the housing 140 or a longitudinal direction of the support member pair. As a result, the housing 140 may move substantially in the second direction and/or the third direction perpendicular to the optical axis with little change in position of the housing 140 in the first direction parallel to the optical axis, thereby improving accuracy of optical image stabilization. This is based on properties of the elastic deformation parts 222 and 223 extending in the longitudinal direction.

In addition, the at least one elastic deformation part may further include a connection part 225.

The connection part 225 may be disposed at midway between the first and second elastic deformation parts 222 and 223. However, the disclosure is not limited thereto. The connection part 225 may be disposed with being connected to one of the elastic deformation parts. The first and second elastic deformation parts 222 and 223 may be provided in a state in which the connection part 225 is disposed at a middle therebetween. In addition, first and second elastic deformation parts 222 and 223 may have corresponding shapes.

The connection part 225 may be formed in a plate shape for functioning as a damper. The connection part 225 may be provided with a plurality of holes (not shown) or grooves (not shown), through which the connection part 225 and the housing 140 may constitute a damping unit using a UV damper.

In this embodiment, the first and second elastic deformation parts 222 and 223 are disposed between the upper terminal 221 and the lower terminal 224. However, the disclosure is not limited thereto. According to another embodiment, one or more elastic deformation parts may be provided at opposite ends of each of the first and second support members unlike FIG. 14.

As shown in FIG. 14, the lower terminal 224 may be provided at one end of each of the first and second support members. The lower terminal 224 may extend from the at least one elastic deformation part 222, 223, and 225 such that the lower terminal 224 can be coupled to the base 210. One end 224a of the lower terminal 224 may be inserted or disposed in a corresponding one of the support member location grooves 214 formed at the base 210 and fixed using an adhesive member, such as epoxy. However, the disclosure is not limited thereto. The support member location groove 214 has a shape corresponding to the lower terminal 224 so that the lower terminal 224 may be fitted into the support member location groove 214. Alternatively, the end 224a of the lower terminal 224 may be divided into two or more parts. Correspondingly, the base 210 may be provided with two or more support member location grooves 214 per support member.

In addition, the other end 224b of the lower terminal 224 may be located on and connected to the upper end of each pad of pad units 252-1, 252-2, 252-3, and 252-4 of the circuit board 250.

The lower terminal 224 may be formed in a plate shape having a larger width than the first and second elastic deformation parts 222 and 223. However, the disclosure is not limited thereto. The lower terminal 224 may have a width equal to or less than that of the first and second elastic deformation parts 222 and 223.

Meanwhile, the second coil 230 may be disposed opposite to the first magnets 120 fixed to the housing 140. For example, the second coil 230 may be disposed outside the first magnets 130. Alternatively, the second coil 230 may be mounted under the first magnets 130 while being spaced apart from the first magnets 130 by a predetermined distance.

According to this embodiment, as shown in FIGS. 12 and 13, four second coils 230 may be mounted at the four corners of the circuit board 250. However, the disclosure is not limited thereto. Only two second coils 230 may be mounted at the circuit board 250. In this case, one of the second coils may be disposed in the second direction, and the other second coil may be disposed in the third direction. Alternatively, more than four second coils 230 may be mounted at the circuit board 250. In this embodiment, the circuit board 250 may have a circuit pattern corresponding to the second coils 230, and the separate second coils 230 may be additionally disposed on the circuit board 250. However, the disclosure is not limited thereto. Only the second coils 230 may be disposed on the circuit board 250 in a state in which the circuit board 250 has no circuit pattern corresponding to the second coils 230. Alternatively, a wire may be wound in a donut to constitute a second coil 230, or a second coil 230 may be formed in an FP coil shape, and the second coil 230 may be electrically connected to the circuit board 250.

A circuit member 231 including the second coils 230 may be mounted at the top surface of the circuit board 250 disposed above the base 210. However, the disclosure is not limited thereto. The second coils 230 may be disposed in tight contact with the base 210 or may be spaced apart from the base 210 by a predetermined distance. Alternatively, the second coils 230 may be formed at an additional board, which may be connected to the circuit board 250 by stacking. The housing 140 may move in the second and third directions according to interaction between the first magnets 130 and the second coils 230 realized as described above. To this end, the first to fourth support member pairs 220-1, 220-2, 220-3, and 220-4 may support the housing 140 such that the housing 140 can move relative to the base 210 in the second and third directions perpendicular to the first direction.

Meanwhile, the second sensor 240 may be disposed at the center of the second coil 230 for sensing motion of the housing 140. The second sensor 240 may be a hall sensor. Any sensor capable of sensing the change of magnetic force may be used as the second sensor 240. As shown in FIG. 13, two second sensors 240 may be disposed at corresponding corners of the base 210 disposed under the circuit board 250. The second sensors 240 may be inserted and disposed in the second sensor location grooves 215 formed at the base 210. The bottom surface of the circuit board 250 may be a surface of the circuit board 250 opposite to the surface of the circuit board 250 at which the second coils 230 are disposed.

Figure 15:
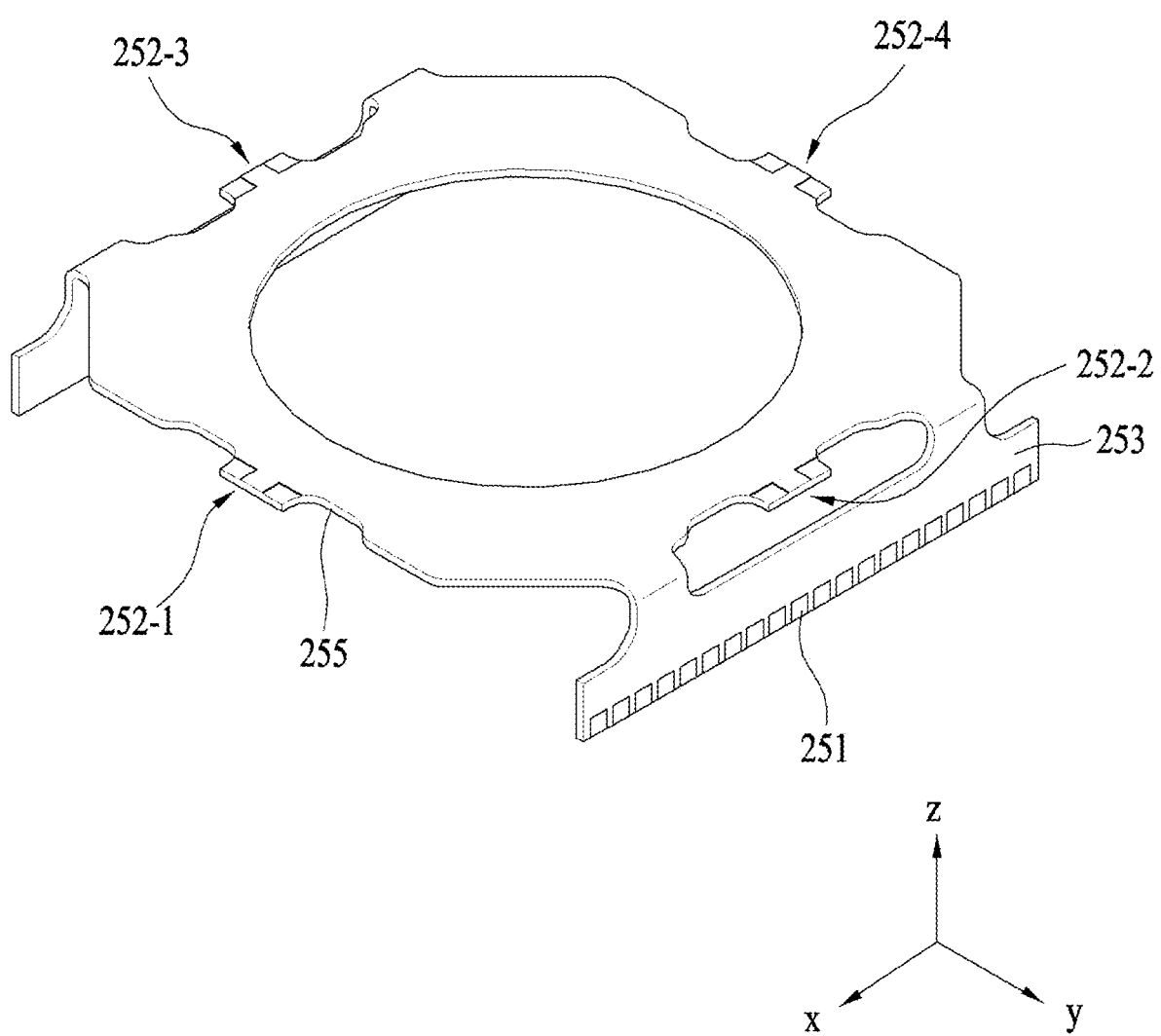
FIG. 15 is a perspective view of the circuit board, according to an embodiment.

FIG. 15 is a perspective view of the circuit board 250 according to the embodiment.

Referring to FIGS. 13 and 15, the circuit board 250 may include a plurality of pad units 252-1, 252-2, 252-3, and 252-4. The pad units 252-1, 252-2, 252-3, and 252-4 may have a shape adapted for being connected to the ends 224_b_ of the lower terminals 224 of each of the support member pairs 220-1, 220-2, 220-3, and 220-4. That is, the ends 224_b_ of the lower terminals 224 of the first and second support members 220_a_-1 and 220_b_-1 of the first support member pair 220-1 may be connected to pads of the first pad unit 252-1. The ends 224_b_ of the lower terminals 224 of the first and second support members 220_a_-2 and 220_b_-2 of the second support member pair 220-2 may be connected to pads of the second pad unit 252-2. The ends 224_b_ of the lower terminals 224 of the first and second support members 220_a_-3 and 220_b_-3 of the third support member pair 220-3 may be connected to pads of the third pad unit 252-3. The ends 224_b_ of the lower terminals 224 of the first and second support members 220_a_-4 and 220_b_-4 of the fourth support member pair 220-4 may be connected to pads of the fourth pad unit 252-4. The first to fourth pad units 252-1, 252-2, 252-3, and 252-4 may each include two pads, which are connected to the first and second support members of a corresponding one of the support member pairs, respectively.

The circuit board 250 may further include a plurality of terminals 251 electrically connected to the pad units 252-1, 252-2, 252-3, and 252-4.

The circuit board 250 may be coupled to the top surface of the base 210. The circuit board 250 may be provided with fifth through holes 255, through which the support member location grooves 214 are exposed. The circuit board 250 may be provided with a bent terminal surface 253. According to this embodiment, at least one terminal 251 may be mounted at one bent terminal surface 253 of the circuit board 250.

According to this embodiment, external power may be received through the terminals 251 mounted at the terminal surface 253 to supply the power to the first and second coils 120 and 230 and the first sensor 170. In addition, a signal from the first sensor 170 may be output to the outside as a feedback signal necessary to control the position of the bobbin 110.

The number of the terminals 251 mounted at the terminal surface 253 may be changed based on the kinds of components to be controlled.

According to this embodiment, the circuit board 250 may be a flexible printed circuit board (FPCB). However, the disclosure is not limited thereto. The terminals of the circuit board 250 may be directly formed at the surface of the base 210 using a surface electrode method.

Hereinafter, a process of supplying power to the first sensor 170 and transmitting a sensing signal output from the first sensor 170 to the circuit board 250 using the support member pairs 220 in the lens moving apparatus 1000 with the above-stated construction will be described with reference to the accompanying drawings.

In a case in which the first sensor 170 is a hall sensor, the hall sensor 170 may have a plurality of pins. For example, the pins may include first and second pins. The first pins may include 1-1 and 1-2 pins connected to voltage and ground, respectively. The second pins may include 2-1 and 2-2 pins for outputting sensed results. The sensed results output through the 2-1 and 2-2 pins may be current. However, the disclosure is not limited to a type of sensed results.

According to this embodiment, power may be supplied from the circuit board 250 to the 1-1 and 1-2 pins of the first sensor 170 using the second support member pair 220-2, and the sensed results may be transmitted from the 2-1 and 2-2 pins of the first sensor 170 to the circuit board 250 using the third support member pair 220-3. The second support member pair may be any one of the first to fourth support member pairs 220-1, 220-2, 220-3, and 220-4 excluding the first support member pair 220-1. In addition, the third support member pair may be any one of the first to fourth support member pairs 220-1, 220-2, 220-3, and 220-4 excluding the first and second support member pairs 220-1 and 220-2.

Figure 16:
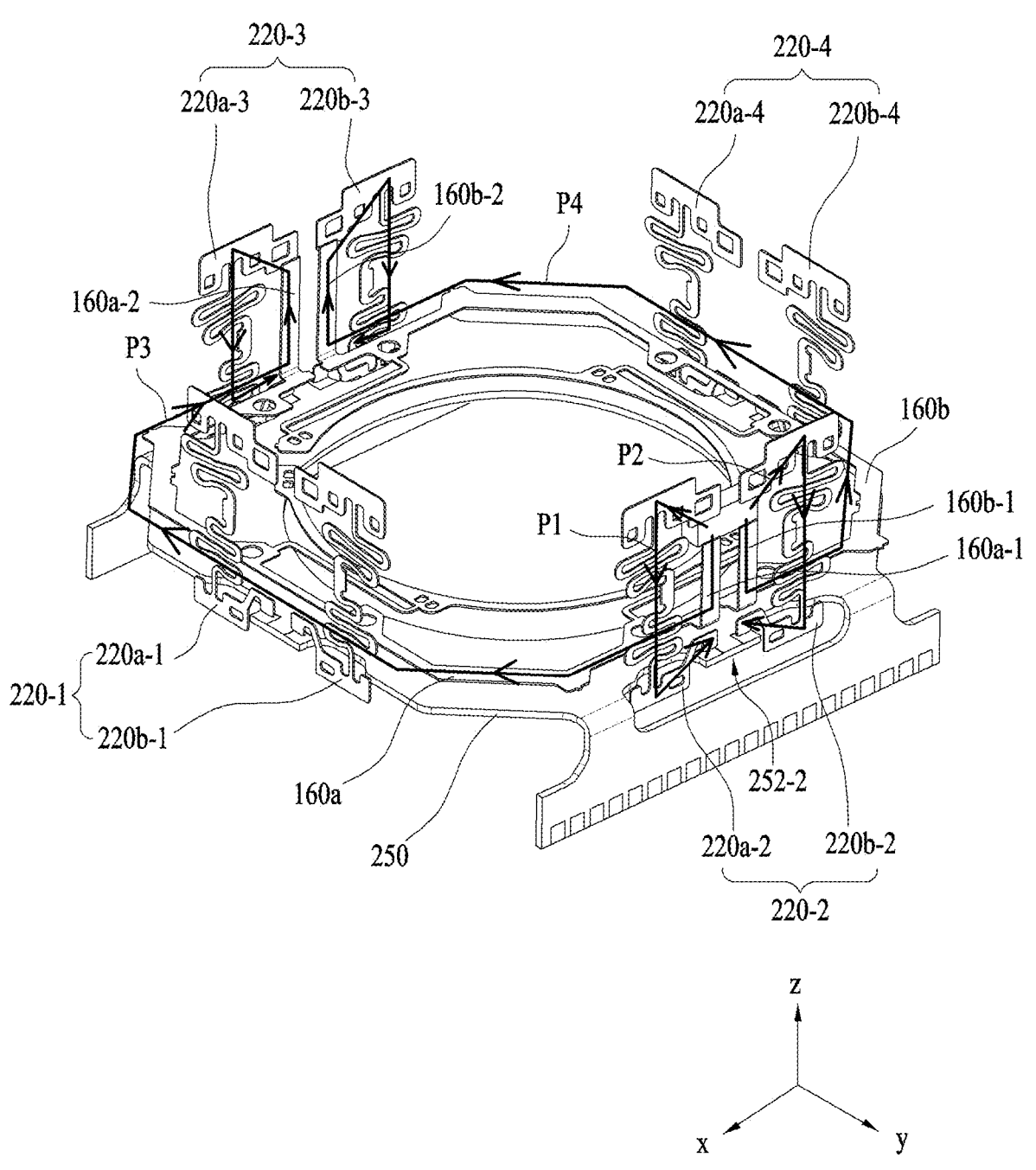
FIG. 16 is a perspective view showing the lower elastic member, first to fourth support member pairs, and the circuit board of the lens moving apparatus shown in FIG. 3, according to an embodiment.

FIG. 16 is a perspective view showing the lower elastic member 160, the first to fourth support member pairs 220-1, 220-2, 220-3, and 220-4, and the circuit board 250 of the lens moving apparatus 1000 shown in FIG. 3.

The 1-1 and 1-2 pins of the first sensor 170 may be connected to the circuit board 250 via the second support member pair 220-2.

To this end, the second contact terminals 221_b_ of the upper terminals 221 of the first and second support members shown in FIG. 14 may be used. However, the disclosure is not limited thereto. The upper terminals 221 may be connected to the 1-1 and 1-2 pins using other forms of the second contact terminals 221_b_.

In other words, as shown in FIG. 3, the second contact terminal 221_b_ of the upper terminal 221 of the first support member 220_a_-2 of the second support member pair 220-2 may be electrically connected to the 1-1 pin at a third contact point CP3, and the second contact terminal 221_b_ of the upper terminal 221 of the second support member 220b-2 of the second support member pair 220-2 may be electrically connected to the 1-2 pin at a fourth contact point CP4. In addition, the lower terminals 224 of the first and second support members 220a-2 and 220b-2 of the second support member pair 220-2 may be connected to the pads of the second pad unit 252-2 of the circuit board 250 at seventh and eighth contact points CP7 and CP8, respectively.

As a result, the 1-1 and 1-2 pins of the first sensor 170 may be connected to the circuit board 250 through the first and second support members 220a-2 and 220b-2 of the second support member pair 220-2. Referring to FIG. 16, electric conduction paths from the 1-1 and 1-2 pins of the first sensor 170 to the second pad unit 252-2 of the circuit board 250 are denoted by P1 and P2, respectively.

In addition, the 2-1 and 2-2 pins of the first sensor 170 may be connected to the circuit board 260 through the third support member pair 220-3 via the first and second lower elastic members 160a and 160b.

To this end, as shown in FIG. 3, the 2-1 pin may be electrically connected to one end of the 1-1 sensor contact part 160a-1, which is one side of the first lower elastic member 160a, at a fifth contact pint CP5, and the 2-2 pin may be electrically connected to one end of the second sensor contact part 160b-1, which is one side of the second lower elastic member 160b, at a sixth contact point CP6.

In addition, as shown in FIGS. 3, 8, and 16, the 1-1 sensor contact part 160a-1, which is one side of the first lower elastic member 160a, may be connected to the second contact terminal 221b of the first support member 220a-3 of the third support member pair 220-3 at a ninth contact point CP9 through the outside frame 162 and the 1-2 sensor contact part 160a-2, which is the other side of the first lower elastic member 160a. In addition, the 2-1 sensor contact part 160b-1, which is one side of the second lower elastic member 160b, may be connected to the second contact terminal 221b of the second support member 220b-3 of the third support member pair 220-3 at a tenth contact point CP10 through the outside frame 162 and the 2-2 sensor contact part 160b-2, which is the other side of the second lower elastic member 160b.

The lower terminals 224 extending from the second contact terminals 221b of the first and second support members 220a-3 and 220b-3 of the third support member pair 220-3 are connected to the pads of the third pad unit 252-3 of the circuit board 250. Consequently, the 2-1 and 2-2 pins of the first sensor 170 may be connected to the circuit board 250 through the third support member pair 220-3 via the lower elastic member 160. Referring to FIG. 16, electric conduction paths from the 2-1 and 2-2 pins of the first sensor 170 to the third pad unit 252-3 of the circuit board 250 are denoted by P3 and P4, respectively.

According to this embodiment, the second support member pair 220-2 connecting the 1-1 and 1-2 pins of the first sensor 170 to the circuit board 250 and the third support member pair 220-3 connecting the 2-1 and 2-2 pins of the first sensor 170 to the circuit board 250 may be symmetric in the y-axis direction. To this end, the second support member pair 220-2 and the third support member pair 220-3 may be disposed at opposite sides of the housing 140.

In a case in which the number of the support members of the lens moving apparatus 1000 is four, two of which is used to supply power to the first coil 120, the number of the pads required by the circuit board 250 is merely two. According to this embodiment, however, the number of the support members is eight, two of which are used to supply power to the first coil 120 and four of which are used to connect the four pins of the first sensor 170 to the circuit board 250. Consequently, the number of the pads necessary for the circuit board 250 may be six. Since the number of the support members is increased according to this embodiment, the number of the pads necessary for the circuit board 250 may be increased, and therefore the number of the terminals 251 may be increased.

In a case in which the number of the terminals 251 of the circuit board 250 is 14 when the number of the support members is four, the number of the terminals 251 of the circuit board 250 may be 18 to 20 according to this embodiment. However, the disclosure is not limited thereto.

In the lens moving apparatus 1000, the first to fourth support member pairs 220-1, 220-2, 220-3, and 220-4 may each include the first and second support members electrically separated from each other. Power may be supplied to the first coil 120 using the first support member pair 220-1. The upper terminals 221 of the first and second support members 220a-1 and 220b-1 of the first support member pair 220-1 are disposed at the same side of the housing while being adjacent to each other. The upper terminal 221 of the first support member 220a-1 is opposite to the first support member contact part 150a-1 of the first upper elastic member 150a, and the upper terminal 221 of the second support member 220b-1 is opposite to the second support member contact part 150b-1 of the second upper elastic member 150b. Consequently, the first support member pair 220-1 and the upper elastic member 150 may be electrically connected to each other at one side of the housing 140 by soldering, and therefore, the manufacturing process is simpler than when the first and second support member contact parts 150a-1 and 150b-1 are opposite to each other by 180 degrees symmetrically with respect to the bobbin 110.

In addition, in a case in which the lens moving apparatus 1000 further includes the first sensor 170 to accurately control the position of the bobbin 110, no additional member for the first sensor 170 is required. This is because four pins of the first sensor 170 may be connected to the circuit board 250 by using the support member pairs 220 and the lower elastic member 160 used for optical image stabilization without using an additional member or line. Consequently, the manufacturing cost of the lens moving apparatus 1000 is reduced and the structure of the lens moving apparatus 1000 is simplified. This may be equally applied to a case in which another device for helping operation of the lens moving apparatus 1000 is further disposed in addition to the first sensor 170.

Meanwhile, the lens moving apparatus 1000 may be used in various fields, such as a camera module. For example, the camera module may be applied to a mobile device, such as a mobile phone.

A camera module according to an embodiment may include a lens barrel coupled to a bobbin 110, an image sensor (not shown), a circuit board 250, and an optical system.

The lens barrel may be configured as previously described. The circuit board 250, which is a part on which the image sensor is mounted, may form the bottom surface of the camera module.

In addition, the optical system may include at least one lens for transmitting an image to the image sensor. At the optical system may be mounted an actuator module capable of performing an auto focusing function and an optical image stabilization function. The actuator module for performing the auto focusing function may be variously configured. For example, a voice coil unit motor may be generally used. The lens moving apparatus 1000 according to the previous embodiment may function as an actuator module capable of performing both the auto focusing function and the optical image stabilization function.

In addition, the camera module may further include an infrared cut off filter (not shown). The infrared cut off filter prevents infrared light from being incident upon the image sensor. In this case, the infrared cut off filter may be mounted at a position of the base 210 shown in FIG. 2 corresponding to the image sensor. The infrared cut off filter may be coupled to a holder member (not shown). In addition, the base 210 may support the lower side of the holder member.

At the base 210 may be mounted additional terminal members for electric conduction with the circuit board 250. The terminals may be integrally formed using a surface electrode.

Meanwhile, the base 210 may function as a sensor holder for protecting the image sensor. In this case, a protrusion may be formed along the side of the base 210 while extending downward. However, this is not a requisite configuration. Although not shown, an additional sensor holder may be disposed at the lower part of the base 210 for protecting the image sensor.

According to the above-described construction, it is possible to perform auto focusing and optical image stabilization of the first and second lens moving units 100 and 200 commonly using the first magnets 130. Consequently, it is possible to reduce the number of parts and the weight of the housing 140, thereby improving responsibility. Of course, first magnets for auto focusing and first magnets for optical image stabilization may be separately configured.

Another Embodiment

Figure 17:
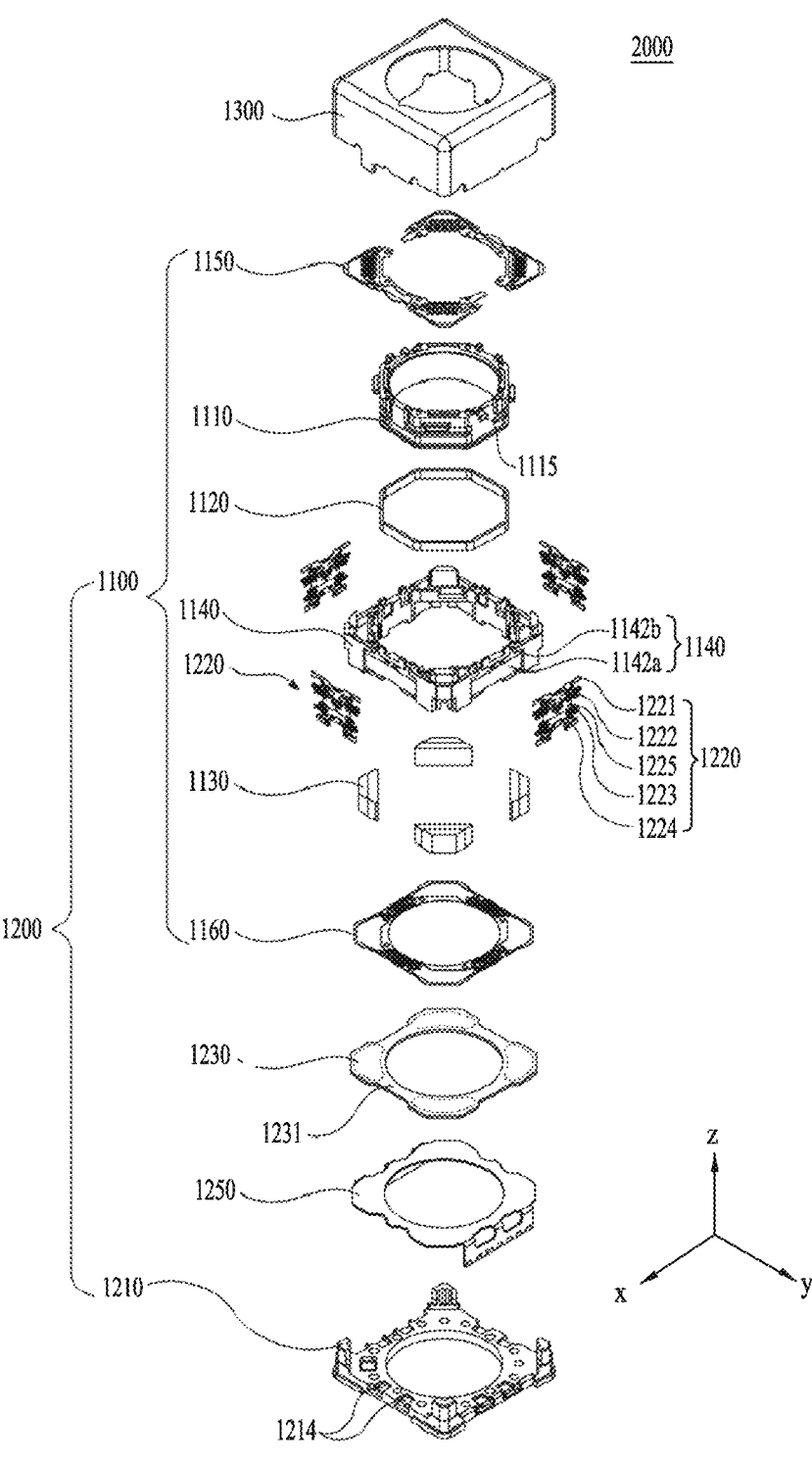
FIG. 17 is an exploded perspective view showing another embodiment of the lens moving apparatus shown in FIG. 1.
Figure 18:
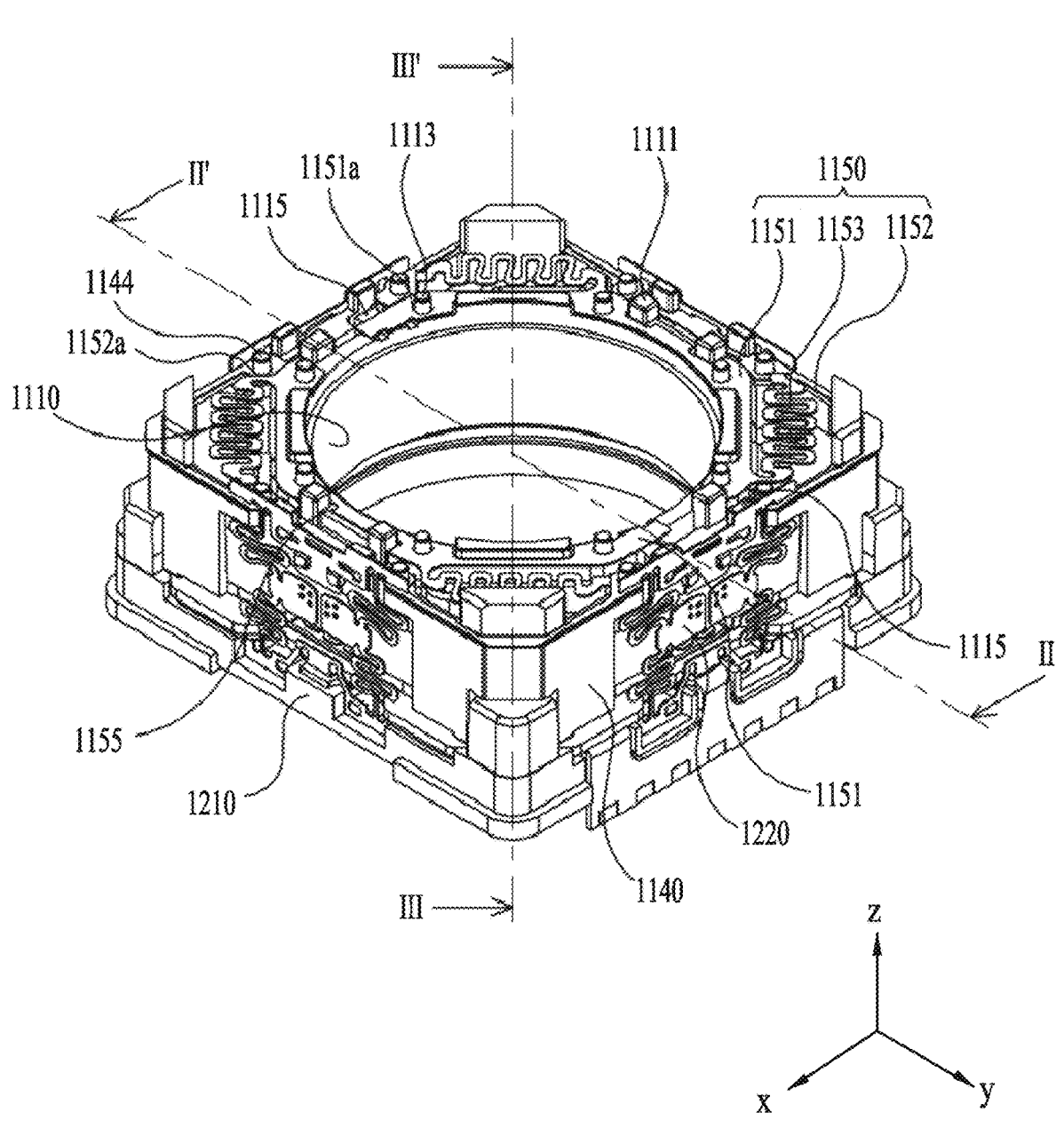
FIG. 18 is a perspective view of the lens moving apparatus with a cover member shown in FIG. 1 removed, according to another embodiment.
Figure 19:
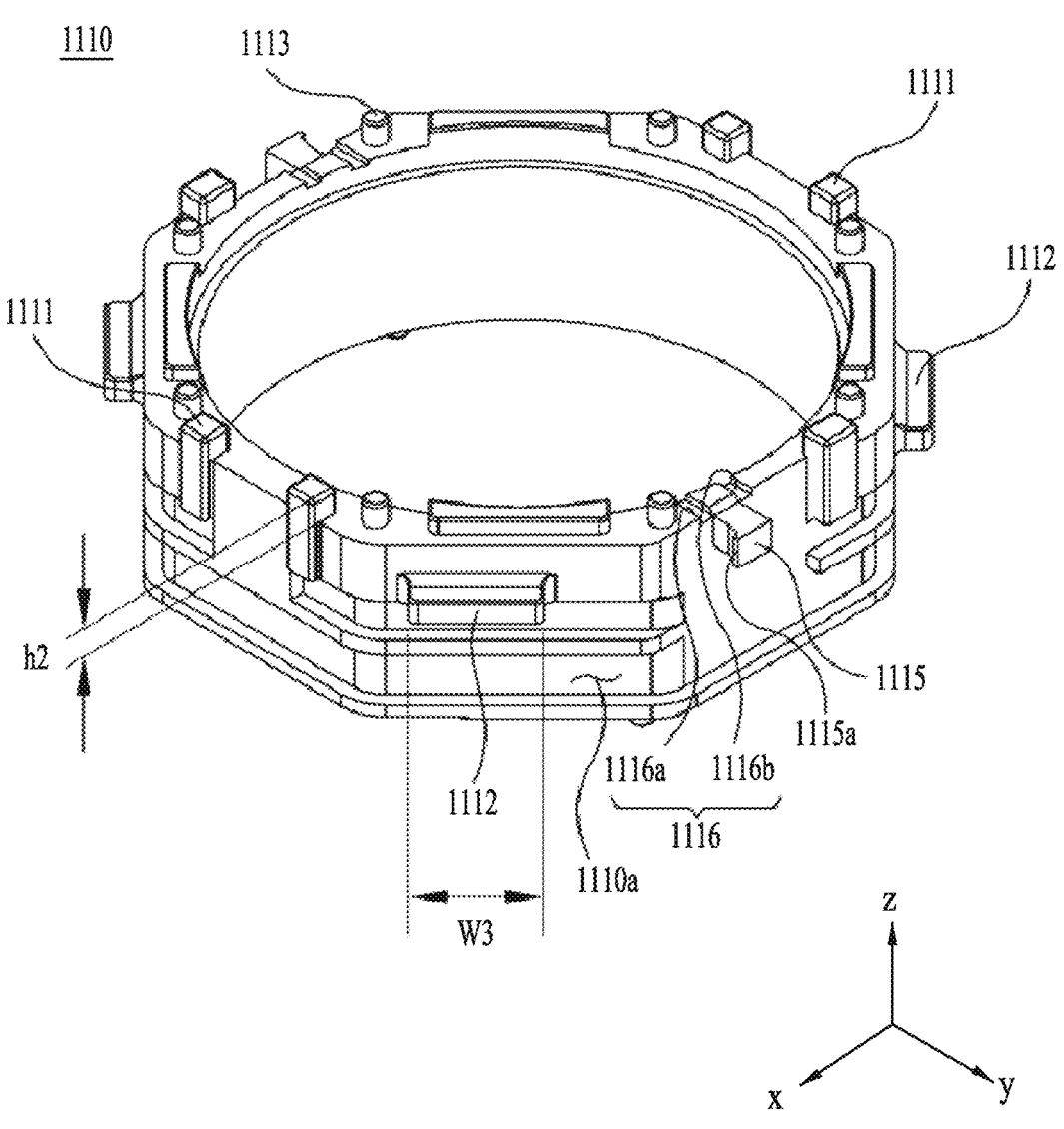
FIG. 19 is a perspective view of a bobbin shown in FIG. 17, according to an embodiment.
Figure 20:
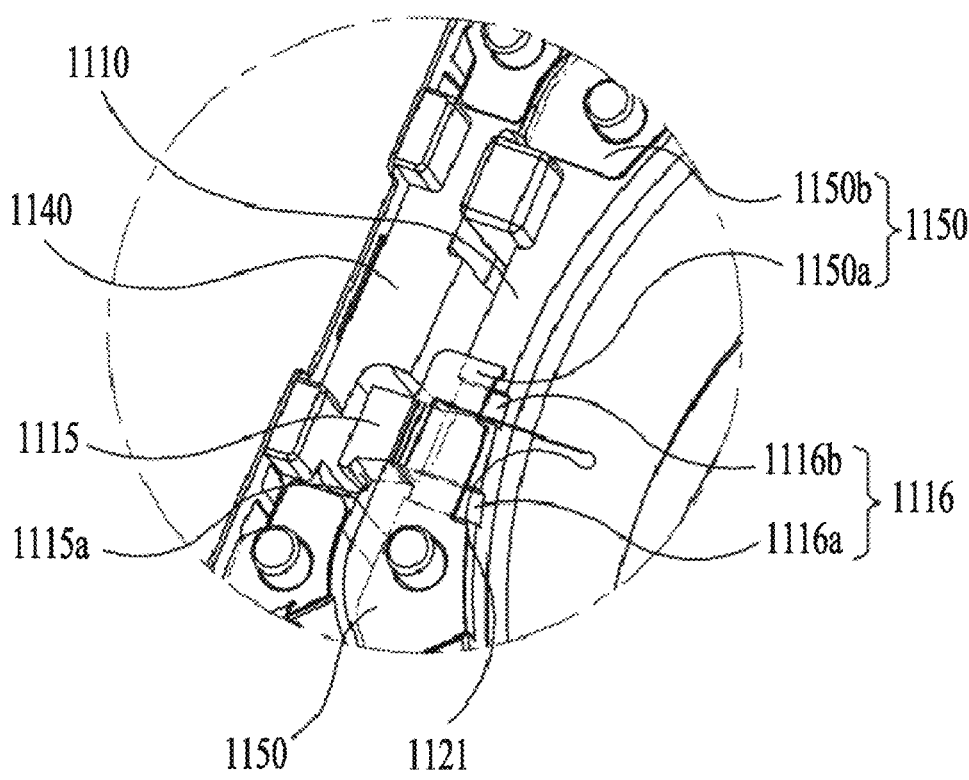
FIGS. 20 and 21 are enlarged views showing a winding protrusion of the bobbin.
Figure 21:
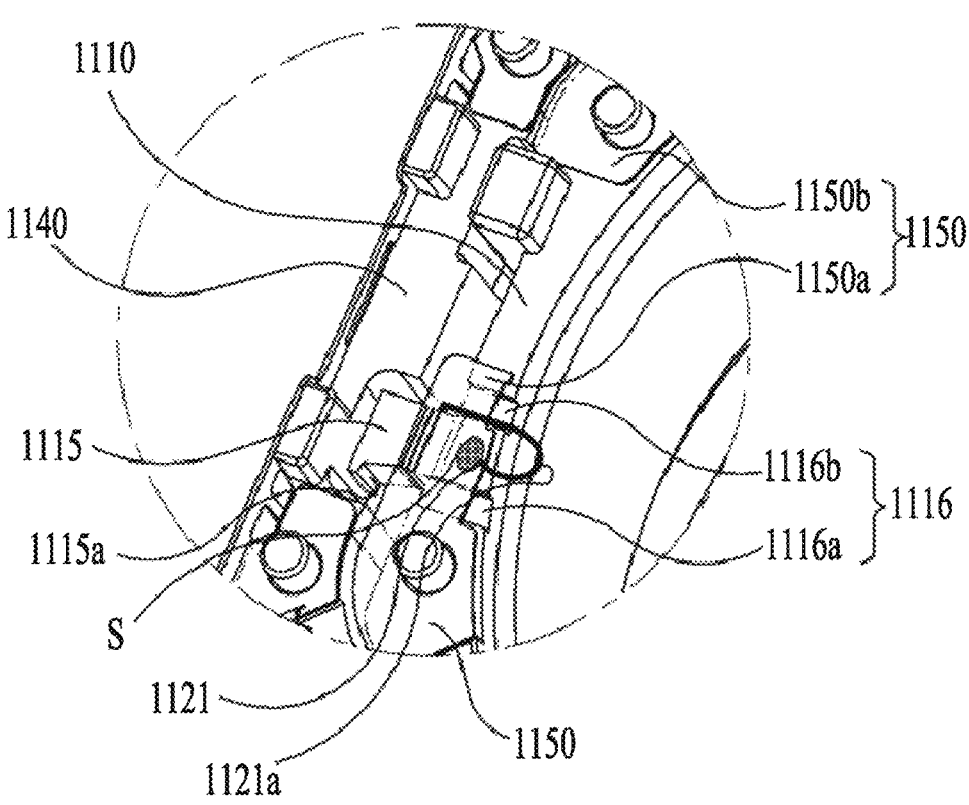
Figure 22:
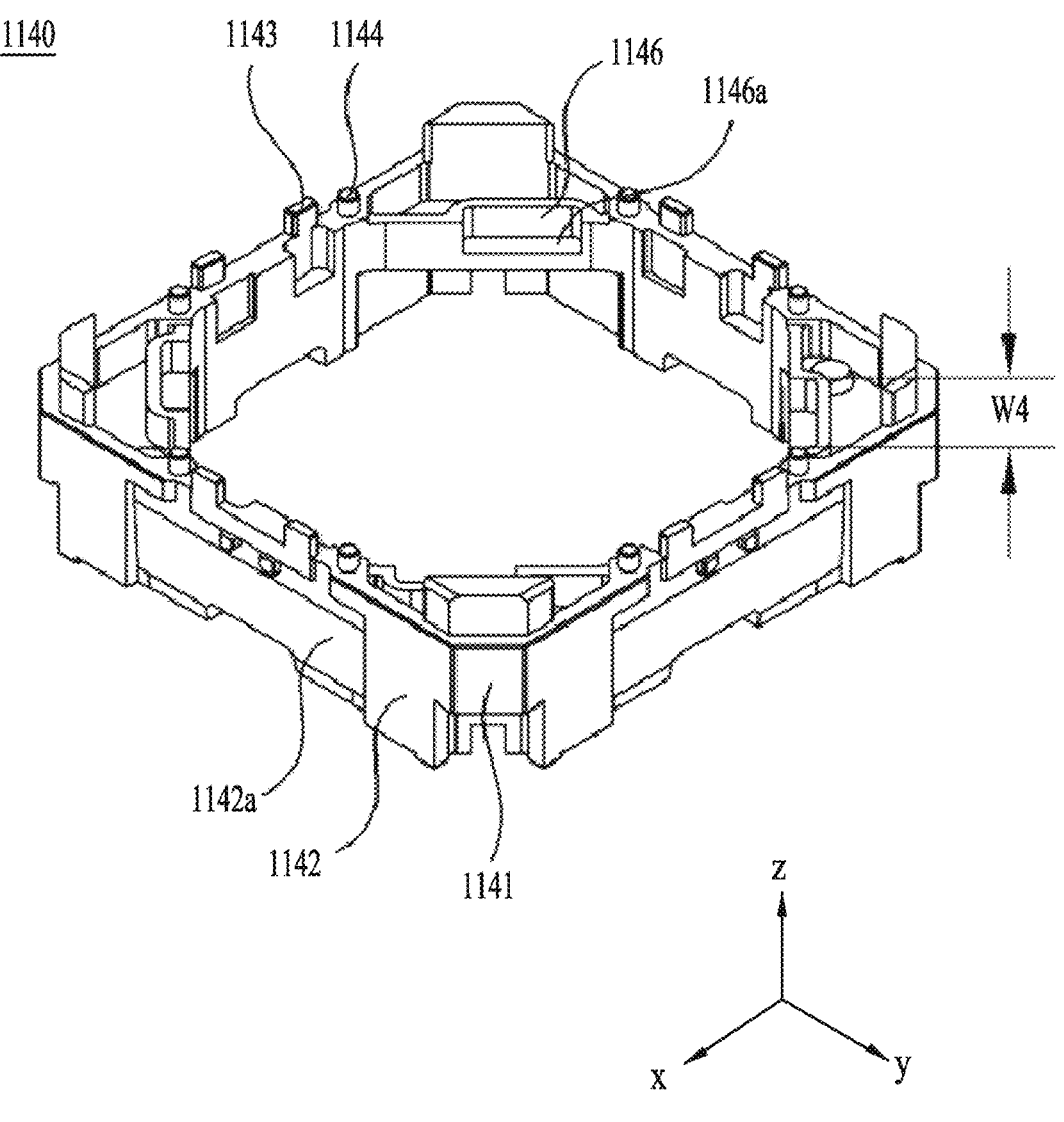
FIGS. 22 and 23 are perspective and rear perspective views of a housing.
Figure 23:
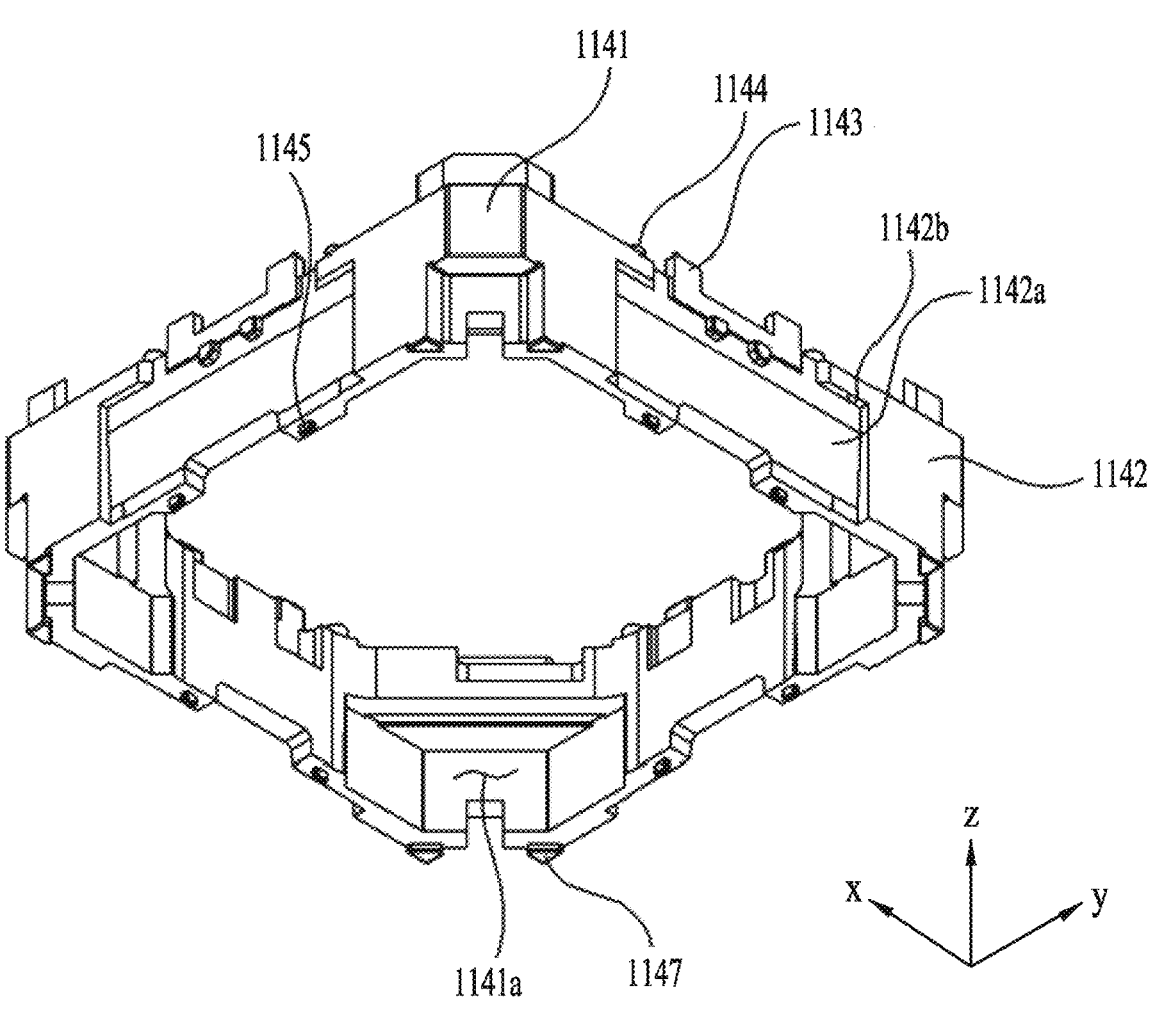
Figure 24:
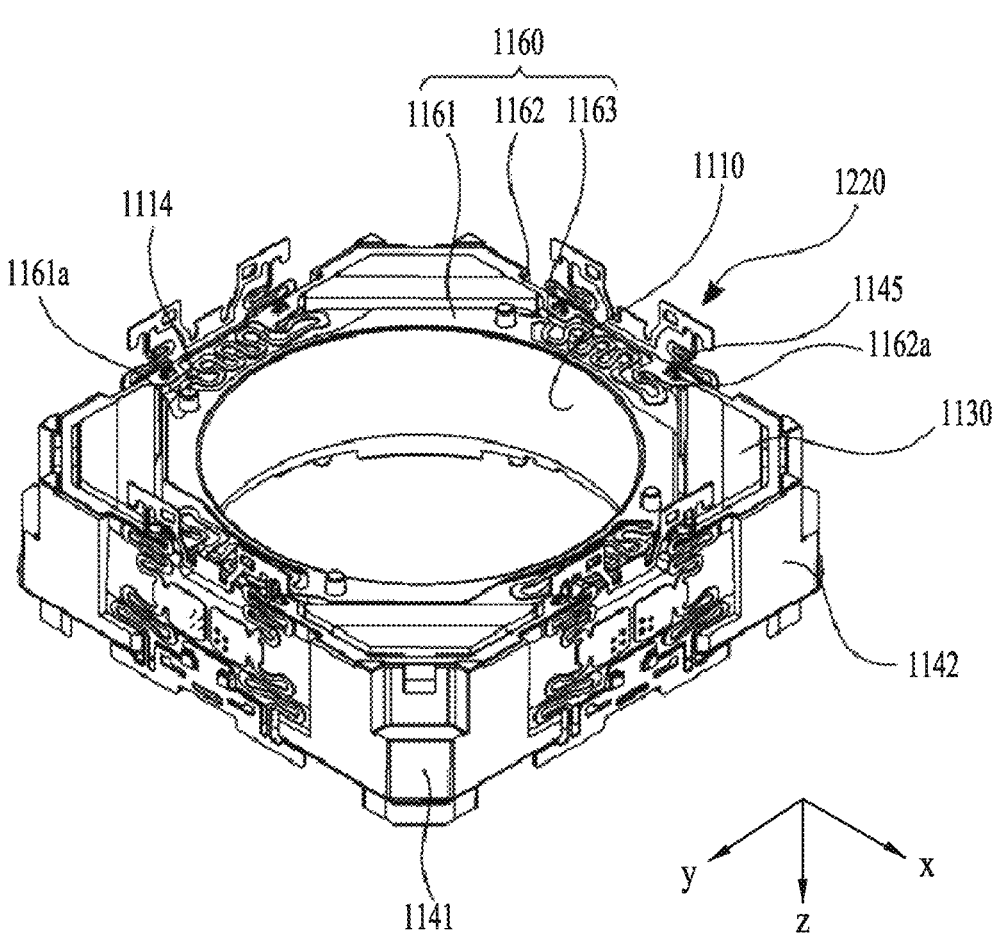
FIG. 24 is a rear perspective view of the housing to which the bobbin and a lower elastic member are coupled.
Figure 25:
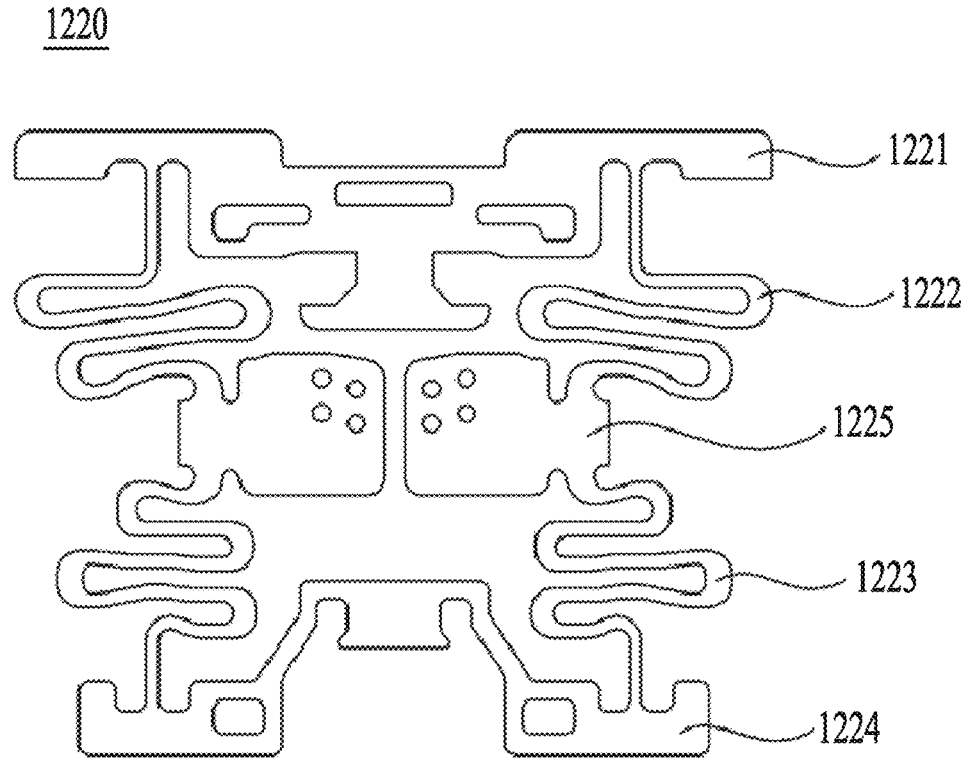
FIG. 25 is a front view of a support member, according to another embodiment.
Figure 26:
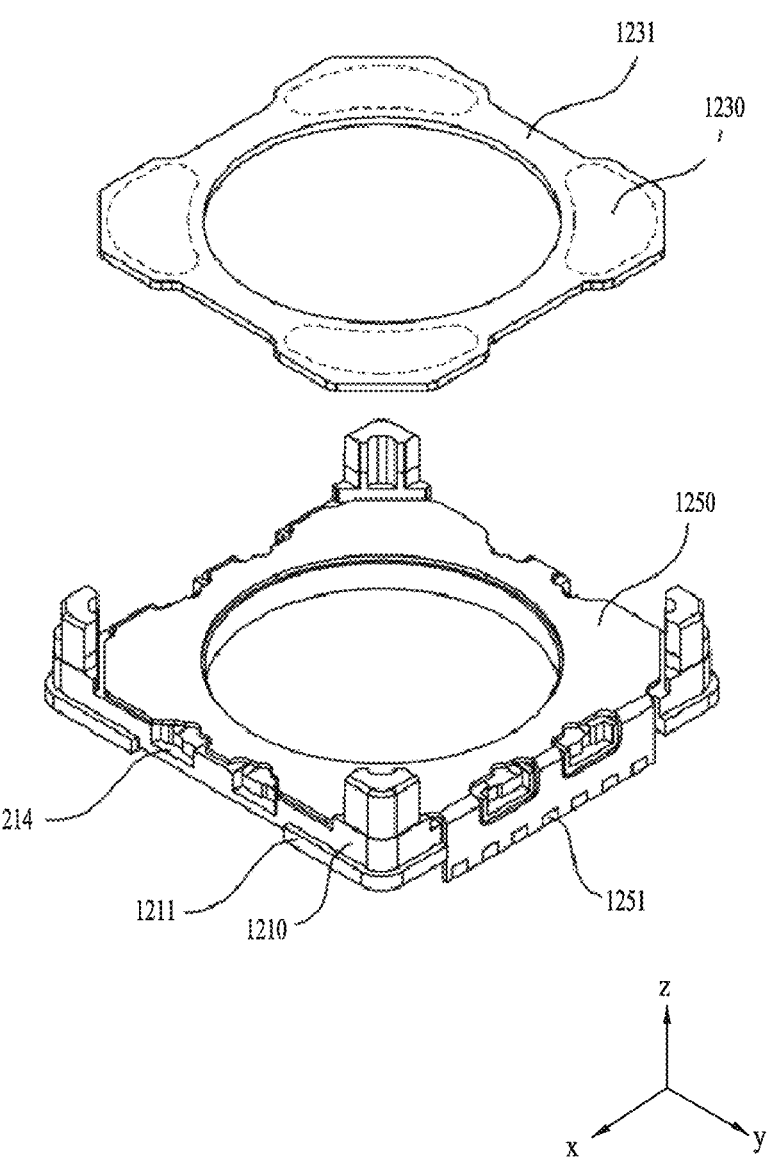
FIGS. 26 and 27 are perspective views of a base, a circuit board, and a second coil, according to another embodiment.
Figure 27:
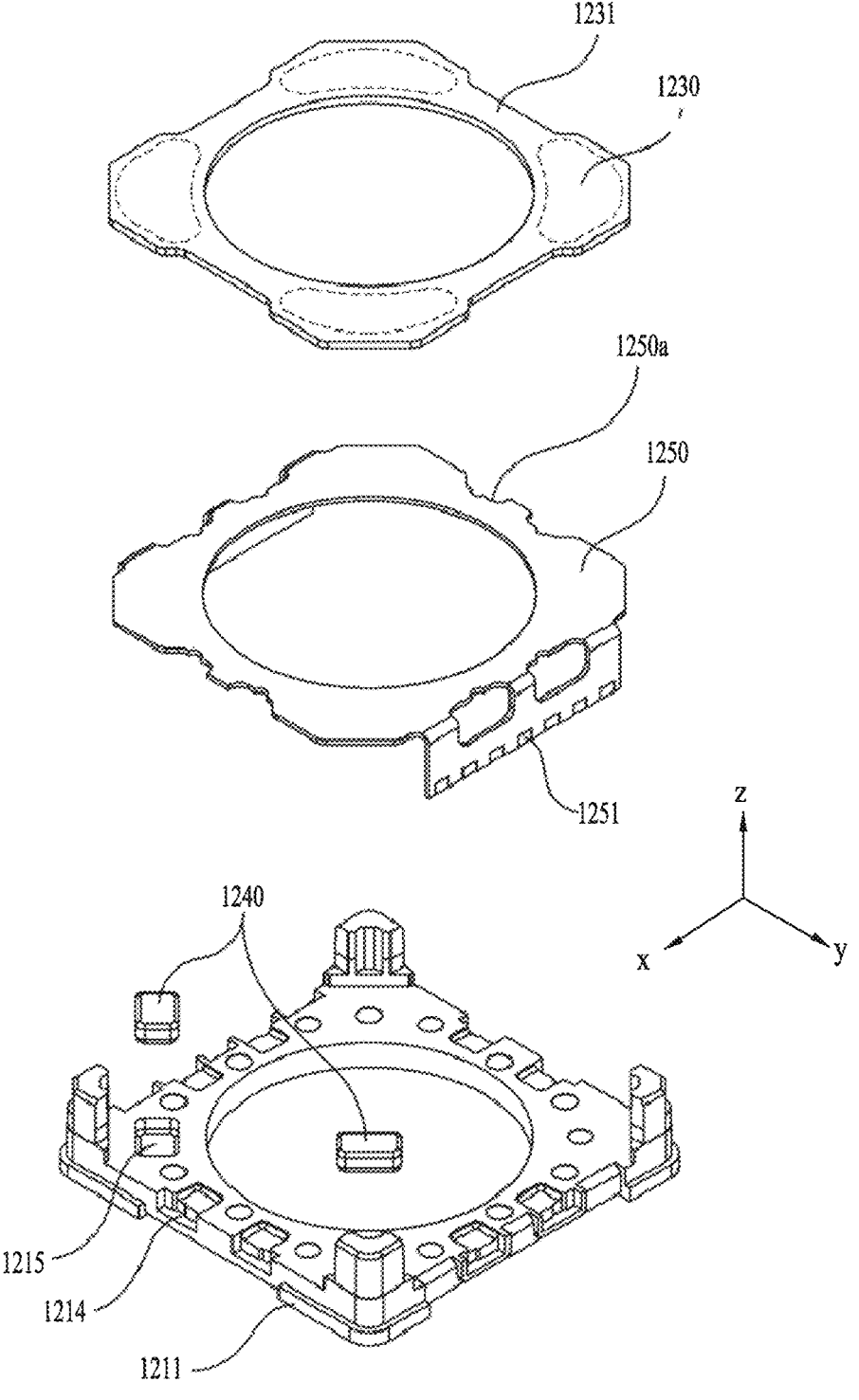
Figure 28:
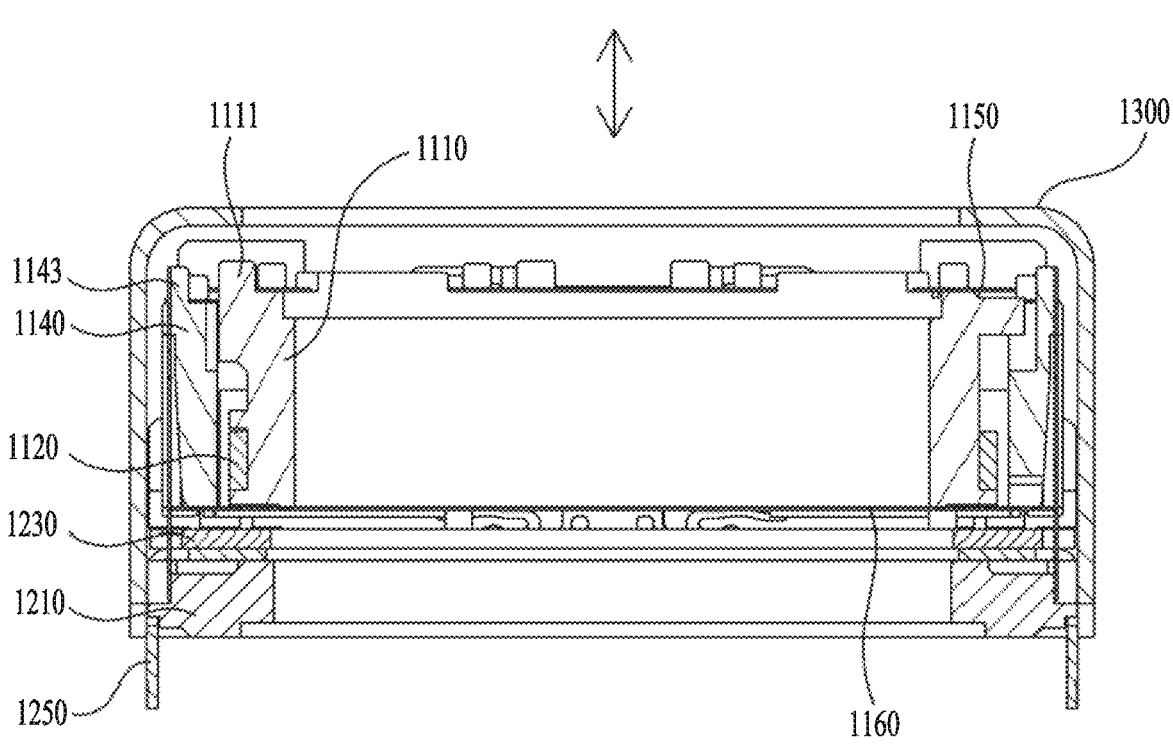
FIG. 28 is a sectional view taken along line II-II' of FIG. 18, according to another embodiment.
Figure 29:
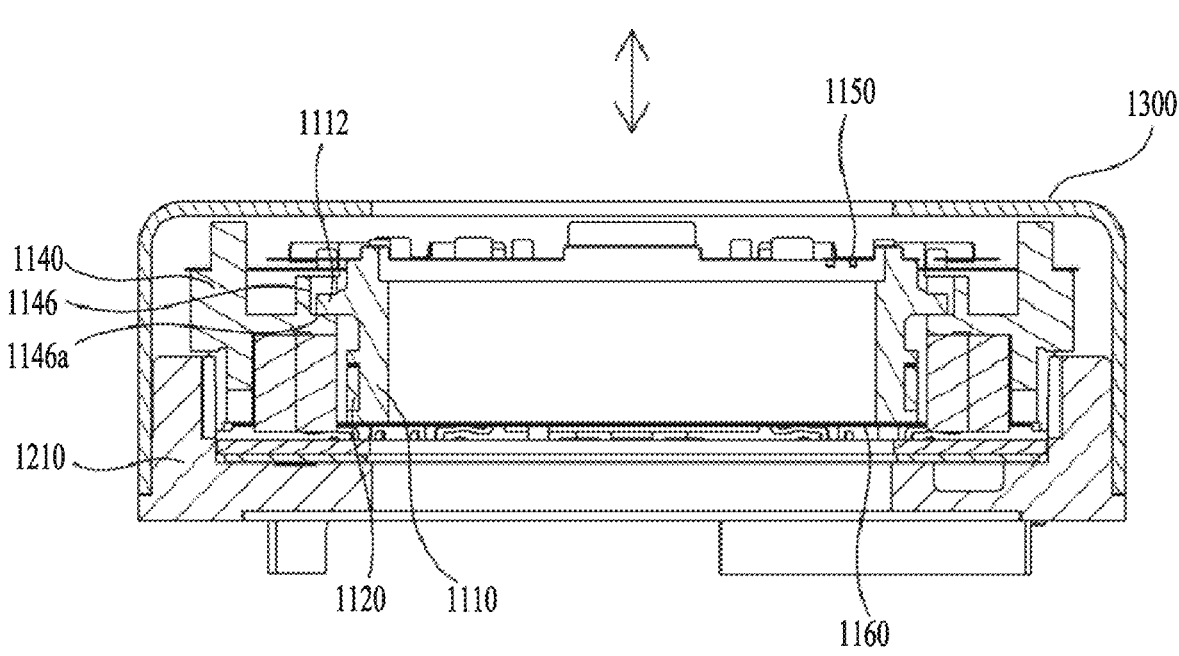
FIG. 29 is a sectional view taken along line III-III' of FIG. 18, according to another embodiment.

FIG. 17 is an exploded perspective view showing another embodiment 2000 of the lens moving apparatus shown in FIG. 1, FIG. 18 is a perspective view of the lens moving apparatus 2000 according to another embodiment with a cover member 300 shown in FIG. 1 removed, FIG. 19 is a perspective view of a bobbin 1110, FIGS. 20 and 21 are enlarged views showing a winding protrusion of the bobbin 1110, FIGS. 22 and 23 are perspective and rear perspective views of a housing 1140, respectively, FIG. 24 is a rear perspective view of the housing 1140 to which the bobbin 1110 and a lower elastic member 1160 are coupled, FIG. 25 is a front view of a support member 1220 according to another embodiment, FIGS. 26 and 27 are perspective views of a base 1210, a circuit board 1250, and a second coil 1230 according to another embodiment, FIG. 28 is a sectional view taken along line II-II' of FIG. 18, and FIG. 29 is a sectional view taken along line III-III' of FIG. 18. In FIG. 17, the cover member 1300 corresponds to the cover member 300 shown in FIG. 1.

Although a plurality of support members 1220 is shown as belonging to a first lens moving unit 1100, the support members 1220 may also belong to a second lens moving unit 1200 in a functional aspect. The support members 1220 will be discussed in detail when the second lens moving unit 1200 is described.

The first and second lens moving unit 1100 and 1200 perform the same functions as the first and second lens moving unit 100 and 200 according to previous embodiment, respectively, and therefore a duplicate description will be omitted.

Referring to FIG. 17, the first lens moving unit 1100 may include a bobbin 1110, a first coil 1120, a magnet 1130, a housing 1140, an upper elastic member 1150, and a lower elastic member 1160. The magnet 1130 is identical to the first magnet 130 of the lens moving apparatus 1000 according to the previous embodiment, and therefore a duplicate description will be omitted.

The bobbin 1110 may include at least one of a first stopper 1111 or a second stopper 1112. The first stopper 1111 may prevent the top surface of a body of the bobbin 1110 from directly colliding with the inside of the cover member 1300 although the bobbin 1110 deviates from a prescribed range due to external impact when the bobbin 1110 moves in a first direction, i.e. a direction parallel to an optical axis, to perform an auto focusing function. In addition, the first stopper 1111 may also function to guide a mounting position of the upper elastic member 1150. According to this embodiment, as shown in FIG. 19, a plurality of first stoppers 1111 may protrude upward by a second height h2. At least 19 stoppers 1111 may each protrude in the form of a polygonal post. In addition, the first stoppers 1111 may be symmetric with respect to the center of the bobbin 1110. As shown, the first stoppers 1111 may be asymmetrically arranged to avoid interference with other parts.

The second stopper 1112 may prevent the bottom surface of the body of the bobbin 1110 from directly colliding with the base 1210 and the top surface of the circuit board 1250 shown in FIGS. 17 and 29 although the bobbin 1110 deviates from a prescribed range due to external impact when the bobbin 1110 moves in the first direction, i.e. the direction parallel to the optical axis, to perform an auto focusing function.

According to this embodiment, a plurality of second stoppers 1112 may protrude from the edge of the bobbin 1110 in a circumferential direction. Referring to FIG. 22, the housing 1140 may be provided with location grooves 1146 formed at portions corresponding to the second stoppers 1112.

In a case in which the second stoppers 1112 are initially located on bottoms 1146a (see FIG. 22) of the location grooves 1146 in contact, the bobbin 1110 may move upward when current is supplied to the first coil 1120 and move downward when no current is supplied to the first coil 1120 as in uni-directional control in a conventional voice coil motor to realize the auto focusing function.

On the other hand, in a case in which the second stoppers 1112 are initially spaced apart from the bottoms 1146a of the location grooves 1146 by a predetermined distance, the auto focusing function may be controlled according to the current's flow direction like bi-directional control in the conventional voice coil motor. That is, the bobbin 1110 may move upward or downward in the direction parallel to the optical axis to realize the auto focusing function. For example, the bobbin 1110 may move upward when forward current is supplied, and bobbin 1110 may move downward when reverse current is supplied.

Meanwhile, the location grooves 1146 of the housing 2140 corresponding to the second stoppers 1112 may be depressed. As shown in FIG. 22, a fourth width W4 of each of the location grooves 1146 may have more uniform tolerance than a third width W3 of each of the second stoppers 1112 shown in FIG. 19. As a result, the rotation of the second stoppers 1112 in the location grooves 1146 may be restricted. Even when force is applied the bobbin 1110 in a direction in which the bobbin 110 is rotated about the optical axis, not in the optical axis direction, therefore, the second stoppers 1112 may prevent the rotation of the bobbin 1110.

In addition, a plurality of upper support protrusions 1113 (see FIG. 19) may be formed at the top surface of the bobbin 1110, and a plurality of lower support protrusions 1114 (see FIG. 24) may be formed at the bottom surface of the bobbin 1110.

As shown in FIG. 19, the upper support protrusions 1113 may each have a cylindrical or prismatic shape. The upper support protrusions 1113 may fix an inside frame 1151 of the upper elastic member 1150 and the bobbin 1110 by coupling. According to this embodiment, the inside frame 1151 may be provided at portions thereof corresponding to the upper support protrusions 1113 with first through holes 1151a. The upper support protrusions 1113 and the first through holes 1151a may be fixed by thermal fusion or using an adhesive member, such as epoxy. The number of the upper support protrusions 1113 may be plural as shown in FIGS. 18 and 19. In addition, the distance between the upper support protrusions 113 may be approximately set within a range capable of avoiding interference with peripheral parts. That is, the upper support protrusions 1113 may be arranged at uniform intervals in a state in which the upper support protrusions 1113 are symmetric with respect to the center of the bobbin 1110. Alternatively, the upper support protrusions 113 may be arranged symmetrically with respect to a specific imaginary line passing through the center of the bobbin 1110 although the distance between the upper support protrusions 1113 is not uniform.

As shown in FIG. 24, the lower support protrusions 1114 may each have a cylindrical or prismatic shape like the upper support protrusions 1113. The lower support protrusions 1114 may fix an inside frame 1161 of the lower elastic member 1160 and the bobbin 1110 by coupling. According to this embodiment, the inside frame 1161 may be provided at portions thereof corresponding to the lower support protrusions 1114 with second through holes 1161a. The lower support protrusions 1114 and the second through holes 1161a may be fixed by thermal fusion or using an adhesive member, such as epoxy. The number of the lower support protrusions 1114 may be plural as shown in FIG. 24. In addition, the distance between the lower support protrusions 1114 may be approximately set within a range capable of avoiding interference with peripheral parts. That is, the lower support protrusions 1114 may be arranged at uniform intervals in a state in which the lower support protrusions 1114 are symmetric with respect to the center of the bobbin 1110.

Meanwhile, the number of the lower support protrusions 1114 may be less than that of the upper support protrusions 1113 based on the shapes of the upper elastic member 1150 and the lower elastic member 1160. That is, as shown in FIG. 18, the upper elastic member 1150 is divided into two parts which are electrically separated from each other to function as terminals for supplying current to the first coil 1120. For this reason, a sufficient number of upper support protrusions 1113 are provided to prevent incomplete coupling between the upper elastic member 1150 and the bobbin 1110. On the other hand, the lower elastic member 1160 is a single body. Consequently, coupling between the lower elastic member 1160 and the bobbin 1110 is achieved even using a smaller number of lower support protrusions 1114 than the upper support protrusions 1113. Alternatively, the lower elastic member 1160 may be divided into two parts which are electrically separated from each other to function as terminals for supplying current to the first coil 1120. In this case, the upper elastic member 1150 may be a single body.

In addition, as shown in FIGS. 19 to 21, two winding protrusions 1115 may be provided at the upper outer circumference of the bobbin 1110. Opposite ends, i.e. a start portion and an end portion, of the first coil 1120 may be wound on the winding protrusions 1115. At the top surface of the bobbin 1110 adjacent to the winding protrusions 1115, the ends of the first coil 1120 may be electrically connected to the top surface of the upper elastic member 1150 by a conductive connection member, such as solder (S).

In addition, a pair of winding protrusions 1115 may be arranged in bilateral symmetry shape with respect to the center of the bobbin 1110. Alternatively, the two winding protrusions 1115 may be disposed adjacent to each other while facing each other. In addition, a catching projection 1115a may be formed at the end of each of the winding protrusions 1115 for preventing separation of the wound first coil 1120 or guiding the position of the first coil 1120. As shown, the catching projection 1115a may be formed such that the width of each winding protrusion 1115 protruding from the outer circumference of the bobbin 1110 gradually increases. The catching projection 1115a may have a step structure formed at the end thereof.

In addition, as shown in FIGS. 20 and 21, at least one groove 1116 may be formed at the side of each winding protrusion 1115. The groove 1116 may include at least one of a first groove 1116a or a second groove 1116b. At least one of the first groove 1116a or the second groove 1116b may have a depth and a width greater than the diameter of the first coil 1120 such that the start portion or the end portion of the first coil 1120 can pass therethrough. As a result, the start portion or the end portion of the first coil 1120 passing through at least one of the first or second grooves 1116a and 1116b may be easily located on the at least one of the first or second grooves 1116a and 1116b. In addition, the first coil 1120 may pass through the groove 1116 without interference with the upper elastic member 1150 disposed above the groove 1116.

Meanwhile, both the first and second grooves 1116a and 1116b are shown in the figure. However, the disclosure is not limited thereto. Only one of the first and second grooves 1116a and 1116b may be provided, or three or more grooves may be provided.

One end 1121 of the first coil 1120 may be wound on a corresponding one of the winding protrusions 1115 once or more, pass through the first groove 1116a or the second groove 1116b, and be electrically connected to a portion of the top surface of the upper elastic member 1150 disposed above the groove 1116. In the same manner, the other end of the first coil 1120 may pass through one or two of the grooves and be electrically connected to the top surface of the upper elastic member 1150. Electrical connection between the first coil 1120 and the upper elastic member 1150 may be achieved by any electrical connection method such as soldering or welding or using Ag epoxy or conductive epoxy.

Alternatively, the end 1121 of the first coil 1120 may pass through the first groove 1116a and then pass through the second groove 1116b, which may be repeated once or more to tie the first coil 1120 such that the start portion and the end portion of the first coil 1120 can be arranged.

Meanwhile, an opening may be formed at the top surface of the groove 1116. The opening may be partially or entirely covered by the upper elastic member 1150. That is, the upper opening of the groove 1116 are partially or entirely covered by the upper elastic member 1150 coupled to the top surface of the bobbin 1110. Consequently, the first coil 1120 passing through the groove 1116 may be prevented from moving toward the opening of the groove 1116.

According to the above-described construction, it is not necessary to perform a troublesome process of arranging the ends of the first coil 1120 after winding the start portion or the end portion on the winding protrusion 1115 for arrangement of the first coil 1120. That is, the first coil 1120 may pass through the groove 1116 in inward direction, the end 1121 of the first coil 1120 may be bent and located on the top surface of the upper elastic member 1150, and the end 1121 of the first coil 1120 and the top surface of the upper elastic member 1150 may be electrically connected by soldering. In addition, the first coil 1120 may also be fixed. Consequently, assemblability may be improved, and the amount of solder consumed for soldering may be reduced.

Since the first coil 1120 is very thin, the first coil 1120 may be cut during a winding process. In particular, when the first coil 1120 is pulled to arrange the end 1121 of the first coil 1120 during a soldering process, the first coil 1120 may be cut and discarded. According to this embodiment, however, such a process of arranging the end 1121 may be omitted, thereby fundamentally preventing defect of products due to cut wires.

Meanwhile, the first coil 1120 may be wound on the outer circumference of the bobbin 1110 by a worker or a machine, and then the start portion and the end portion of the first coil 1120 may be wound on the winding protrusions 1115 for fixing. For example, the first coil 1120 may be disposed at a lower end 1110a of the outer circumference of the bobbin 1110 shown in FIG. 19. At this time, according to the worker, the position of the end of the first coil 120 wound on each winding protrusion 1115 may be changed. According to this embodiment, the first and second grooves 1116a and 1116b are formed at opposite sides of each winding protrusion 1115 such that the end of the first coil 1120 wound on each winding protrusion 1115 can pass a nearer one of the first and second grooves 1116a and 1116b, thereby improving workability. Of course, only one groove 1116 may be formed.

Meanwhile, the first coil 1120 may be a coil block having a ring shape or a polygonal shape which can be fitted in the intercalative binding shape onto the outer circumference of the bobbin 1110. However, the disclosure is not limited thereto. The first coil 120 may be directly wound on the outer circumference of the bobbin 1110. In any case, the start portion and the end portion of the first coil 120 may be wound on the winding protrusions 1115 for fixing. Other configurations are the same.

Other characteristics of the first coil 1120 and the bobbin 1110 are identical to those of the first coil 120 and the bobbin 110 according to the previous embodiment, and therefore a duplicate description thereof will be omitted.

In addition, the housing 1140 is identical to the housing 140 included in the lens moving apparatus 1000 according to the previous embodiment, except a partial difference of the structure including the first and second location grooves 146-1 and 146-2 in which the first and second stoppers 111 and 112 are disposed, and therefore a duplicate description thereof will be omitted. That is, first sides 1141, magnet location parts 1141a, second sides 1142, escape grooves 1142a, third stoppers 1143, upper frame support protrusions 1144, and lower frame support protrusions 1145 of the housing 1140 perform the same functions as the first sides 141, the magnet location parts 141a, the second sides 142, the escape grooves 142a, the third stoppers 143, the upper frame support protrusions 144, and the lower frame support protrusions 145 of the housing 140, respectively, and therefore a duplicate description thereof will be omitted. Some other components and connection therebetween will hereinafter be described.

The third stoppers 1143 may function to guide a mounting position of the upper elastic member 1150. To this end, as shown in FIG. 18, the upper elastic member 1150 may be provided with guide grooves 1155 having a shape corresponding to the third stoppers 1143 and at the position at which the guide grooves 1155 face the third stoppers 1143.

In addition, the bottom surfaces of the escape grooves 1142a may be open to prevent interference between second fixing parts of the lower parts of the support members 1220, which will hereinafter be described, and the housing 1140. In addition, as shown in FIG. 23, steps 1142b may be formed at upper sides of the escape grooves 1142a for supporting the insides of upper parts of the support members 1220, which will hereinafter be described.

In addition, the outside frame 1152 may be provided with third through holes 1152a corresponding to the upper frame support protrusions 1144. The upper frame support protrusions 1144 may be fixed in the third through holes 1152a using an adhesive or by thermal fusion.

In addition, the outside frame 1162 may be provided with fourth through holes 1162a corresponding to the lower frame support protrusions 1145. The lower frame support protrusions 1145 may be fixed in the fourth through holes 1162a using an adhesive or by thermal fusion In addition, fourth stoppers 1147 may protrude from the lower side of the housing 1140. The fourth stopper 1147 may prevent the bottom surface of the housing 1140 from colliding with at least one of the base 1210 or the circuit board 1250, which will hereinafter be described. In addition, in an initial state or during normal operation, the fourth stoppers 1147 may remain spaced apart from at least one of the base 1210 or the circuit board 1250 by a predetermined distance. As a result, the housing 1140 may be spaced apart in a lower direction from the base 1210 and in an upper direction from the cover member 1300 such that the height of the housing 140 in the optical axis direction can be maintained by the support member pairs 1220, which will hereinafter be described, without upper and lower interference. Consequently, the housing 1140 may perform a shifting operation in a second direction and a third direction, which are a forward and backward direction and a left and right direction, respectively, on a plane parallel to the optical axis.

Meanwhile, when the bobbin 1110 moves at least one of upward or downward in the direction parallel to the optical axis to perform an auto focusing function, the bobbin 1110 may be elastically supported by the upper and lower elastic members 1150 and 1160. The upper elastic member 1150 and the lower elastic member 1160 may each be a leaf spring.

As shown in FIGS. 18 and 24, upper and lower elastic members 1150 and 1160 may include inside frames 1151 and 1161 coupled to the bobbin 1110, outside frames 1152 and 1162 coupled to the housing 1140, and frame connection parts 1153 and 1163 connected between the inside frames 1151 and 1161 and the outside frames 1152 and 1162, respectively.

The frame connection parts 1153 and 1163 may be bent at least once to form a predetermined pattern. The upward and/or downward movement of the bobbin 1110 in the first direction parallel to the optical axis may be elastically supported by the change in position and minute deformation of the frame connection parts 1153 and 1163.

According to this embodiment, the upper elastic member 1150 may include a first upper elastic member 1150a and a second upper elastic member 1150b which are separated from each other. Consequently, power having different polarities may be supplied to the first upper elastic member 1150a and the second upper elastic member 1150b of the upper elastic member 1150. That is, after the inside frame 1511 and the outside frame 1152 are coupled to the bobbin 1110 and the housing 1140, respectively, opposite ends of the first coil 1120 may be electrically connected to the first and second upper elastic members 1150a and 1150b by soldering, at the top surface adjacent to the winding protrusions 1115, on which the opposite ends of the first coil 1120 are wound, such that power having different polarities can be supplied to the first and second upper elastic members 1150a and 1150b. To this end, the upper elastic member 1150 may be divided into two parts.

Meanwhile, assembly of the upper and lower elastic members 1150 and 1160, the bobbin 1110, and the housing 1140 is identical to that of the upper and lower elastic members 150 and 160, the bobbin 110, and the housing 140 as previously described, and a duplicate description thereof will be omitted. However, at least one of the shape, number, or position of the second through holes 1161a and the fourth through holes 1162a may be different from at least one of the shape, number, or position of each of the second through holes 161a and the third through holes 162a.

In particular, since the upper elastic member 1150 may be divided into two parts, a larger number of upper support protrusions 1113 than the lower support protrusions 1114 may be provided to prevent a loosening phenomenon which may occur when the upper elastic member 1150 is separated.

The second lens moving unit 1200, which functions as an optical image stabilizer, may include a first lens moving unit 1100, a base 1210, support members 1220, a second coil 1230, and a position sensor 1240. The second lens moving unit 1200 may further include a circuit board 1250.

The base 1210, the second coil 1230, a circuit member 1231, the position sensor 1240, and the circuit board 1250 perform the same functions as the base 210, the second coil 230, the circuit member 231, the second sensor 240, and the circuit board 250, respectively, according to the previous embodiment, except for a minor difference of the structure as shown in figure, and therefore a duplicate description will be omitted. That is, steps 1211, terminals 1251, support member location grooves 1214, and a sensor location groove 1215 correspond to the steps 211, the terminals 251, the support member location grooves 214, and the second sensor location groove 215 of the lens moving apparatus 1000 according to the previous embodiment, respectively.

The support members 1220 may be fixed to straight sides of the base 1210.

As shown in FIG. 25, the support members 1220 may be individually disposed at the second sides 1142 of the housing 1140 for supporting the housing 1140 while being spaced apart from the base 1210 by a predetermined distance. One end of each of the support members 1220 may be inserted or disposed in a corresponding one of the support member location grooves 1214 formed at the base 210 and fixed using an adhesive member, such as epoxy. The other end of each of the support members 1220 may be fixed to the upper end of a side wall of the housing 1140.

Since the support members 1220 are disposed at the second sides 1142 of the housing 1140 according to this embodiment, the four support members may be arranged in a symmetric fashion. However, the disclosure is not limited thereto. For example, two support members may be disposed at each straight side of the housing 1140. In this case, therefore, the eight support members may be disposed at the second sides of the housing 1140. In addition, the support members 1220 may be electrically connected to the upper elastic member 1150. Specifically, the support members 1220 may be electrically connected to straight sides of the upper elastic member 1150.

Each of the support members 1220 may include a first fixing part 1221 connected to the upper side of the housing 1140, elastic deformation parts 1222 and 1223, a second fixing part 1224, and a connection part 1225. The first fixing part 1221, which is connected to the upper end of each second side 1142 of the housing 1140, may be provided with a groove corresponding to a coupling protrusion formed at the second side 1142 such that the first fixing part 1221 can be fixed to the upper end of each second side 1142 of the housing 1140 by fitting of the coupling protrusion into the groove. In addition, the support members 1220 are formed separately from the upper elastic member 1150. Consequently, the first fixing part 1221 of each of the support members 1220 may be electrically connected to the upper elastic member 1150 by soldering. That is, the two divided parts of the upper elastic member 1150 may be electrically connected to two of the four support members to supply current to the first coil 1120.

The elastic deformation parts 1222 and 1223 may be bent at least once to form a predetermined pattern. According to this embodiment, the elastic deformation parts 1222 and 1223 may include at least one of first or second elastic deformation parts 1222 and 1223. In addition, the connection part 1225 may be disposed at the middle between the elastic deformation parts 1222 and 1223. The elastic deformation parts 1222 and 1223 may have a shape matched with each other. For example, as shown in FIG. 25, when the first elastic deformation part 1222 is bent twice or more into a zigzag shape, the second elastic deformation part 1223 may have a shape corresponding to that of the first elastic deformation part 1222. However, the disclosure is not limited thereto. The second elastic deformation part 1223 may have a shape different from that of the first elastic deformation part 1222. FIG. 25 shows merely one embodiment. The elastic deformation parts may have various other patterns. The first and second elastic deformation parts 1222 and 1223 may be integrated into a single elastic deformation part. Alternatively, the first and second elastic deformation parts 1222 and 1223 may be configured in the form of a suspension wire having no pattern. According to this embodiment, straight parts of the first and second elastic deformation parts 1222 and 1223 may be approximately parallel to a plane perpendicular to the optical axis.

When the housing 1140 moves in the second direction and/or the third direction perpendicular to the optical axis, the first and second elastic deformation parts 1222 and 1223 may be minutely and elastically deformed in a moving direction of the housing 1140 or a longitudinal direction of the support members 1220. As a result, the housing 1140 may move substantially in the second and third directions perpendicular to the optical axis with little change in position of the housing 1140 in the first direction parallel to the optical axis, thereby improving accuracy of optical image stabilization. This is based on properties of the elastic deformation parts 1222 and 1223 extending in the longitudinal direction. The longitudinal direction may be a direction in which the first fixing part 1221 and the second fixing part 1224 are connected to each other.

The second fixing part 1224 may be provided at one end of each support member 1220. In addition, the second fixing part 1224 may be formed in a plate shape having a larger width than the first and second elastic deformation parts 1222 and 1223. However, the disclosure is not limited thereto. The second fixing part 1224 may have a width equal to or less than that of the first and second elastic deformation parts 1222 and 1223. According to this embodiment, as shown in FIG. 25, the second fixing part 1224 may be divided into two parts, which may be inserted or disposed in corresponding ones of the support member location grooves 1214 of the base 1210. The second fixing part 1224 may be fixed using an adhesive member, such as epoxy. However, the disclosure is not limited thereto. The second fixing part 1224 may be fitted into a corresponding one of the support member location grooves 1214. Alternatively, only one second fixing part 1224 may be formed, or two or more second fixing parts 1224 may be formed. In this case, the base 1210 may be provided with support member location grooves 1214 corresponding to the second fixing parts 1224.

The connection part 1225 may be disposed at the middle between the first and second elastic deformation parts 1222 and 1223. However, the disclosure is not limited thereto. The connection part 1225 may be disposed to be connected to one of the elastic deformation parts. In addition, the connection part 1225 may be formed in a plate shape for functioning as a damper. The connection part 1225 may be provided with a plurality of holes or grooves, through which the connection part 1225 and the housing 1140 may constitute a damping unit using a UV damper. In this embodiment, a pair of first elastic deformation parts 1222 and a pair of second elastic deformation parts 1223 are provided. However, the first fixing part 1221 and the second fixing part 1224 each are a single body. Consequently, the pair of first elastic deformation parts 1222 and the pair of second elastic deformation parts 1223 can be simultaneously fixed to the housing 1140 and the base 1210. In addition, one or more fixing parts may be provided at each end of each support member 1220, and one or more elastic deformation parts may be provided between the ends of each support member 1220.

Meanwhile, as shown in FIGS. 20 and 21, the upper elastic member 1150 may be divided into the first and second upper elastic members 1150*a* and 1150*b*, to which power having different polarities is supplied. Consequently, terminals (not shown) for supplying power may be further provided at the first and second upper elastic members 1150*a* and 1150*b*. The terminals may be formed at two of the four support members 1220 since positive (+) power or negative (−) power may be applied to the terminals.

The circuit board 1250 may be coupled to the top surface of the base 1210. As shown in FIG. 27, the circuit board 250 may be provided with through holes, through which the support member location grooves 1214 are exposed. The circuit board 1250 may be provided with a bent terminal mounting surface at which the bent terminal 1251 is mounted. According to this embodiment, one bent terminal mounting surface may be formed at the circuit board 1250. A plurality of terminals 1251 may be disposed at the bent terminal mounting surface of the circuit board 250 so that external power may be received through the terminals 1251 to supply the current to the first and second coils 1120 and 1230.

The number of the terminals disposed at the bent terminal mounting surface may be changed based on the kinds of components to be controlled. Meanwhile, according to this embodiment, the circuit board 1250 may be an FPCB. However, the disclosure is not limited thereto. The terminals of the circuit board 1250 may be directly formed at the surface of the base 1210 using a surface electrode method.

In addition, although not shown, the second coil 1230 may include fifth through holes (not shown) formed through corners of the circuit member 1231. The support members 1220 may be connected to the circuit board 1250 through the fifth through holes. Alternatively, in a case in which the second coil 1230 is an FP coil, an optical image stabilizer (OIS) coil 1232 may be formed or disposed at a portion of the FP coil. In addition, instead of forming the fifth through holes, the support members 1220 may be electrically connected to portions of the second coil 1230 corresponding to the fifth through holes by soldering.

Meanwhile, the base 1210 may be provided at the lower part thereof with a groove, in which an image sensor and a printed circuit board are coupled, and a lens barrel is assembled to the bobbin 1110 to constitute a camera module. Alternatively, the base 1210 may be provided at the lower part thereof with an additional image sensor holder. Alternatively, the base 1210 may extend downward such that a camera module board having an image sensor mounted at the bottom surface thereof can be directly coupled to the base 1210.

According to the above-described construction, it is possible for the lens moving apparatus 2000 to perform auto focusing and optical image stabilization of the first and second lens moving units 1100 and 1200 commonly using the magnets 1130. Consequently, it is possible to reduce the number of parts and the weight of the housing 1140, thereby improving responsibility. Of course, magnets for auto focusing and magnets for optical image stabilization may be separately configured.

In addition, the ends 1121, i.e. the start portion and the end portion, of the first coil 1120 may pass through the grooves 1116 formed at the opposite sides of the winding protrusions 1115 and then be fixed at the top surface of the upper elastic member 1150 by soldering (S). Consequently, it is possible to omit a process of winding the start portion and the end portion of the first coil 1120 on the winding protrusions 1115 and arranging the start portion and the end portion of the first coil 1120, thereby reducing process time. In addition, it is possible to prevent assembly defect due to contact with other parts during the process of arranging the start portion and the end portion of the first coil 1120.

In addition, the start portion and the end portion of the first coil 1120 may pass through the grooves 1116 such that a sufficient length of the first coil 1120 can be drawn into the bobbin 1110 as shown in FIG. 21. Even when the first coil 1120 is cut due to carelessness of a worker during a soldering process, therefore, another soldering process may be performed since the length of the first coil 1120 is sufficient, thereby minimizing assembly defect.

The description of the lens moving apparatus 1000 according to the previous embodiment may be applied to the lens moving apparatus 2000 according to this embodiment as far as the description of the lens moving apparatus 1000 is not contrary to that of the lens moving apparatus 2000. In addition, the description of the lens moving apparatus 2000 may be applied to the lens moving apparatus 1000 as far as the description of the lens moving apparatus 2000 is not contrary to that of the lens moving apparatus 1000.

As is apparent from the above description, in a lens moving apparatus according to an embodiment and a camera module including the same, first and second support members and first and second upper elastic members, which are electrically separated from each other, are connected to each other on the same plane of a housing while being opposite to each other. Consequently, it is possible to reduce time necessary to perform a soldering process and thus to reduce manufacturing time. In addition, one support member facing each side of the housing is divided into two parts, a lower elastic member is divided into two parts, and a first sensor is connected to a circuit board using the divided support members and the divided lower elastic member. Consequently, an additional structure for a first sensor is not required, and therefore it is possible to add a first sensor for accurately controlling the position of a bobbin with low cost and to give feedback of a value sensed by the first sensor such that a lens can be accurately focused.

In addition, in a lens moving apparatus according to another embodiment and a camera module including the same, a start portion and an end portion of a coil are disposed at the top surface of an elastic member such that the coil and the elastic member is electrically connected to each other by soldering. Consequently, it is possible to prevent an assembly error, such as breaking or poor electric conduction, during a soldering process. In addition, grooves are disposed near a winding protrusion such that the coil can pass through a nearer one of the grooves based on how many times the coil is wound on the winding protrusion. Consequently, it is possible to change a soldering position as needed.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for focus control and optical image stabilization, the apparatus comprising:
a housing disposed to be movable in a first direction perpendicular to an optical axis direction;
a bobbin disposed to be movable relative to the housing in a second direction parallel to the optical axis direction and to be movable together with the housing in the first direction;
an elastic member connected to the housing and the bobbin and supporting a movement of the bobbin in the second direction;
a second magnet disposed in the bobbin; and
a first sensor disposed opposite to the second magnet and sensing the movement of the bobbin in the second direction,
wherein the first sensor is disposed to move together with the housing in the first direction.

2. The apparatus according to claim 1, wherein the first sensor is fixed at the housing.

3. The apparatus according to claim 1, wherein an inner surface of the first sensor is disposed closer to the bobbin than an outer surface of the housing.

4. The apparatus according to claim 3, wherein the housing includes a first recess in which the first sensor is disposed.

5. The apparatus according to claim 1, further comprising:
a first coil disposed at the bobbin; and
a first magnet facing the first coil,
wherein the bobbin is movable in the second direction by interaction between the first magnet and the first coil.

6. The apparatus according to claim 5, further comprising a cover member in which the housing is disposed,
wherein the first magnet is disposed between the cover member and the bobbin in the first direction.

7. The apparatus according to claim 6, further comprising a support member supporting a movement of the housing in the first direction.

8. The apparatus according to claim 7, wherein the housing includes four side surfaces, and
wherein the support member is disposed at an at least portion of the four side surfaces.

9. The apparatus according to claim 7, further comprising a base disposed under the cover member,
wherein the support member is coupled to the base.

10. The apparatus according to claim 9, wherein the support member connects the housing to the base.

11. The apparatus according to claim 5, wherein the first coil is disposed at a side of the bobbin.

12. The apparatus according to claim 5, wherein the elastic member includes a lower elastic member coupled to the bobbin,
wherein the lower elastic member includes a first lower elastic member and a second lower elastic member being spaced apart from each other, and
wherein a first end of the first coil is configured to be electrically connected to the first lower elastic member and the second end of the first coil is configured to be electrically connected to the second lower elastic member.

13. The apparatus according to claim 12, wherein the elastic member includes an upper elastic member coupled to the bobbin, and
wherein the upper elastic member includes a plurality of upper elastic members, the plurality of the upper elastic members being spaced apart from each other.

14. The apparatus according to claim 13, wherein the bobbin comprises:
a plurality of upper support protrusions disposed on a top surface of the bobbin; and
a plurality of lower support protrusions disposed on a bottom surface of the bobbin,
wherein the upper elastic member comprises a plurality of first through holes disposed at positions corresponding to the plurality of upper support protrusions, and
wherein the lower elastic member comprises a plurality of second through holes disposed at positions corresponding to the plurality of lower support protrusions.

15. The apparatus according to claim 5, further comprising a second coil configured to move the housing in the first direction by interaction of the second coil and the first magnet.

16. The apparatus according to claim 1, wherein the second magnet is disposed to an outer circumference of the bobbin.

17. The apparatus according to claim 16, wherein the bobbin includes a second recess formed at the outer circumference of the bobbin, the second magnet being disposed in the second recess.

18. An apparatus for focus control and optical image stabilization, comprising:
a housing disposed to be movable in first and second directions perpendicular to an optical axis direction, the first direction being perpendicular to the second direction;
a bobbin disposed to be movable relative to the housing in a third direction parallel to the optical axis direction and to be movable together with the housing in the first and second directions;
a first coil disposed at the bobbin,
first magnets disposed opposite to the first coil,
an elastic member connected to the housing and the bobbin and supporting a movement of the bobbin in the second direction;
a second magnet disposed in the bobbin; and a first sensor disposed at the housing opposite to the second magnet, wherein the first coil and the first magnets overlap in the first direction, and wherein the first sensor and the second magnet overlap in the second direction.

19. The apparatus according to claim 18, wherein the second magnet is disposed between the first magnets when viewed from above.

\* \* \* \* \*